(12) United States Patent
Murakami

(10) Patent No.: US 8,818,636 B2
(45) Date of Patent: Aug. 26, 2014

(54) ELECTRIC POWER STEERING APPARATUS, CONTROL METHOD THEREOF AND COMPUTER READABLE MEDIUM

(75) Inventor: Hideyuki Murakami, Gyoda (JP)

(73) Assignee: Showa Corporation, Saitama (JP)

( * ) Notice: Subject to any disclaimer, the term of this patent is extended or adjusted under 35 U.S.C. 154(b) by 0 days.

(21) Appl. No.: 13/561,239

(22) Filed: Jul. 30, 2012

(65) Prior Publication Data

US 2012/0290174 A1    Nov. 15, 2012

Related U.S. Application Data

(62) Division of application No. 12/565,271, filed on Sep. 23, 2009, now Pat. No. 8,260,500.

(30) Foreign Application Priority Data

| Feb. 23, 2009 | (JP) | 2009-039754 |
| Feb. 27, 2009 | (JP) | 2009-045285 |
| Mar. 31, 2009 | (JP) | 2009-085705 |

(51) Int. Cl.
    *B62D 5/04*    (2006.01)
(52) U.S. Cl.
    CPC ............... *B62D 5/0472* (2013.01);
                        *B62D 5/0463* (2013.01)
    USPC .......................................... 701/42; 180/446
(58) Field of Classification Search
    USPC .......................................................... 701/41
    See application file for complete search history.

(56) References Cited

U.S. PATENT DOCUMENTS

| 4,834,205 | A | 5/1989 | Mizuno et al. | |
| 5,992,557 | A | 11/1999 | Nakamura et al. | 180/446 |
| 6,212,447 | B1 | 4/2001 | Kohge et al. | 701/1 |
| 6,687,589 | B2 | 2/2004 | Kanda | 701/41 |
| 7,226,069 | B2 | 6/2007 | Ueda et al. | 180/446 |

(Continued)

FOREIGN PATENT DOCUMENTS

| EP | 0 278 366 A1 | 8/1988 |
| EP | 1 203 710 A2 | 5/2002 |

(Continued)

OTHER PUBLICATIONS

U.S. Office Action (U.S. Appl. No. 13/561,246), dated Jul. 30, 2012.

(Continued)

*Primary Examiner* — Shelley Chen
(74) *Attorney, Agent, or Firm* — Morgan, Lewis & Bockius LLP

(57) ABSTRACT

The electric power steering apparatus is provided with: a steering torque detector that detects steering torque of a steering wheel; an electric motor that applies steering assist force to the steering wheel; a current detector that detects an actual current actually supplied to the electric motor; a target current setting unit that sets a target current to be supplied to the electric motor, on the basis of the steering torque detected by the steering torque detector; a feedback controller that performs feedback control so that the target current and the actual current coincide with each other; and a feedforward controller that performs feedforward control for increasing the actual current detected by the current detector if the target current increases, the feedforward controller including a frequency compensator that provides a smaller amount of increase in the actual current as a frequency of a variation in the target current is lower.

11 Claims, 37 Drawing Sheets

(56) References Cited

U.S. PATENT DOCUMENTS

| | | | |
|---|---|---|---|
| 7,604,088 B2 * | 10/2009 | Nishizaki et al. | 180/446 |
| 7,720,584 B2 | 5/2010 | Ogawa et al. | 701/42 |
| 7,894,956 B2 | 2/2011 | Kondo et al. | 701/41 |
| 8,121,759 B2 | 2/2012 | Tamaki | 701/41 |
| 2001/0027894 A1 | 10/2001 | Noro et al. | 180/443 |
| 2003/0146041 A1 | 8/2003 | Kanda | 180/446 |
| 2004/0083822 A1 | 5/2004 | Mukai et al. | 73/862.195 |
| 2004/0238257 A1 | 12/2004 | Takahashi et al. | 180/402 |
| 2004/0256171 A1 | 12/2004 | Sugitani | |
| 2005/0087387 A1 | 4/2005 | Ueda et al. | 180/443 |
| 2005/0182541 A1 * | 8/2005 | Tamaizumi et al. | 701/41 |
| 2006/0089770 A1 | 4/2006 | Ito | 701/41 |
| 2006/0090952 A1 | 5/2006 | Ito | 180/446 |
| 2007/0068725 A1 * | 3/2007 | Nishizaki | 180/444 |
| 2007/0114094 A1 | 5/2007 | Tamaizumi | 180/446 |
| 2007/0205041 A1 * | 9/2007 | Nishizaki et al. | 180/446 |
| 2008/0035411 A1 | 2/2008 | Yamashita et al. | 180/443 |
| 2008/0067960 A1 | 3/2008 | Maeda et al. | 318/400.02 |
| 2008/0149414 A1 | 6/2008 | Ogawa et al. | 180/446 |
| 2008/0243338 A1 | 10/2008 | Tamaki | 701/41 |
| 2008/0243341 A1 | 10/2008 | Hayama et al. | 701/42 |
| 2008/0262678 A1 * | 10/2008 | Nishimura et al. | 701/42 |
| 2009/0024278 A1 | 1/2009 | Kondo et al. | 701/41 |
| 2009/0240389 A1 | 9/2009 | Nomura et al. | 701/29 |

FOREIGN PATENT DOCUMENTS

| | | | |
|---|---|---|---|
| EP | 1 905 668 A2 | | 4/2008 |
| JP | 02-164665 | | 6/1990 |
| JP | 10-100914 | | 4/1998 |
| JP | 10-167086 | | 6/1998 |
| JP | 2001-315657 | | 11/2001 |
| JP | 2006-188183 | | 7/2006 |
| JP | 2006188183 | A * | 7/2006 |
| JP | 2008-154376 | | 7/2008 |

OTHER PUBLICATIONS

U.S. Office Action dated Apr. 5, 2013 issued in related U.S. Appl. No. 13/561,246.

* cited by examiner

ELECTRIC POWER STEERING APPARATUS, CONTROL METHOD THEREOF AND COMPUTER READABLE MEDIUM

CROSS REFERENCE TO RELATED APPLICATIONS

This application is a divisional patent application derived from the patent application Ser. No. 12/565,271 filed on Sep. 23, 2009, now U.S. Pat. No. 8,260,500, which claims priority under 35 USC §119 from Japanese Patent Applications No. 2009-039754 filed Feb. 23, 2009, No. 2009-045285 filed Feb. 27, 2009, and No. 2009-085705 filed Mar. 31, 2009, all of which are hereby incorporated by reference as if fully set forth herein.

This application is related to U.S. application Ser. No. 13/561,246 filed on Jul. 30, 2012, which is incorporated by reference as if fully set forth.

BACKGROUND

1. Technical Field

The present invention relates to an electric power steering apparatus, a control method thereof and a computer readable medium storing a program.

2. Related Art

Recently, an electric power steering apparatus has been proposed, which includes an electric motor in a vehicle steering system and assists a driver with his or her steering force by use of power of the electric motor.

The electric power steering apparatus is controlled by a controller. To control the electric motor drive, the controller first sets a target current to be supplied to the electric motor in accordance with steering torque, vehicle speed, and the like. Then, the controller performs feedback control so that a deviation between the target current and an actual current would become zero, in order that the actual current actually passing through the electric motor may coincide with the set target current.

For example, an electric power steering apparatus disclosed in Patent Literature 1 performs a proportional action of multiplying, by proportional gain Kp, the current deviation between the target current and the actual current, and an integral action of multiplying, by integral gain Ki, the integral value obtained by integrating the current deviation.

Under the feedback control alone, however, response to a change in the current passing through the electric motor may not be necessarily said to be sufficient. Thus, there has been proposed an approach of feedforward control execution in which a motor drive signal increases in magnitude in accordance with the target current, in addition to the feedback control, to thereby heighten steering response. (See Patent Literature 2, for example.)

To control the drive of the electric motor, the controller, which controls the electric power steering apparatus, determines the current to be supplied to the electric motor on the basis of detected steering torque.

There has been proposed a technique in which, at the time of determination of the current to be supplied to the electric motor, which is based on the detected steering torque, a phase compensator is used to provide a phase compensation of the detected steering torque in order to enhance the stability of the steering system, and the current is supplied to the electric motor in accordance with the phase-compensated steering torque. (See Patent Literature 3, for example.)

Patent Literature 4 also proposes the following technique. Specifically, with the fact taken into account that oscillation occurs at a resonance frequency in a resonance system including a spring element that forms the torque sensor and the inertia of a steering wheel, this technique provides a band-elimination filter for eliminating resonance frequency components of a signal from a motor drive control system on the output side of a torque sensor.

Patent Literature 1: Japanese Patent Application Laid Open Publication No. 2001-315657
Patent Literature 2: Japanese Patent Application Laid Open Publication No. 10-100914
Patent Literature 3: Japanese Patent Application Laid Open Publication No. 10-167086
Patent Literature 4: Japanese Patent Application Laid Open Publication No. 2-164665

Here, characteristics of a system that performs the feedback control on the basis of the current deviation between the target current and the actual current are determined by characteristics of a transfer function of the actual current relative to the target current. For example, the stability of the system is determined by a denominator of the transfer function, and response to the actual current is determined by a numerator of the transfer function. Then, a system that performs the feedback control using the proportional gain Kp and the integral gain Ki is incapable of effecting a change only in any one of the denominator and numerator of the transfer function, regardless of how the proportional gain Kp and the integral gain Ki are changed. In other words, the system is incapable of setting the stability of the system and the responsiveness to the actual current independently of each other.

Therefore, an object of the present invention is to achieve an improvement in the responsiveness to the actual current without affecting the stability of the system.

Also, the improvement in the responsiveness is effected by performing the feedforward control in addition to the feedback control. However, even in a steady state, an adder that adds together a feedback control output and a feedforward control output has addition of the feedback control output and the feedforward control output, and thus, even in the steady state, a difference arises between the target current and the actual current. Hence, the mere addition of the feedforward control to the system that performs the existing feedback control might greatly affect stationary characteristics of the electric motor. Therefore, a novel system including the existing feedback control is required for the addition of the feedforward control without affecting the stationary characteristics of the electric motor.

Also, the electric power steering apparatus drives the electric motor in accordance with steering torque applied to the steering wheel, and transfers drive power of the electric motor to a pinion shaft that forms a pinion-and-rack mechanism. Further, the drive power of the electric motor is transferred to a rack shaft through the pinion shaft, and effects a rectilinear motion of the rack shaft thereby to change the direction of a wheel to be turned.

For suppression of vibration in the control system of the electric power steering apparatus, it is therefore important that the electric motor, the pinion shaft and the rack shaft also be considered inertial elements.

SUMMARY

In order to attain the object, in the present invention, there is provided an electric power steering apparatus including: a steering torque detector that detects steering torque of a steering wheel; an electric motor that applies steering assist force to the steering wheel; a current detector that detects an actual current actually supplied to the electric motor; a target current setting unit that sets a target current to be supplied to the electric motor, on the basis of the steering torque detected by the steering torque detector; a feedback controller that performs feedback control so that the target current set by the target current setting unit and the actual current detected by the current detector coincide with each other; and a feedforward controller that performs feedforward control for increasing the actual current detected by the current detector if the target current increases, the feedforward controller including a frequency compensator that provides a smaller amount of increase in the actual current as a frequency of a variation in the target current is lower.

Here, it is preferable that the feedforward controller further include a weighting processor that increases or reduces an amount of increase in the actual current by performing multiplication by a weighting factor set in advance.

Further, it is preferable that the feedforward controller further include a weighting factor setting unit that sets the weighting factor in accordance with at least any one of a vehicle speed of a vehicle mounting the electric power steering apparatus and an amount of change in the steering torque detected by the steering torque detector.

Furthermore, it is preferable that the weighting factor setting unit set the weighting factor larger as the vehicle speed is lower.

Moreover, it is preferable that the weighting factor setting unit set the weighting factor larger as the amount of change in the steering torque is smaller.

Here, it is preferable that the frequency compensator be a band-pass filter that transmits a predetermined frequency alone.

From another standpoint, in the present invention, there is provided a control method of an electric power steering apparatus including: detecting steering torque of a steering wheel; detecting an actual current actually supplied to an electric motor that applies steering assist force to the steering wheel; setting a target current to be supplied to the electric motor, on the basis of the detected steering torque; performing feedback control so that the target current and the actual current coincide with each other; performing feedforward control for increasing the actual current if the target current increases; providing a smaller amount of increase in the actual current as a frequency of a variation in the target current is lower.

From further standpoint, in the present invention, there is provided a computer readable medium storing a program, the program comprising the steps of: detecting steering torque of a steering wheel; detecting an actual current actually supplied to an electric motor that applies steering assist force to the steering wheel; setting a target current to be supplied to the electric motor, on the basis of the detected steering torque; performing feedback control so that the target current and the actual current coincide with each other; performing feedforward control for increasing the actual current if the target current increases; and providing a smaller amount of increase in the actual current as a frequency of a variation in the target current is lower.

In order to attain the object, in the present invention, there is provided an electric power steering apparatus including: a steering torque detector that detects steering torque of a steering wheel; an electric motor that applies steering assist force to the steering wheel; a current detector that detects an actual current actually supplied to the electric motor; a target current setting unit that sets a target current to be supplied to the electric motor, on the basis of the steering torque detected by the steering torque detector; a proportional controller that performs a proportional action of multiplying, by a proportional gain, a value corresponding to a current deviation between the target current set by the target current setting unit and the actual current detected by the current detector; an integral controller that performs an integral action of multiplying, by an integral gain, an integral value obtained by integrating the value corresponding to the current deviation; and an addition unit that adds together an output value from the proportional controller and an output value from the integral controller and outputs a command value to the electric motor. At least any one of the proportional controller and the integral controller includes a correction unit that performs multiplication by a correction factor thereby to enhance an effect of a corresponding one of the proportional action and the integral action, and the electric power steering apparatus further includes an adjusting unit that performs an adjustment so that a denominator of a transfer function remains constant regardless of a value of the correction factor, when the target current set by the target current setting unit is an input, and the actual current actually supplied to the electric motor is an output.

Here, it is preferable that the proportional controller include a correction unit that performs multiplication by the correction factor thereby to enhance the effect of the proportional action, the adjusting unit multiply, by a factor depending on the correction factor, the actual current detected by the current detector, and output a multiplication result, and the addition unit further add an output from the adjusting unit, and outputs the command value to the electric motor.

In addition, it is preferable that the factor depending on the correction factor be a value obtained by multiplying, by the proportional gain, a value obtained by subtracting 1 from the correction factor.

Moreover, it is preferable that the integral controller include a correction unit that performs multiplication by the correction factor thereby to enhance the effect of the integral action, the adjusting unit multiply, by a factor depending on the correction factor, an integral value obtained by integrating a value of the actual current detected by the current detector, and output the multiplication result, and the addition unit further add an output from the adjusting unit, and outputs the command value to the electric motor.

Further, it is preferable that the factor depending on the correction factor be a value obtained by multiplying, by the integral gain, a value obtained by subtracting 1 from the correction factor.

Furthermore, it is preferable that the correction factor vary in accordance with at least any one of a vehicle speed of a vehicle mounting the electric power steering apparatus and an amount of change in the steering torque detected by the steering torque detector.

From furthermore standpoint, in the present invention, there is provided an electric power steering apparatus including: a steering torque detector that detects steering torque of a steering wheel; an electric motor that applies steering assist force to the steering wheel; a current detector that detects an actual current actually supplied to the electric motor; a target current setting unit that sets a target current to be supplied to the electric motor, on the basis of the steering torque detected by the steering torque detector; a first motor drive controller including: a first proportional controller that performs a proportional action of multiplying, by a proportional gain, a value corresponding to a current deviation between the target current set by the target current setting unit and the actual current detected by the current detector, and also that multiplies the multiplication result by a correction factor thereby to enhance an effect of the proportional action; a first integral controller that performs an integral action of multiplying, by an integral gain, an integral value obtained by integrating the value corresponding to the current deviation; and a first multiplication unit that multiplies, by a factor depending on the correction factor, the actual current detected by the current detector, the first motor drive controller adding together an output value from the first proportional controller, an output value from the first integral controller, and an output value from the first multiplication unit, and outputting a command value to the electric motor; a second motor drive controller including: a second proportional controller that performs a proportional action of multiplying, by the proportional gain, the value corresponding to the current deviation; a second integral controller that performs an integral action of multiplying, by the integral gain, the integral value obtained by integrating the value corresponding to the current deviation, and also that multiplies the multiplication result by a correction factor thereby to enhance an effect of the integral action; and a second multiplication unit that multiplies, by a factor depending on the correction factor, an integral value obtained by integrating a value of the actual current detected by the current detector, the second motor drive controller adding together an output value from the second proportional controller, an output value from the second integral controller, and an output value from the second multiplication unit, and outputting a command value to the electric motor; and a switching unit that performs switching between the first motor drive controller and the second motor drive controller to output the command value to the electric motor.

Here, it is preferable that the switching unit perform the switching in accordance with at least any one of a vehicle speed of a vehicle mounting the electric power steering apparatus and the steering torque detected by the steering torque detector.

In order to attain the object, in the present invention, there is provided an electric power steering apparatus including: a first rotary shaft connected to a steering wheel; a rack shaft that effects turning of a wheel to be turned, by a rectilinear motion; a second rotary shaft that effects the rectilinear motion of the rack shaft; a torsion bar that provides a connection between the first rotary shaft and the second rotary shaft and is twisted by operation of the steering wheel; an electric motor that applies assist force for the operation of the steering wheel; a steering torque detector that detects steering torque of the steering wheel; and a target current setting unit that sets a target current to be supplied to the electric motor, on the basis of the steering torque detected by the steering torque detector. The target current setting unit includes a resonance compensator that is provided on an output side of the steering torque detector and that suppresses a resonance frequency component of a control system including the torsion bar as a spring element, and the electric motor, the second rotary shaft and the rack shaft as inertial elements, and the target current setting unit sets the target current in accordance with the steering torque subjected to the suppression of the resonance frequency component by the resonance compensator.

Here, it is preferable that the resonance compensator have a filtering function and a low-pass filtering function, the filtering function having an antiresonant element of the control system.

In addition, it is preferable that a numerator of a transfer function of the resonance compensator have the same element as that of a denominator of a transfer function of the control system.

Moreover, it is preferable that a denominator of the transfer function of the resonance compensator have a degree not less than a degree of the numerator.

From furthermore standpoint, in the present invention, there is provided a control method of an electric power steering apparatus including a first rotary shaft connected to a steering wheel; a rack shaft that effects turning of a wheel to be turned, by a rectilinear motion; a second rotary shaft that effects the rectilinear motion of the rack shaft; a torsion bar that provides a connection between the first rotary shaft and the second rotary shaft and is twisted by operation of the steering wheel; an electric motor that applies assist force for the operation of the steering wheel, the control method thereof including: detecting steering torque of the steering wheel; and suppressing a resonance frequency component of a control system including the torsion bar as a spring element, and the electric motor, the second rotary shaft and the rack shaft as inertial elements; and setting a target current to be supplied to the electric motor in accordance with the steering torque subjected to the suppression of the resonance frequency component.

Here, it is preferable that a filtering function and a low-pass filtering function be used at the suppression of the resonance frequency component of the control system, the filtering function having an antiresonant element of the control system.

According to the present invention, it is capable of achieving the improvement in the responsiveness, while suppressing an adverse influence on the stationary characteristics of the electric motor, without having to redesign the existing feedback control.

According to the present invention, it is capable of achieving the improvement in the responsiveness to the actual current without affecting the stability of the system.

According to the present invention, it is capable of achieving highly accurate suppression of occurrence of oscillation, because of suppressing the resonance frequency component in the control system including the torsion bar as the spring element, and the electric motor, the second rotary shaft and the rack shaft as the inertial elements. Thereby, an improvement in the stability of the control system is achievable.

BRIEF DESCRIPTION OF THE DRAWINGS

Exemplary embodiment(s) of the present invention will be described in detail based on the following figures, wherein.

DETAILED DESCRIPTION

Exemplary embodiments of the present invention will be described in detail below with reference to the accompanying drawings.

First Exemplary Embodiment

Figure 1:
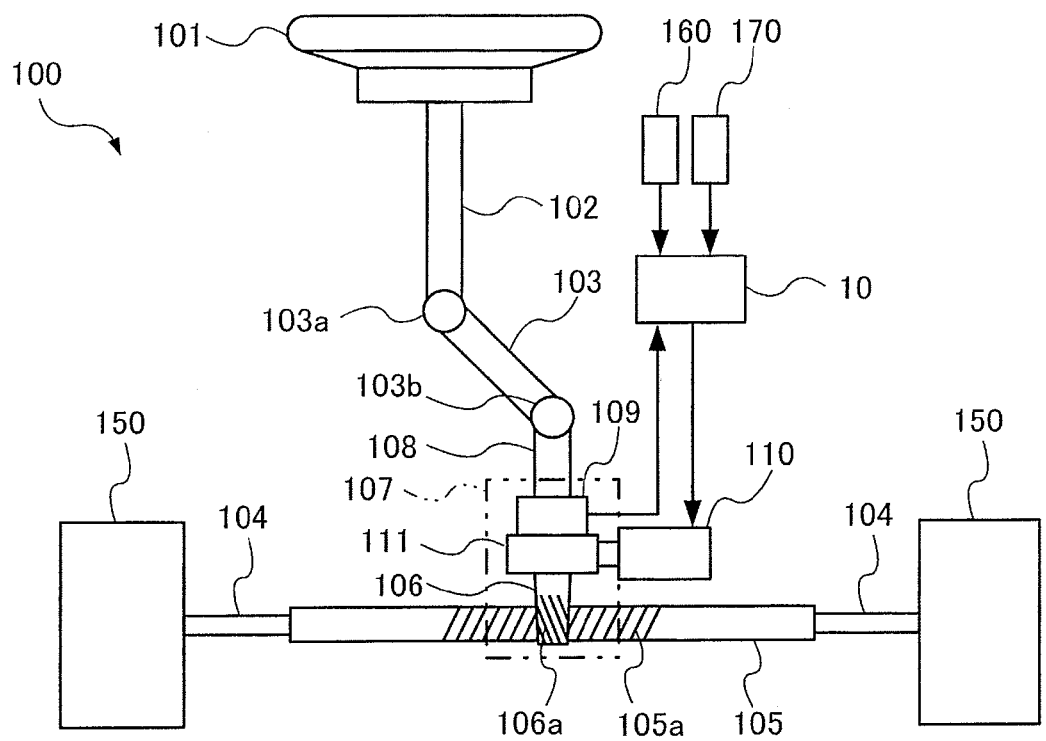
FIG. 1 is a diagram showing an outline configuration of an electric power steering apparatus according to the first exemplary embodiment.

FIG. 1 is a diagram showing an outline configuration of an electric power steering apparatus 100 according to the first exemplary embodiment.

The electric power steering apparatus 100 (hereinafter sometimes called merely the "steering apparatus 100") acts as the steering apparatus for changing the direction of travel of a vehicle into an any direction, and, in the first exemplary embodiment, exemplifies a configuration as applied to an automobile.

The steering apparatus 100 includes a steering wheel 101 in the form of wheel which a driver operates, and a steering shaft 102 provided integrally with the steering wheel 101. The steering shaft 102 and an upper connecting shaft 103 are connected together via a universal coupling 103a, and the upper connecting shaft 103 and a lower connecting shaft 108 are connected together via a universal coupling 103b.

Also, the steering apparatus 100 includes tie rods 104 connected respectively to right and left front wheels 150 as rolling wheels, and a rack shaft 105 connected to the tie rods 104. Also, the steering apparatus 100 includes a pinion 106a that forms a rack-and-pinion mechanism in conjunction with rack teeth 105a formed in the rack shaft 105. The pinion 106a is formed at a lower end portion of a pinion shaft 106.

Also, the steering apparatus 100 includes a steering gear box 107 in which the pinion shaft 106 is housed. In the steering gear box 107, the pinion shaft 106 is connected to the lower connecting shaft 108 via a torsion bar (not shown in the figure). In addition, provided in the steering gear box 107 is a torque sensor 109 as an example of a steering torque detector that detects steering torque of the steering wheel 101 on the basis of a relative angle between the lower connecting shaft 108 and the pinion shaft 106.

Also, the steering apparatus 100 includes an electric motor 110 supported on the steering gear box 107, and a reduction gear mechanism 111 that reduces drive power of the electric motor 110 and transfers the reduced drive power to the pinion shaft 106.

Also, the steering apparatus 100 includes a motor current detector 33 (see FIG. 4) as an example of a current detector that detects the magnitude and direction of an actual current actually passing through the electric motor 110, and a motor voltage detector 160 that detects a terminal-to-terminal voltage of the electric motor 110.

The steering apparatus 100 includes a control device 10 that controls actuation of the electric motor 110. Inputted to the control device 10 are an output value from the above-mentioned torque sensor 109, an output value from a vehicle speed sensor 170 that detects the vehicle speed of the automobile, an output value from the motor current detector 33, and an output value from the motor voltage detector 160.

In the electric power steering apparatus 100 configured as described above, the steering torque applied to the steering wheel 101 is detected by the torque sensor 109, the electric motor 110 is driven in accordance with the detected torque, and torque produced by the electric motor 110 is transmitted to the pinion shaft 106. Thereby, the torque produced by the electric motor 110 assists the application of driver's steering force to the steering wheel 101.

Next, a description will be given with regard to the control device 10.

The control device 10 is an arithmetic logic circuit formed of a CPU, a ROM, a RAM, a backup RAM and the like.

Figure 2:
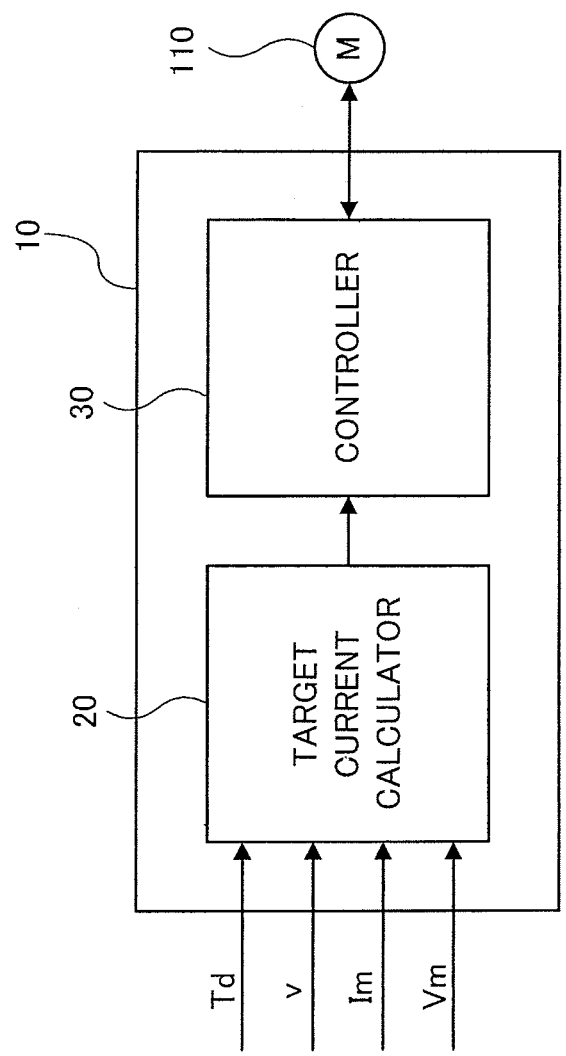
FIG. 2 is a schematic configuration diagram of the control device of the electric power steering apparatus.

FIG. 2 is a schematic configuration diagram of the control device 10 of the electric power steering apparatus 100.

The control device 10 receives a torque signal Td obtained through the conversion of the steering torque detected by the above-mentioned torque sensor 109 into an output signal, and a vehicle speed signal v obtained through the conversion of the vehicle speed detected by the vehicle speed sensor 170 into an output signal.

Also, the control device 10 receives a motor current signal Im obtained through the conversion of the actual current detected by the motor current detector 33 into an output signal, and a terminal-to-terminal voltage signal Vm of the motor, obtained through the conversion of the voltage detected by the motor voltage detector 160 into an output signal.

Incidentally, since the detected signals in analog form are received from the torque sensor 109 and the like, the control device 10 uses an A/D (analog-to-digital) converter (not shown in the figure) to convert the analog signals into digital signals and captures the digital signals in the CPU.

The control device 10 includes a target current calculator 20 that calculates target assist torque on the basis of the torque signal Td and calculates a target current required for the electric motor 110 to supply the target assist torque, and a controller 30 that performs feedback control or the like on the basis of the target current calculated by the target current calculator 20.

Figure 3:
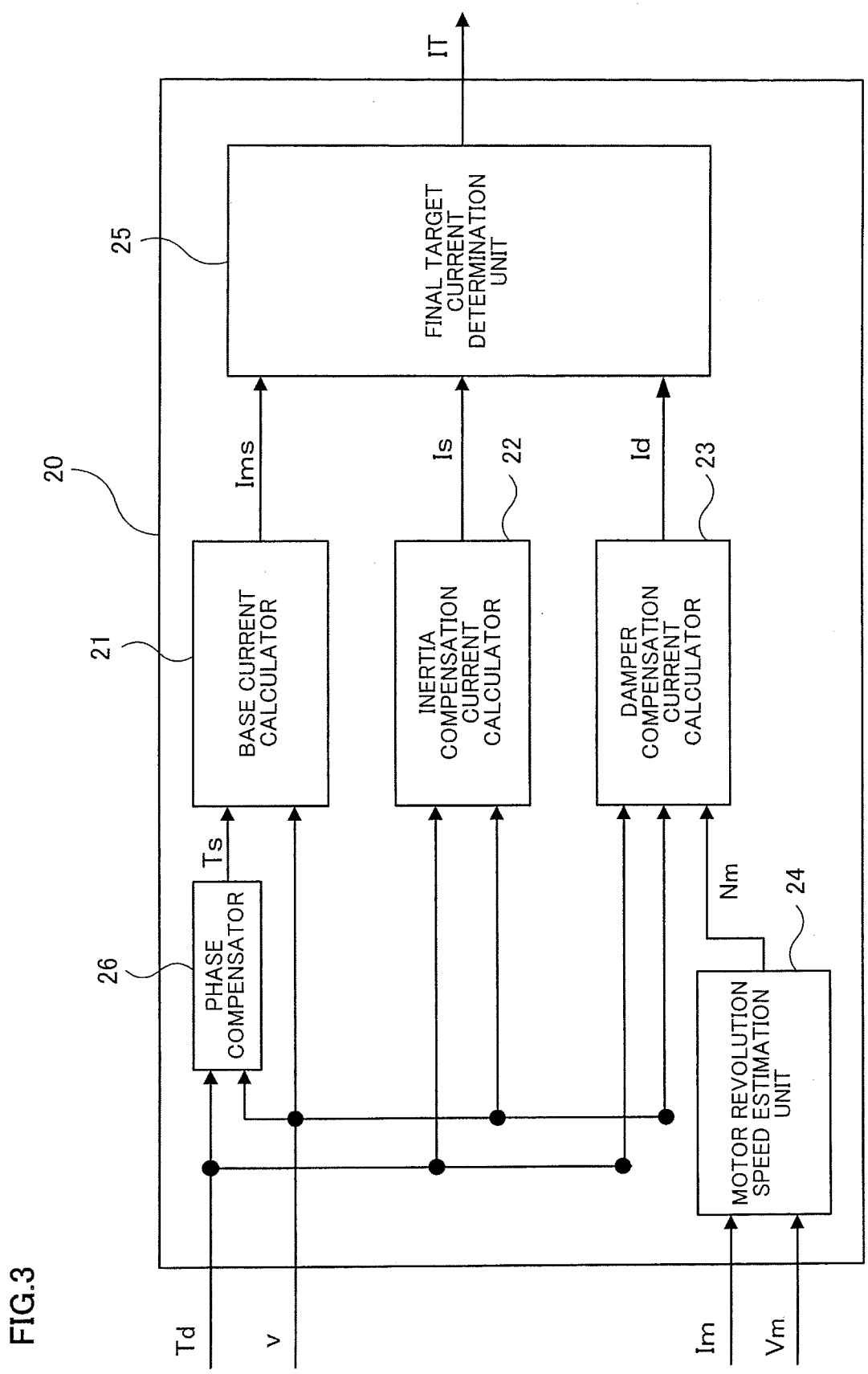
FIG. 3 is a schematic configuration diagram of the target current calculator.

Next, a detailed description will be given with regard to the target current calculator 20. FIG. 3 is a schematic configuration diagram of the target current calculator 20.

The target current calculator 20 includes a base current calculator 21 that calculates a base current for use as a reference for setting the target current, and an inertia compensation current calculator 22 that calculates a current to cancel out the moment of inertia of the electric motor 110. Also, the target current calculator 20 includes a damper compensation current calculator 23 that calculates a current to limit motor revolutions, and a motor revolution speed estimation unit 24 that estimates the revolution speed of the electric motor 110 on the basis of the motor current signal Im and the terminal-to-terminal voltage signal Vm of the motor. Also, the target current calculator 20 includes a final target current determination unit 25 that determines a final target current on the basis of outputs from the base current calculator 21, the inertia compensation current calculator 22, the damper compensation current calculator 23, and so on.

The base current calculator 21 calculates the base current on the basis of a torque signal Ts obtained by a phase compensator 26 providing a phase compensation of the torque signal Td, and the vehicle speed signal v from the vehicle speed sensor 170, and outputs a base current signal Ims containing information on the base current. Incidentally, the calculation of the base current by the base current calculator 21 is accomplished by, for example, substituting the torque signal Ts and the vehicle speed signal v into a map showing the correspondence between a combination of the torque signal Ts and the vehicle speed signal v and the base current, which has previously been created on the basis of an empirical rule and been stored in the ROM.

The inertia compensation current calculator 22 calculates an inertia compensation current to cancel out the moment of inertia of the electric motor 110 and a system, on the basis of the torque signal Td and the vehicle speed signal v, and outputs an inertia compensation current signal Is containing information on the inertia compensation current. Incidentally, the calculation of the inertia compensation current by the inertia compensation current calculator 22 is accomplished by, for example, substituting the torque signal Td and the vehicle speed signal v into a map showing the correspondence between a combination of the torque signal Td and the vehicle speed signal v and the inertia compensation current, which has previously been created on the basis of an empirical rule and been stored in the ROM.

The damper compensation current calculator 23 calculates a damper compensation current to limit the revolutions of the electric motor 110, on the basis of the torque signal Td, the vehicle speed signal v, and a revolution speed signal Nm of the electric motor 110, and outputs a damper compensation current signal Id containing information on the damper compensation current. Incidentally, the calculation of the damper compensation current by the damper compensation current calculator 23 is accomplished by, for example, substituting the torque signal Td, the vehicle speed signal v and the revolution speed signal Nm into a map showing the correspondence between a combination of the torque signal Td, the vehicle speed signal v and the revolution speed signal Nm and the damper compensation current, which has previously been created on the basis of an empirical rule and been stored in the ROM.

The final target current determination unit 25 determines the final target current on the basis of the base current signal Ims outputted by the base current calculator 21, the inertia compensation current signal Is outputted by the inertia compensation current calculator 22, and the damper compensation current signal Id outputted by the damper compensation current calculator 23, and outputs a target current signal IT containing information on the final target current. The calculation of the final target current by the final target current determination unit 25 is accomplished by, for example, substituting a compensation current obtained by adding the inertia compensation current to the base current and also subtracting the damper compensation current from the added result, into a map showing the correspondence between the compensation current and the final target current, which has previously been created on the basis of an empirical rule and been stored in the ROM.

As described above, the target current calculator 20 functions as an example of a target current setting unit that sets the target current to be supplied to the electric motor 110, on the basis of the steering torque detected by the torque sensor 109.

Figure 4:
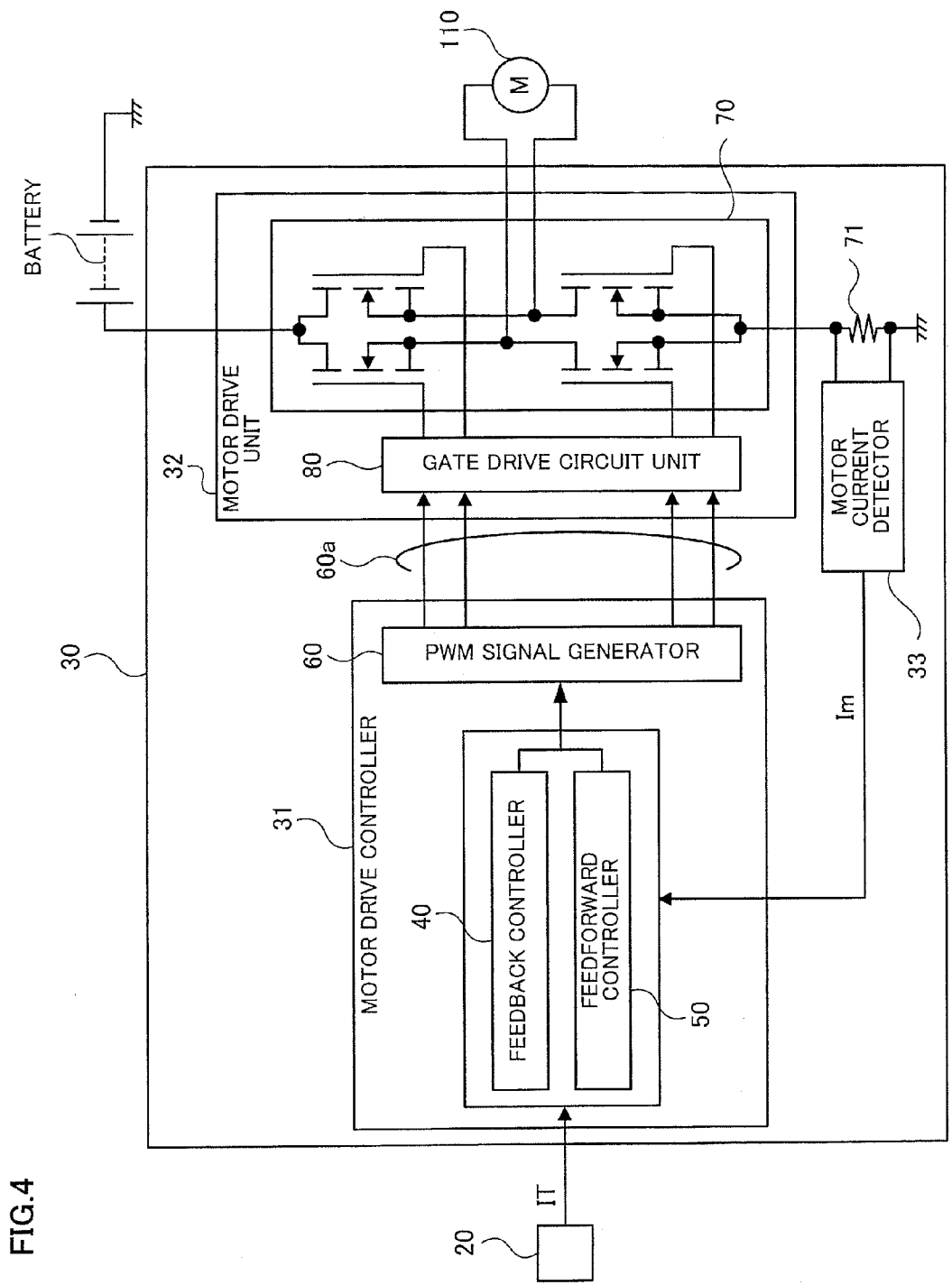
FIG. 4 is a schematic configuration diagram of the controller.

Next, a detailed description will be given with regard to the controller 30. FIG. 4 is a schematic configuration diagram of the controller 30.

The controller 30 includes a motor drive controller 31 that controls the actuation of the electric motor 110, a motor drive unit 32 that drives the electric motor 110, and the motor current detector 33 that detects the actual current actually passing through the electric motor 110.

The motor drive controller 31 includes a feedback (F/B) controller 40 as an example of a feedback controller that performs feedback control on the basis of a deviation between the target current calculated by the target current calculator 20 and the actual current detected by the motor current detector 33 and supplied to the electric motor 110. Also, the motor drive controller 31 includes a feedforward (F/F) controller 50 as an example of a feedforward controller that performs feedforward control on the basis of the target current calculated by the target current calculator 20. The detailed description will be given later with regard to the feedback (F/B) controller 40 and the feedforward (F/F) controller 50.

Further, the motor drive controller 31 includes a pulse width modulation (PWM) signal generator 60 that generates a PWM signal to provide PWM drive to the electric motor 110. The PWM signal generator 60 generates a PWM signal 60a on the basis of output values from the feedforward (F/F)

controller 50 and the feedback (F/B) controller 40, and outputs the generated PWM signal 60a to the motor drive unit 32.

The motor drive unit 32 includes a motor drive circuit 70 formed of four field-effect transistors for electric power connected in the configuration of an H type bridge circuit, and a gate drive circuit unit 80 that drives gates of two field-effect transistors selected from among the four field effect transistors thereby to bring the two selected field-effect transistors into switching operation. The gate drive circuit unit 80 selects two field-effect transistors in accordance with the steering direction of the steering wheel 101, on the basis of a drive control signal (the PWM signal) 60a outputted by the PWM signal generator 60, and brings the two selected field-effect transistors into switching operation.

The motor current detector 33 detects the value of a motor current (or an armature current) passing through the electric motor 110, from a voltage between both ends of a shunt resistor 71 connected in series with the motor drive circuit 70, and outputs the motor current signal Im.

A description will be given with regard to the feedback controller 40 and the feedforward controller 50.

Figure 5:
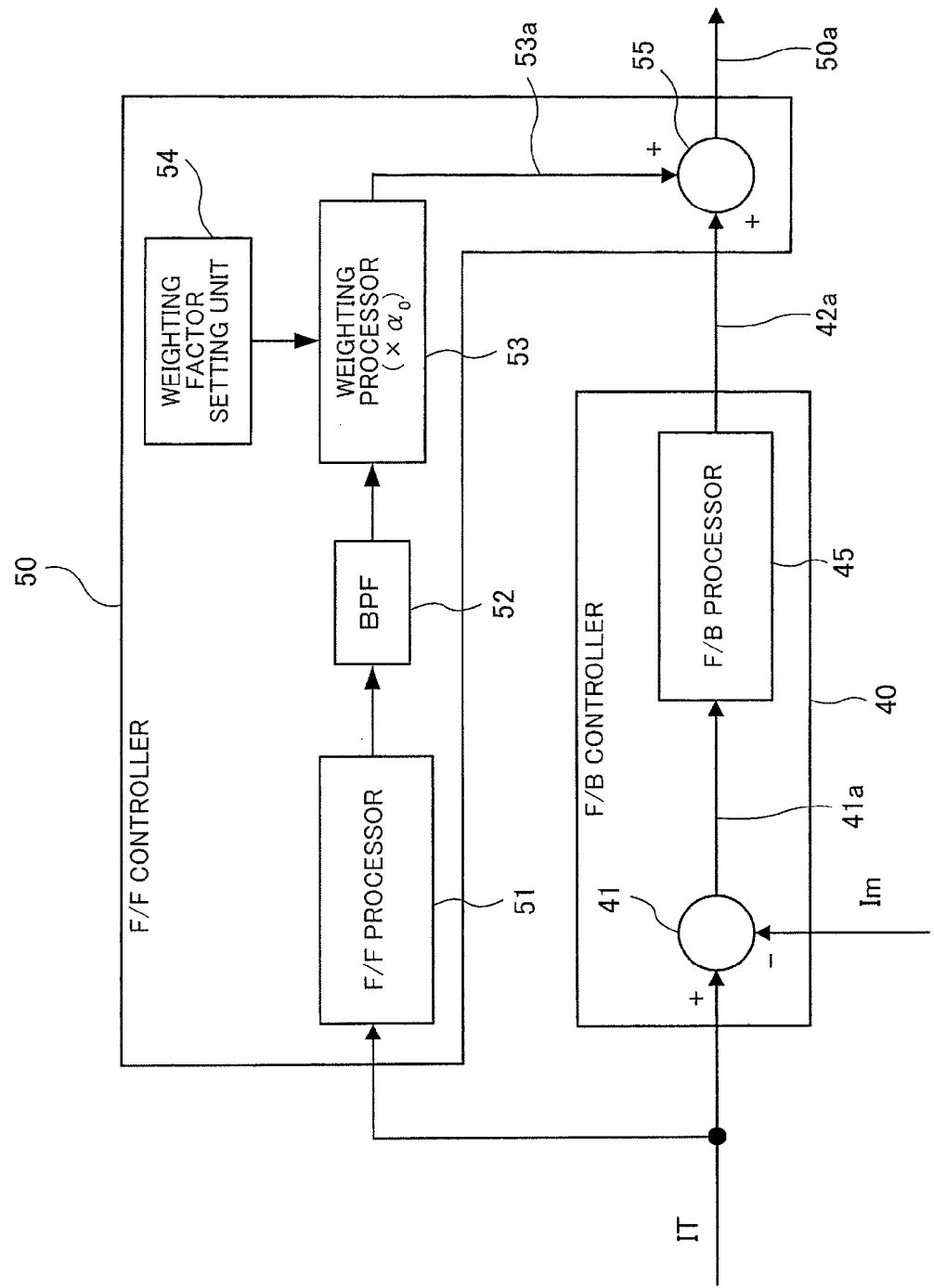
FIG. 5 is a block diagram of the feedback controller and the feedforward controller.

FIG. 5 is a block diagram of the feedback (F/B) controller 40 and the feedforward (F/F) controller 50.

The feedback controller 40 includes a deviation calculator 41 that determines the deviation between the target current calculated by the target current calculator 20 and the actual current detected by the motor current detector 33, and a feedback (F/B) processor 45 that performs feedback processing so that the deviation would become zero.

The deviation calculator 41 outputs, as a deviation signal 41a, the value of the deviation between the output value IT from the target current calculator 20 and the output value Im from the motor current detector 33.

The feedback (F/B) processor 45 serves to perform feedback control so that the actual current would coincide with the target current, and generates and outputs a feedback processing signal 42a by, for example, using a proportional element to perform proportional processing on the inputted deviation signal 41a and output the proportional-processed signal; using an integral element to perform integral processing on the inputted deviation signal 41a and output the integral-processed signal; and using an add operation unit to add these processed signals together.

The feedforward controller 50 is provided in order to improve follow-up characteristics for the target current calculated by the target current calculator 20, and basically provides the output value in accordance with a variation in the target current.

The feedforward controller 50 includes a feedforward (F/F) processor 51 that performs feedforward processing on the target current calculated by the target current calculator 20, and a band-pass filter (BPF) 52 as an example of a frequency compensator that effects a change in a feedforward effect in accordance with the frequency of a signal outputted by the feedforward (F/F) processor 51.

Further, the feedforward controller 50 includes a weighting processor 53 as an example of a weighting processor that performs weighting on an output value from the band-pass filter 52, and a weighting factor setting unit 54 as an example of a weighting factor setting unit that sets a weighting factor $\alpha_0$ used for the weighting processor 53 to perform processing.

Further, the feedforward controller 50 includes an adder 55 that adds together an output value 53a from the weighting processor 53 and the output value 42a from the feedback controller 40 and outputs a resultant value 50a to the PWM signal generator 60.

The feedforward (F/F) processor 51 performs processing such that its transfer function is given as an inverse function of a transfer function of the electric motor 110. In short, the transfer function H(s) of the feedforward processor 51 is given as H(s)=1/G(s), where G(s) represents the transfer function of the electric motor 110. For instance, if the transfer function G(s) of the electric motor 110 is expressed by Equation (1) below, the transfer function H(s) of the feedforward processor 51 is expressed by Equation (2) below:

$$G(s)=Jm \times s/(Jm \times L \times s^2 + Jm \times R \times s + Ke \times Kt) \quad (1)$$

$$H(s)=(Jm \times L \times s^2 + Jm \times R \times s + Ke \times Kt)/(Jm \times s) \quad (2)$$

where Jm denotes the inertia of a motor shaft of the electric motor 110; Kt, a motor torque constant of the electric motor 110; and Ke, an induction voltage constant of the electric motor 110. Incidentally, s denotes an operator for a Laplace transform.

Figure 6:
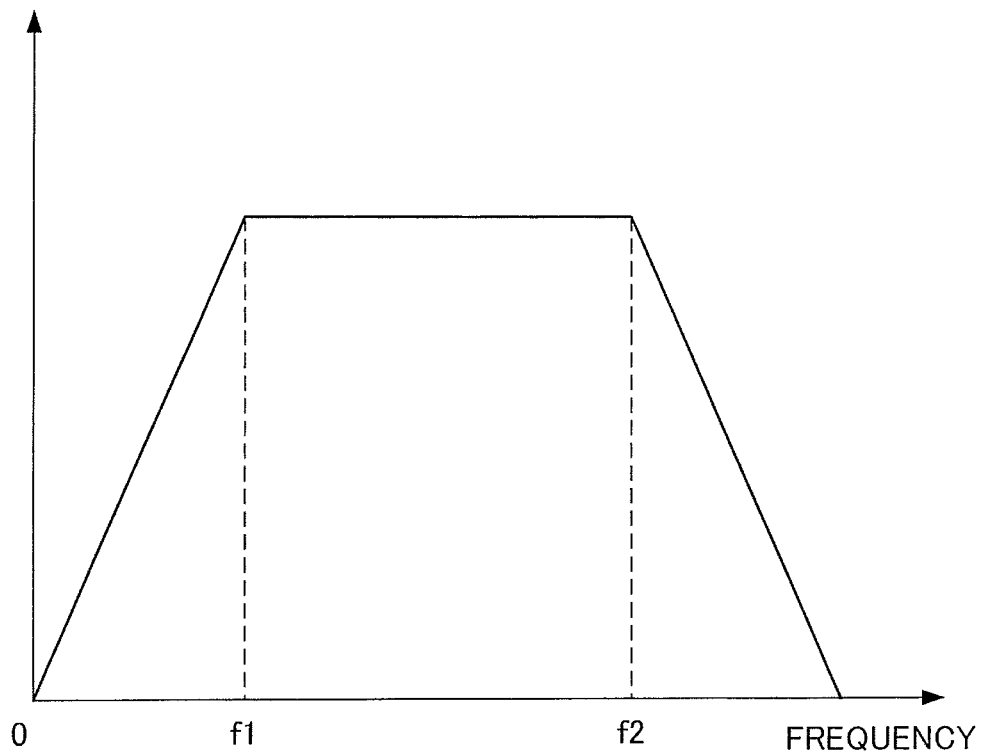
FIG. 6 is a graph showing characteristics of the band-pass filter as employed in the first exemplary embodiment.

The band-pass filter (BPF) 52 is the filter that transmits a required range of frequencies alone but does not transmit (or attenuates) frequencies outside this range. FIG. 6 is a graph showing characteristics of the band-pass filter 52 as employed in the first exemplary embodiment. The band-pass filter 52 according to the first exemplary embodiment has a transmission region of frequencies between f1 and f2 but does not transmit or attenuates frequencies outside this region, as shown in FIG. 6. In a region of lower frequencies than f1, therefore, the output value from the feedforward processor 51 attenuates more as the frequency gets lower. In a region of higher frequencies than f2, also, the output value from the feedforward processor 51 attenuates more as the frequency gets higher.

Incidentally, f1 and f2 may be set at 5 Hz and 100 Hz, respectively, by way of example. Setting f2 at 100 Hz permits the suppression of the adverse influence of noise components upon steer feeling of the steering wheel 101, even if noise is contained in the torque signal Td or the like. Incidentally, at least any one of a low-pass filter (LPF) and a high-pass filter (HPF) may be provided as appropriate in place of the band-pass filter (BPF) 52.

The weighting processor 53 performs the processing of multiplying the output value from the band-pass filter 52 by the weighting factor $\alpha_0$ set by the weighting factor setting unit 54.

Figure 7:
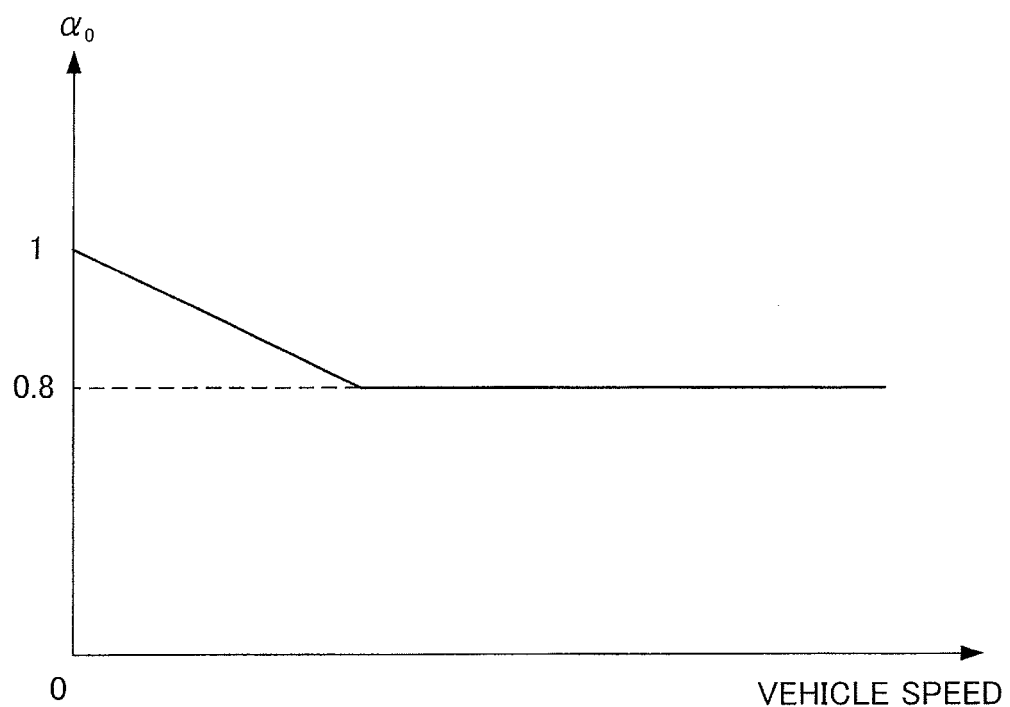
FIG. 7 is a graph showing the relationship between the weighting factor $\alpha_0$ and the vehicle speed.

The weighting factor setting unit 54 calculates the weighting factor $\alpha_0$ on the basis of the vehicle speed signal v. FIG. 7 is a graph showing the relationship between the weighting factor $\alpha_0$ and the vehicle speed. The optimum weighting factor $\alpha_0$ for the vehicle speed is derived in advance on the basis of an empirical rule, as shown in FIG. 7. Then, the weighting factor setting unit 54 calculates and sets the weighting factor $\alpha_0$ by substituting the vehicle speed signal v into a map showing the correspondence between the vehicle speed signal v and the weighting factor $\alpha_0$, or a relational expression of the vehicle speed signal v and the weighting factor $\alpha_0$, which has previously been created and stored in the ROM.

Figure 8:
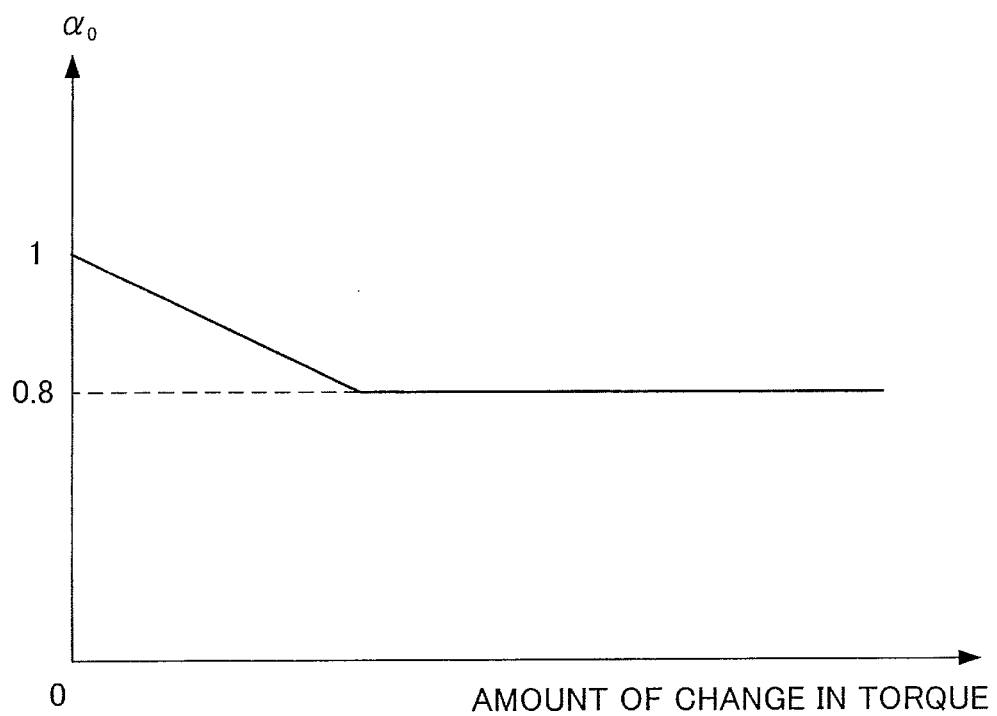
FIG. 8 is a graph showing the relationship between the weighting factor $\alpha_0$ and the amount of change in the torque of the steering wheel.

Also, the weighting factor setting unit 54 may calculate the weighting factor $\alpha_0$ on the basis of the torque signal Td. FIG. 8 is a graph showing the relationship between the weighting factor $\alpha_0$ and the amount of change in the torque of the steering wheel 101. The optimum weighting factor $\alpha_0$ for the amount of change in the torque of the steering wheel 101 is derived in advance on the basis of an empirical rule, as shown in FIG. 8. Then, the weighting factor setting unit 54 calculates the weighting factor $\alpha_0$ by substituting the amount of torque change derived from the torque signal Td into a map showing the correspondence between the amount of change in the torque of the steering wheel 101 and the weighting factor $\alpha_0$, which has previously been created and stored in the ROM. Alternatively, the calculation of the weighting factor $\alpha_0$ may be accomplished by substituting the amount of torque change into a relational expression of the amount of torque change and the weighting factor $\alpha_0$, which has previously been created. Incidentally, a differential value of the torque signal Td may be calculated as the amount of torque change.

Also, it is preferable that the weighting factor setting unit 54 calculate the weighting factor $\alpha_0$ on the basis of the vehicle speed signal v and the torque signal Td. Also in such an instance, the relationship between a combination of the vehicle speed signal v and the amount of change in the torque of the steering wheel 101 and the optimum weighting factor $\alpha_0$ is derived in advance on the basis of an empirical rule. Then, a map showing the correspondence therebetween is created and stored in the ROM in advance, and the weighting factor setting unit 54 calculates the weighting factor $\alpha_0$ by substituting the vehicle speed signal v and the amount of torque change into the map. Alternatively, the calculation of the weighting factor $\alpha_0$ may be accomplished by substituting the vehicle speed signal v and torque variation into a relational expression of a combination of the vehicle speed signal v and the amount of torque change and the weighting factor $\alpha_0$, which has previously been created.

A description will be given below with regard to function of the electric power steering apparatus 100 configured as described above.

Figure 9:
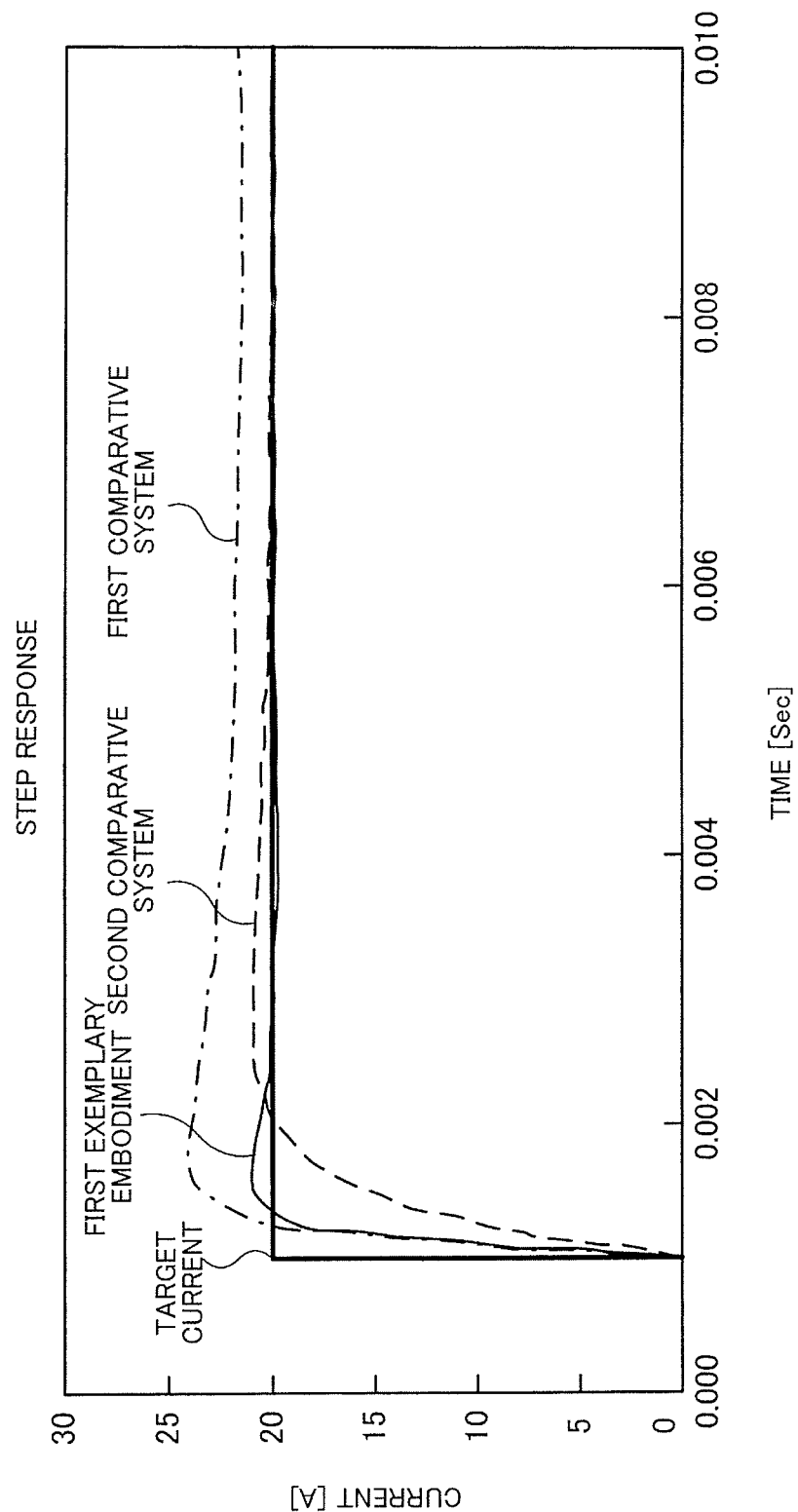
FIG. 9 is a graph showing a comparison of step response.

FIG. 9 is a graph showing a comparison of step response.

In FIG. 9, the step response to the output value 50a from the feedforward controller 50 and the feedback (F/B) controller 40 of the controller 30 according to the first exemplary embodiment is shown by the solid line, provided that the target current calculated by the target current calculator 20 is taken as a step function. Also, the step response to the output value 50a in a system (a first comparative system) in which the band-pass filter 52, the weighting processor 53 and the weighting factor setting unit 54 are excluded from the feedforward controller 50 according to the first exemplary embodiment is shown by the dashed dotted line. Also, the step response to the output value from the feedback controller 40 in a system (a second comparative system) in which the feedforward controller 50 is excluded from the controller 30 according to the first exemplary embodiment, that is, the feedback controller 40 alone is provided, is shown by the dash line. These step responses are compared to the step response to the target current shown by the solid thick line (the thick line).

As shown in FIG. 9, the controller 30 according to the first exemplary embodiment, because of being provided with the feedforward controller 50, has better responsiveness than the second comparative system provided with the feedback controller 40 alone. Also, in a steady state, the feedforward controller 50 of the controller 30 according to the first exemplary embodiment is closer to the target current than the first comparative system. This is due to the fact that because the band-pass filter 52 cancels or attenuates the output value in a lower frequency range, the feedforward effect is also canceled or attenuated. In other words, by the band-pass filter 52, the amount of increase in the actual current by the feedforward controller 50 becomes smaller, as the frequency of variation in the target current is lower.

Therefore, for example, when the steering wheel 101 makes a transition from a state in which it is held in a given position to a rotating state, the output value from the feedforward controller 50 varies, following a variation in the output value IT from the target current calculator 20. Hence, an input value to the PWM signal generator 60 is larger than that of the system provided with the feedback controller 40 alone without the provision of the feedforward controller 50, which in turn achieves an improvement in responsiveness to operation of the steering wheel 101.

Also, the weighting factor $\alpha_0$ is determined in accordance with the vehicle speed as shown in FIG. 7, thereby to achieve an improvement in the responsiveness to the operation of the steering wheel 101 under low-speed driving such as a situation where the automobile is put in a garage. On the other hand, under high-speed driving, the responsiveness is reduced, and thus, the operation of the steering wheel 101 becomes stabilized.

Also, the weighting factor $\alpha_0$ is determined in accordance with the torque variation as shown in FIG. 8, thereby to achieve an improvement in the responsiveness to the operation of the steering wheel 101 when the operation of the steering wheel 101 is relatively slowly performed, such as when the automobile is put in the garage. On the other hand, under abrupt steering, the responsiveness is reduced, and thus, safety is provided.

On the other hand, for example, when the steering wheel 101 is held in a given position or is slowly operated, the band-pass filter 52 cancels or attenuates the feedforward effect. In other words, by the band-pass filter 52, the amount of increase in the actual current by the feedforward controller 50 becomes smaller, as the frequency of variation in the target current is lower. Hence, the input value to the PWM signal generator 60 is the same as that of the system provided with the feedback controller 40 alone without the provision of the feedforward controller 50, or does not increase greatly even if increased, and thus is stable.

As described above, the electric power steering apparatus 100 according to the first exemplary embodiment is capable of achieving the improvement in the responsiveness, while suppressing an adverse influence on stationary characteristics of the electric motor 110. Also, the addition of the feedforward controller 50 according to the first exemplary embodiment to the controller provided with the feedback controller 40 alone permits achieving the above-mentioned effect without having to redesign the feedback controller 40.

Second Exemplary Embodiment

Figure 10:
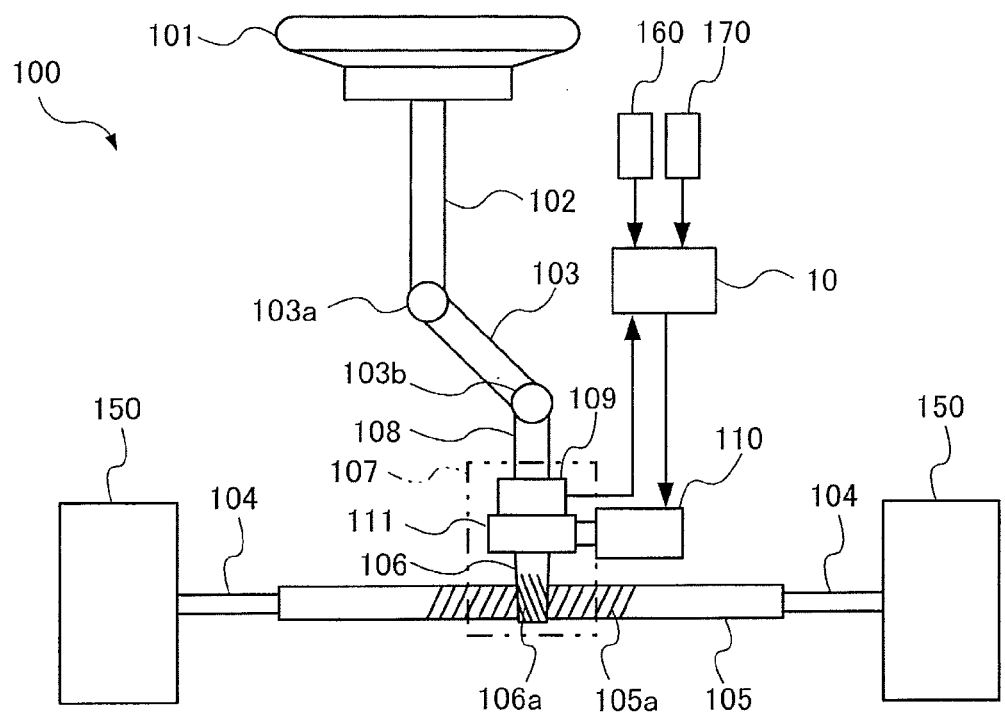
FIG. 10 is a diagram showing an outline configuration of an electric power steering apparatus according to the second exemplary embodiment.

FIG. 10 is a diagram showing an outline configuration of an electric power steering apparatus 100 according to the second exemplary embodiment.

The electric power steering apparatus 100 (hereinafter sometimes called merely the "steering apparatus 100") acts as the steering apparatus for changing the direction of travel of a vehicle into an any direction, and, in the second exemplary embodiment, exemplifies a configuration as applied to an automobile.

The steering apparatus 100 includes a steering wheel 101 in the form of wheel which a driver operates, and a steering shaft 102 provided integrally with the steering wheel 101. The steering shaft 102 and an upper connecting shaft 103 are connected together via a universal coupling 103a, and the upper connecting shaft 103 and a lower connecting shaft 108 are connected together via a universal coupling 103b.

Also, the steering apparatus 100 includes tie rods 104 connected respectively to right and left front wheels 150 as rolling wheels, and a rack shaft 105 connected to the tie rods 104. Also, the steering apparatus 100 includes a pinion 106a that forms a rack-and-pinion mechanism in conjunction with rack teeth 105a formed in the rack shaft 105. The pinion 106a is formed at a lower end portion of a pinion shaft 106.

Also, the steering apparatus 100 includes a steering gear box 107 in which the pinion shaft 106 is housed. In the steering gear box 107, the pinion shaft 106 is connected to the lower connecting shaft 108 via a torsion bar (not shown in the figure). In addition, provided in the steering gear box 107 is a torque sensor 109 as an example of a steering torque detector that detects steering torque of the steering wheel 101 on the basis of a relative angle between the lower connecting shaft 108 and the pinion shaft 106.

Also, the steering apparatus 100 includes an electric motor 110 supported on the steering gear box 107, and a reduction gear mechanism 111 that reduces drive power of the electric motor 110 and transfers the reduced drive power to the pinion shaft 106.

Also, the steering apparatus 100 includes a motor current detector 33 (see FIG. 13) as an example of a current detector that detects the magnitude and direction of an actual current actually passing through the electric motor 110, and a motor voltage detector 160 that detects a terminal-to-terminal voltage of the electric motor 110.

The steering apparatus 100 includes a control device 10 that controls actuation of the electric motor 110. Inputted to the control device 10 are an output value from the above-mentioned torque sensor 109, an output value from a vehicle speed sensor 170 that detects the vehicle speed of the automobile, an output value from the motor current detector 33, and an output value from the motor voltage detector 160.

In the electric power steering apparatus 100 configured as described above, the steering torque applied to the steering wheel 101 is detected by the torque sensor 109, the electric motor 110 is driven in accordance with the detected torque, and torque produced by the electric motor 110 is transmitted to the pinion shaft 106. Thereby, the torque produced by the electric motor 110 assists the application of driver's steering force to the steering wheel 101.

Next, a description will be given with regard to the control device 10.

The control device 10 is an arithmetic logic circuit formed of a CPU, a ROM, a RAM, a backup RAM and the like.

Figure 11:
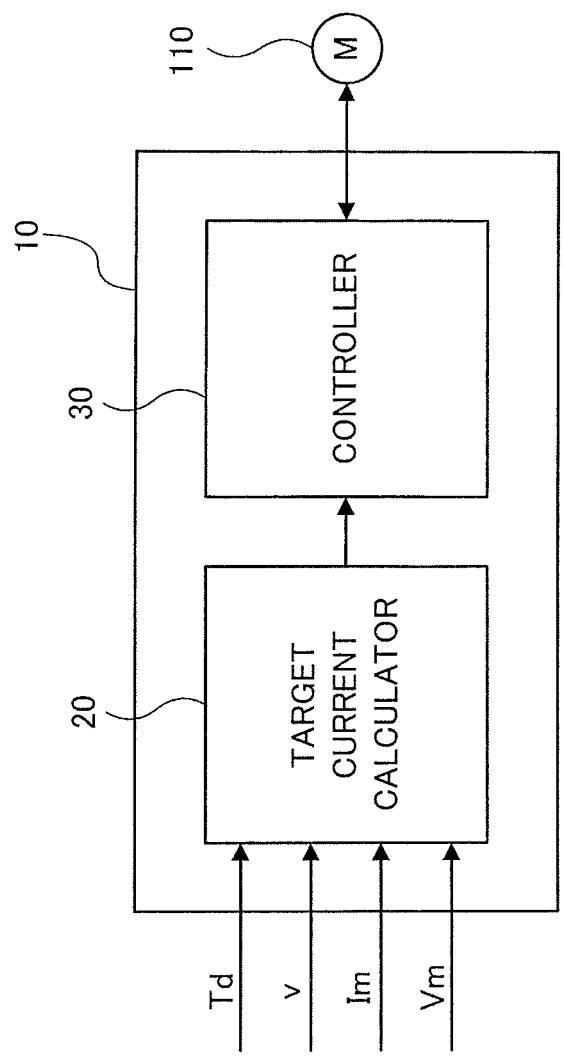
FIG. 11 is a schematic configuration diagram of the control device of the electric power steering apparatus.

FIG. 11 is a schematic configuration diagram of the control device 10 of the electric power steering apparatus 100.

The control device 10 receives a torque signal Td obtained through the conversion of the steering torque detected by the above-mentioned torque sensor 109 into an output signal, and a vehicle speed signal v obtained through the conversion of the vehicle speed detected by the vehicle speed sensor 170 into an output signal.

Also, the control device 10 receives a motor current signal Im obtained through the conversion of the actual current detected by the motor current detector 33 into an output signal, and a terminal-to-terminal voltage signal Vm of the motor, obtained through the conversion of the voltage detected by the motor voltage detector 160 into an output signal.

Incidentally, since the detected signals in analog form are received from the torque sensor 109 and the like, the control device 10 uses an A/D (analog-to-digital) converter (not shown in the figure) to convert the analog signals into digital signals and captures the digital signals in the CPU.

The control device 10 includes a target current calculator 20 that calculates target assist torque on the basis of the torque signal Td and calculates a target current required for the electric motor 110 to supply the target assist torque, and a controller 30 that performs feedback control or the like on the basis of the target current calculated by the target current calculator 20.

Figure 12:
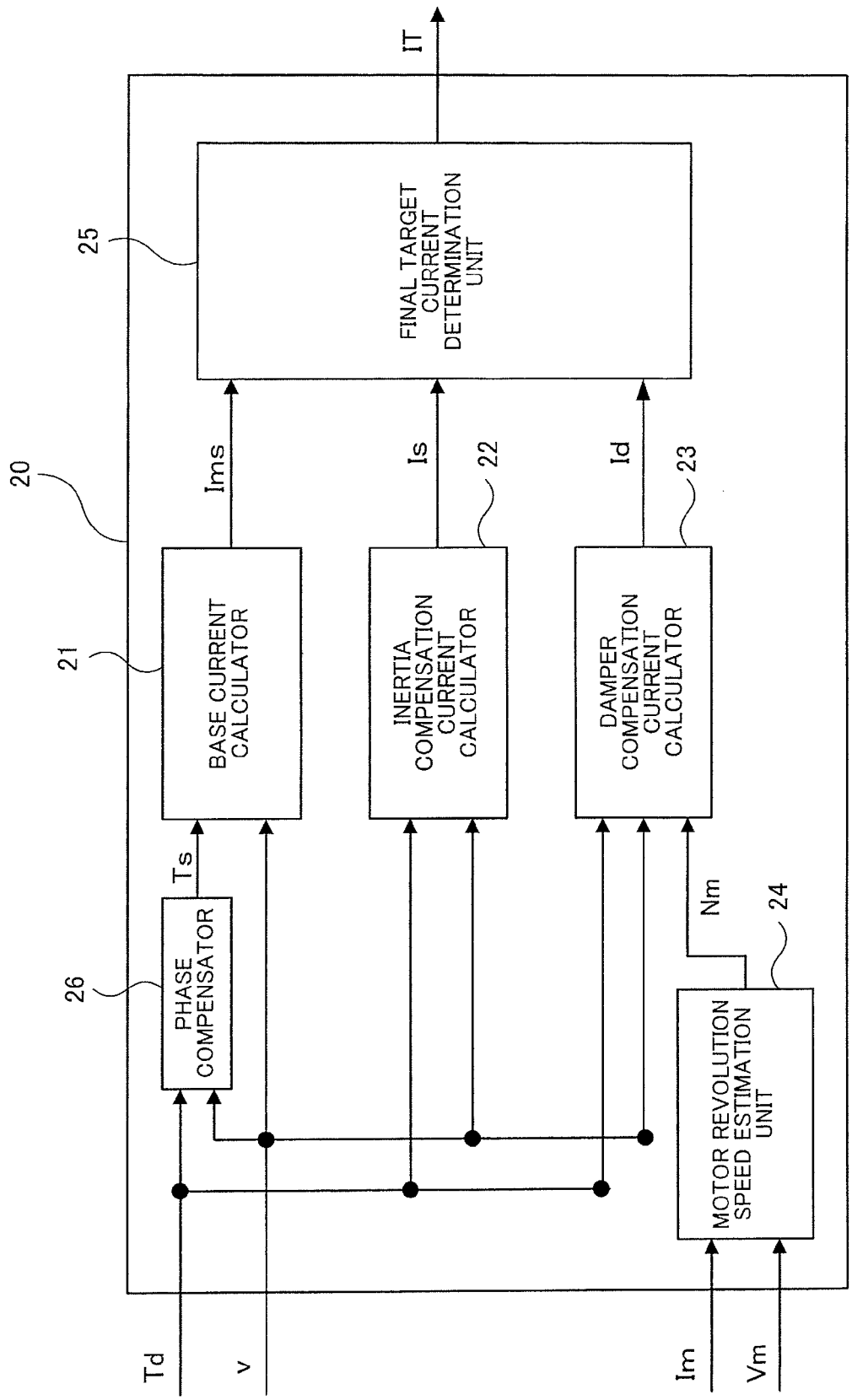
FIG. 12 is a schematic configuration diagram of the target current calculator.

Next, a detailed description will be given with regard to the target current calculator 20. FIG. 12 is a schematic configuration diagram of the target current calculator 20.

The target current calculator 20 includes a base current calculator 21 that calculates a base current for use as a reference for setting the target current, and an inertia compensation current calculator 22 that calculates a current to cancel out the moment of inertia of the electric motor 110. Also, the target current calculator 20 includes a damper compensation current calculator 23 that calculates a current to limit motor revolutions, and a motor revolution speed estimation unit 24 that estimates the revolution speed of the electric motor 110 on the basis of the motor current signal Im and the terminal-to-terminal voltage signal Vm of the motor. Also, the target current calculator 20 includes a final target current determination unit 25 that determines a final target current on the basis of outputs from the base current calculator 21, the inertia compensation current calculator 22, the damper compensation current calculator 23, and so on.

The base current calculator 21 calculates the base current on the basis of a torque signal Ts obtained by a phase compensator 26 providing a phase compensation of the torque signal Td, and the vehicle speed signal v from the vehicle speed sensor 170, and outputs a base current signal Ims containing information on the base current. Incidentally, the calculation of the base current by the base current calculator 21 is accomplished by, for example, substituting the torque signal Ts and the vehicle speed signal v into a map showing the correspondence between a combination of the torque signal Ts and the vehicle speed signal v and the base current, which has previously been created on the basis of an empirical rule and been stored in the ROM.

The inertia compensation current calculator 22 calculates an inertia compensation current to cancel out the moment of inertia of the electric motor 110 and a system, on the basis of the torque signal Td and the vehicle speed signal v, and outputs an inertia compensation current signal Is containing information on the inertia compensation current. Incidentally, the calculation of the inertia compensation current by the inertia compensation current calculator 22 is accomplished by, for example, substituting the torque signal Td and the vehicle speed signal v into a map showing the correspondence between a combination of the torque signal Td and the vehicle speed signal v and the inertia compensation current, which has previously been created on the basis of an empirical rule and been stored in the ROM.

The damper compensation current calculator 23 calculates a damper compensation current to limit the revolutions of the electric motor 110, on the basis of the torque signal Td, the vehicle speed signal v, and a revolution speed signal Nm of the electric motor 110, and outputs a damper compensation current signal Id containing information on the damper compensation current. Incidentally, the calculation of the damper compensation current by the damper compensation current calculator 23 is accomplished by, for example, substituting the torque signal Td, the vehicle speed signal v and the revolution speed signal Nm into a map showing the correspondence between a combination of the torque signal Td, the vehicle speed signal v and the revolution speed signal Nm and the damper compensation current, which has previously been created on the basis of an empirical rule and been stored in the ROM.

The final target current determination unit 25 determines the final target current on the basis of the base current signal Ims outputted by the base current calculator 21, the inertia compensation current signal Is outputted by the inertia compensation current calculator 22, and the damper compensation current signal Id outputted by the damper compensation current calculator 23, and outputs a target current signal IT containing information on the final target current. The calculation of the final target current by the final target current determination unit 25 is accomplished by, for example, substituting a compensation current obtained by adding the inertia compensation current to the base current and also subtracting the damper compensation current from the added result, into a map showing the correspondence between the compensation current and the final target current, which has previously been created on the basis of an empirical rule and been stored in the ROM.

As described above, the target current calculator 20 functions as an example of a target current setting unit that sets the target current to be supplied to the electric motor 110, on the basis of the steering torque detected by the torque sensor 109.

Figure 13:
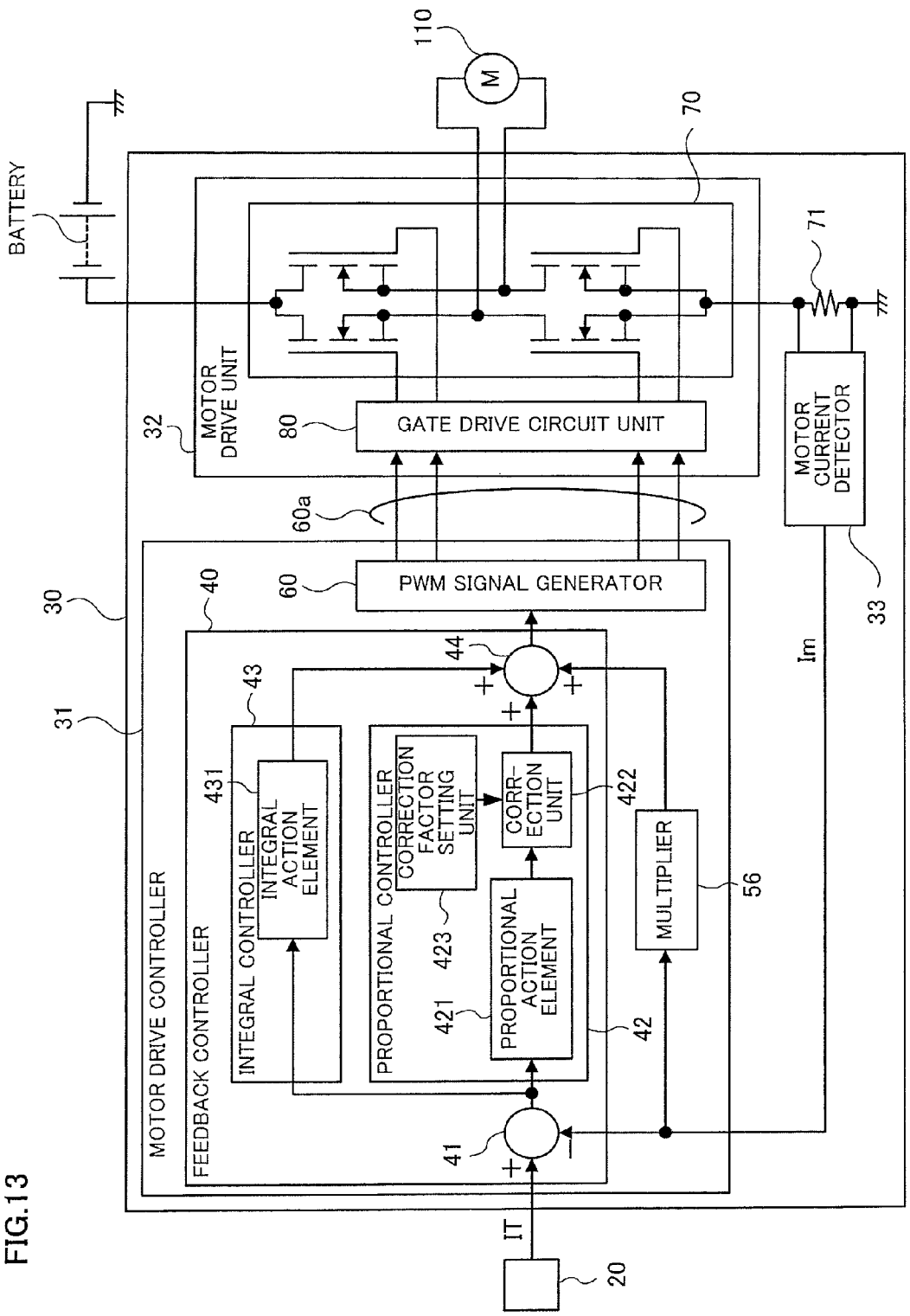
FIG. 13 is a schematic configuration diagram of the controller.

Next, a detailed description will be given with regard to the controller 30. FIG. 13 is a schematic configuration diagram of the controller 30.

The controller 30 includes a motor drive controller 31 that controls the actuation of the electric motor 110, a motor drive unit 32 that drives the electric motor 110, and the motor current detector 33 that detects the actual current actually passing through the electric motor 110.

The motor drive controller 31 includes a feedback (F/B) controller 40 that performs the feedback control on the basis of the deviation between the target current calculated by the target current calculator 20 and the actual current detected by the motor current detector 33 and supplied to the electric motor 110. Also, the motor drive controller 31 includes a multiplier 56 that multiplies, by a factor, the actual current detected by the motor current detector 33. A detailed description will be given later with regard to the feedback (F/B) controller 40 and the multiplier 56.

Further, the motor drive controller 31 includes a pulse width modulation (PWM) signal generator 60 that generates a PWM signal to provide PWM drive to the electric motor 110. The PWM signal generator 60 generates a PWM signal 60a on the basis of an output value from the feedback controller 40, and outputs the generated PWM signal 60a to the motor drive unit 32.

The motor drive unit 32 includes a motor drive circuit 70 formed of four field-effect transistors for electric power connected in the configuration of an H type bridge circuit, and a gate drive circuit unit 80 that drives gates of two field-effect transistors selected from among the four field effect transistors thereby to bring the two selected field-effect transistors into switching operation. The gate drive circuit unit 80 selects two field-effect transistors in accordance with the steering direction of the steering wheel 101, on the basis of a drive control signal (the PWM signal 60a) outputted by the PWM signal generator 60, and brings the two selected field-effect transistors into switching operation.

The motor current detector 33 detects the value of a motor current (or an armature current) passing through the electric motor 110, from a voltage between both ends of a shunt resistor 71 connected in series with the motor drive circuit 70, and outputs the motor current signal Im.

Next, a description will be given with regard to the feedback controller 40 and the multiplier 56.

The feedback controller 40 includes a deviation calculator 41 that determines the deviation between the target current calculated by the target current calculator 20 and the actual current detected by the motor current detector 33. Also, the feedback controller 40 includes a proportional controller 42 that performs a proportional action on the current deviation calculated by the deviation calculator 41, an integral controller 43 that performs an integral action on the current deviation calculated by the deviation calculator 41, and an adder 44 that adds together an output value from the proportional controller 42 and an output value from the integral controller 43.

The deviation calculator 41 outputs the value of the deviation between the output value IT from the target current calculator 20 and the output value Im from the motor current detector 33.

The proportional controller 42 functions as an example of a proportional controller, and includes a proportional action element 421 that multiplies, by proportional gain Kp, the deviation between the output value IT from the target current calculator 20 and the output value Im from the motor current detector 33. Also, the proportional controller 42 includes a correction unit 422 as an example of a correction unit that multiplies an output value from the proportional action element 421 by a correction factor $\alpha$, and a correction factor setting unit 423 that sets the correction factor $\alpha$ used for the correction unit 422 to perform processing.

Figure 14:
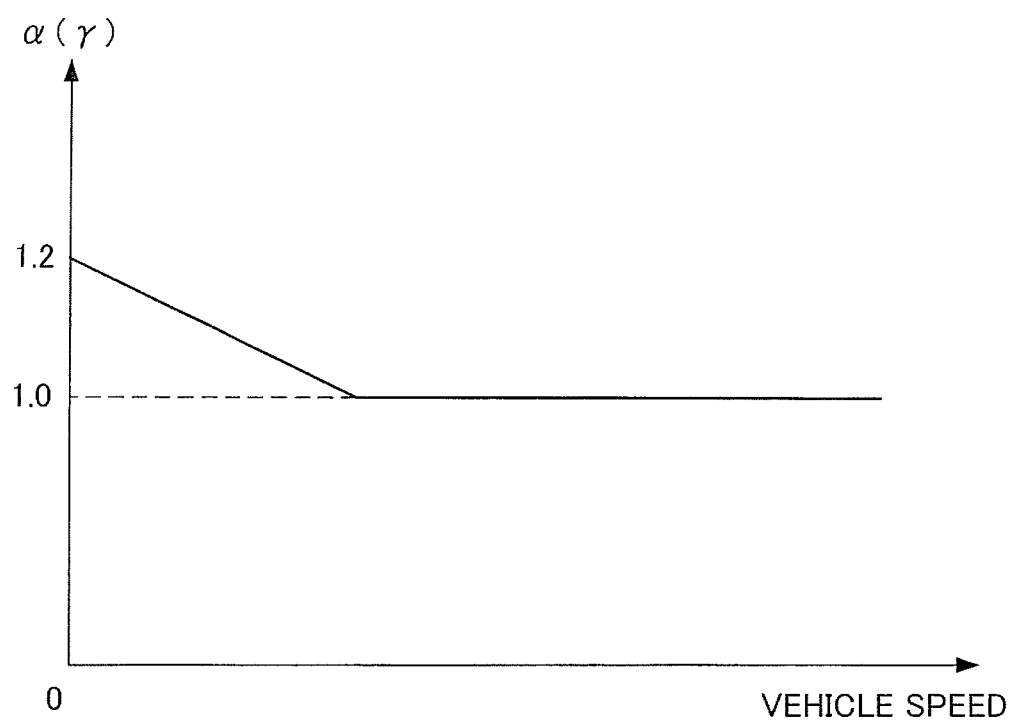
FIG. 14 is a graph showing the relationship between the correction factor α and the vehicle speed.

The correction factor setting unit 423 calculates the correction factor $\alpha$, for example, on the basis of the vehicle speed signal v. FIG. 14 is a graph showing the relationship between the correction factor $\alpha$ and the vehicle speed. The optimum correction factor $\alpha$ in accordance with the vehicle speed is derived in advance on the basis of an empirical rule, as shown in FIG. 14. Then, the correction factor setting unit 423 calculates and sets the correction factor $\alpha$ by substituting the vehicle speed signal v into a map showing the correspondence between the vehicle speed signal v and the correction factor $\alpha$, or the relational expression of the vehicle speed signal v and the correction factor $\alpha$, which has previously been created and been stored in the ROM. Incidentally, as shown in FIG. 14, the correction factor $\alpha$ is 1.2 when the vehicle speed is zero, and preferably, the correction factor $\alpha$ decreases to 1 as the vehicle speed becomes higher, and the correction factor $\alpha$ is 1 when the vehicle speed is equal to or more than a given speed.

The correction factor setting unit 423 sets the correction factor $\alpha$ at a value equal to or more than 1, and thereby, the correction unit 422 multiplies the output value from the proportional action element 421 by the correction factor $\alpha$, thereby to enhance the effect of the proportional action performed by the proportional action element 421.

The integral controller 43 functions as an example of an integral controller, and is formed of an integral action element 431 that performs the integral action of multiplying, by integral gain Ki, the integral value obtained by integrating the deviation between the output value IT from the target current calculator 20 and the output value Im from the motor current detector 33.

The adder 44 functions as an example of an addition unit that adds together the output value from the proportional controller 42, the output value from the integral controller 43 and the output value from the multiplier 56, and outputs the addition result. The output value from the adder 44 is a base of a command value to the electric motor 110, and the PWM signal generator 60 generates the PWM signal 60a on the basis of the output value from the adder 44 and outputs the generated PWM signal 60a to the motor drive unit 32.

The multiplier 56 calculates a proportional factor $\beta$ on the basis of the correction factor $\alpha$ set by the correction factor setting unit 423, multiplies, by the proportional gain Kp and the proportional factor $\beta$, the actual current detected by the motor current detector 33, and outputs the multiplication result. The proportional factor β is the factor depending on the correction factor α, and is a value obtained by subtracting 1 from the correction factor α, that is, α−1. Hence, the multiplier 56 multiplies, by "Kp×(α−1)," the actual current detected by the motor current detector 33, and outputs the multiplication result.

The multiplier 56 functions as an adjusting unit that makes an adjustment so that a denominator of the transfer function would remain constant regardless of the value of the correction factor α, when the target current set by the target current calculator 20 is taken as an input and the actual current actually supplied to the electric motor 110 is taken as an output. This is proved by Equation (101) given below.

Figure 15:
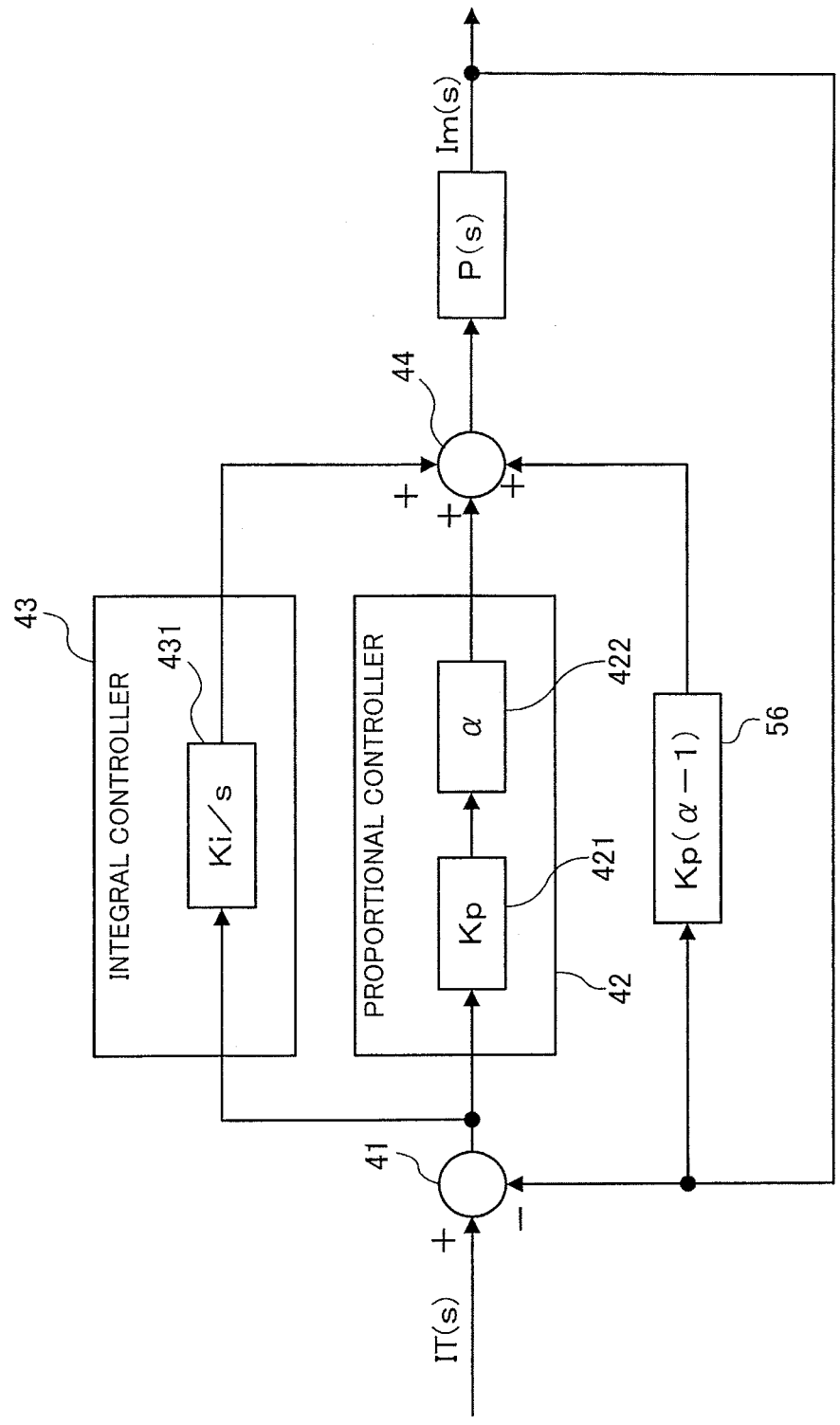
FIG. 15 is a simple block diagram of the controller.

FIG. 15 is a simple block diagram of the controller 30. As shown in FIG. 15, IT(s) represents Laplace transform of the output value IT from the target current calculator 20 (see FIG. 13), Im(s) represents Laplace transform of the output value Im from the motor current detector 33, and P(s) represents in simple form a transfer function of the PWM signal generator 60, the motor drive unit 32 and the electric motor 110.

A transfer function H(s) from IT(s) to Im(s) is expressed by Equation (101).

$$H(s) = \frac{\alpha s + \left(\frac{Ki}{Kp}\right)}{(1 + 1/(P(s) \times Kp))s + \left(\frac{Ki}{Kp}\right)} \quad (101)$$

As expressed by Equation (101), a denominator of the transfer function H(s) is not affected by the correction factor α.

Figure 16:
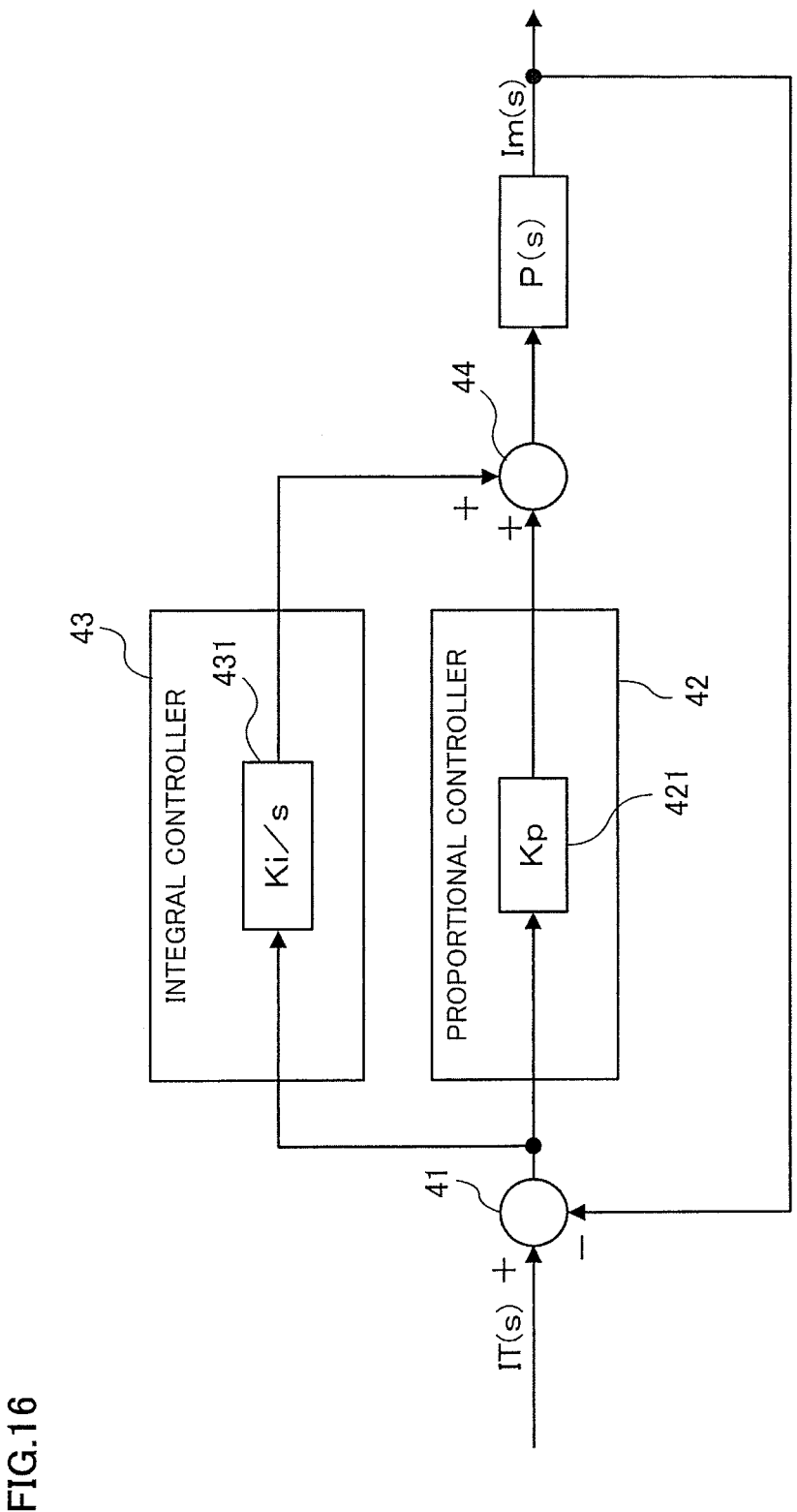
FIG. 16 is a simple block diagram of a system compared to the system according to the second exemplary embodiment.

FIG. 16 is a simple block diagram of a system compared to the system according to the second exemplary embodiment. The system in which the correction unit 422 and the multiplier 56 are excluded from the motor drive controller 31 according to the second exemplary embodiment is exemplified as the system compared to the system according to the second exemplary embodiment. FIG. 16 is a block diagram of the comparative system. As in the case of FIG. 15, IT(s) represents the Laplace transform of the output value IT from the target current calculator 20, Im(s) represents the Laplace transform of the output value Im from the motor current detector 33, and P(s) represents in simple form the transfer function of the PWM signal generator 60, the motor drive unit 32 and the electric motor 110.

In this instance, a transfer function G(s) from IT(s) to Im(s) is expressed by Equation (102).

$$G(s) = \frac{s + \left(\frac{Ki}{Kp}\right)}{(1 + 1/(P(s) \times Kp))s + \left(\frac{Ki}{Kp}\right)} \quad (102)$$

When an input is IT(s) and an output is Im(s), a numerator of the transfer function indicates the responsiveness of the actual current to the target current. Thus, as can be seen from Equations (101) and (102), the motor drive controller 31 according to the second exemplary embodiment enhances the effect of the proportional action performed by the proportional action element 421 in the correction unit 422 and correspondingly improves the responsiveness, as compared to the comparative system.

Also, a denominator of the transfer function indicates the stability of the system, and as can be seen from Equations (101) and (102), the denominator of H(s) is the same as that of G(s). Thus, the motor drive controller 31 according to the second exemplary embodiment ensures the same stability as the comparative system, regardless of the value of α.

Therefore, as is the case with the motor drive controller 31 according to the second exemplary embodiment, the correction unit 422 that enhances the effect of the proportional action performed by the proportional action element 421 is provided in a part of the proportional controller 42, and also, the adder 44 adds the value obtained by multiplying Im by the proportional gain Kp and the proportional factor β(=α−1) to the output values from the proportional controller 42 and the integral controller 43, and thereby, an improvement in the responsiveness is achievable without affecting the stability of the system. Thereby, an improvement in steering feel is achievable without affecting the stability of the electric power steering apparatus 100. Also, the correction factor α may be changed, for example, in accordance with the vehicle speed thereby to perform fine control.

If the existing system is the comparative system, the system may be modified as is the case with the motor drive controller 31 according to the second exemplary embodiment. Thereby, the same method as the existing system is used to set the proportional gain Kp and the integral gain Ki and thereby ensure the stability of the system, and then, the correction factor α is adjusted to improve the responsiveness of the actual current to the target current.

Figure 17:
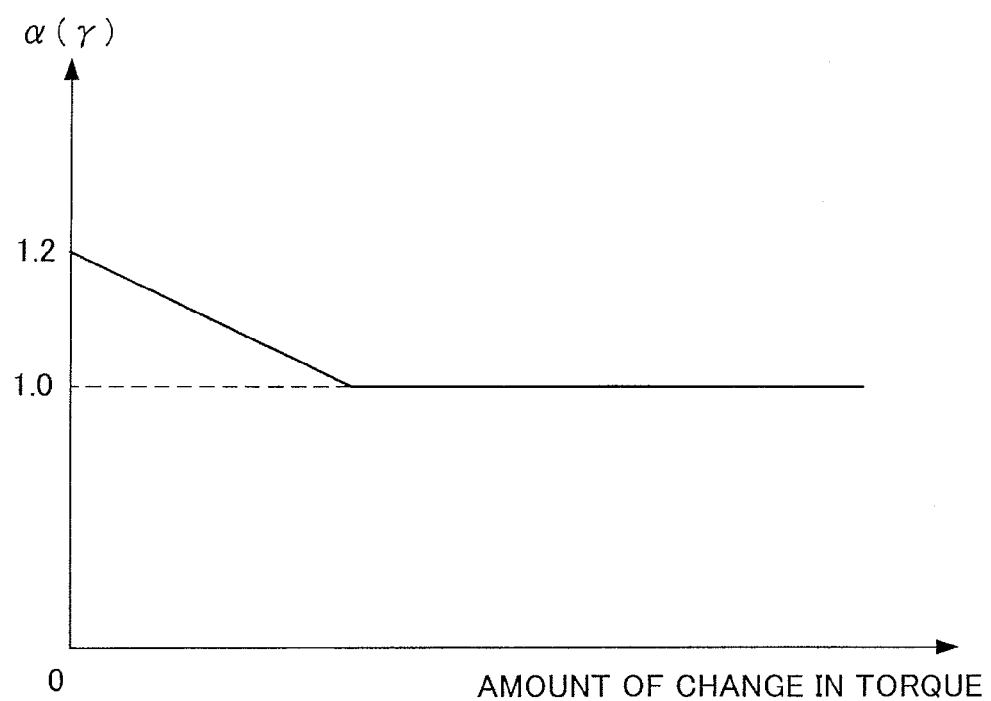
FIG. 17 is a graph showing the relationship between the correction factor α and the amount of torque change of the steering wheel.

Incidentally, the correction factor setting unit 423 may calculate the correction factor α on the basis of the steering torque. FIG. 17 is a graph showing the relationship between the correction factor α and the amount of torque change of the steering wheel 101. For example, the optimum correction factor α in accordance with the amount of torque change of the steering wheel 101 is derived on the basis of an empirical rule, as shown in FIG. 17. Then, the correction factor setting unit 423 calculates the correction factor α by substituting the amount of torque change derived from the torque signal Td into a map showing the correspondence between the amount of torque change of the steering wheel 101 and the correction factor α, which has previously been created and been stored in the ROM. Alternatively, the correction factor setting unit 423 may calculate the correction factor α by substituting the amount of torque change into the relational expression of the amount of torque change and the correction factor α, which has previously been created.

Also, it is preferable that the correction factor setting unit 423 calculate the correction factor α on the basis of the vehicle speed and the steering torque. For example, the relationship between a combination of the vehicle speed signal v and the amount of torque change of the steering wheel 101 and the optimum correction factor α is derived in advance on the basis of an empirical rule. Then, a map showing the correspondence therebetween is previously created and stored in the ROM, and the correction factor setting unit 423 calculates the correction factor α by substituting the vehicle speed signal v and the amount of torque change into the map. Alternatively, the correction factor setting unit 423 may calculate the correction factor α by substituting the vehicle speed signal v and the amount of torque change into the relational expression of a combination of the vehicle speed signal v and the amount of torque change and the correction factor α, which has previously been created.

As described above, a change in the correction factor α on the basis of at least any one of the vehicle speed and the torque signal Td permits finer control.

Third Exemplary Embodiment

Figure 18:
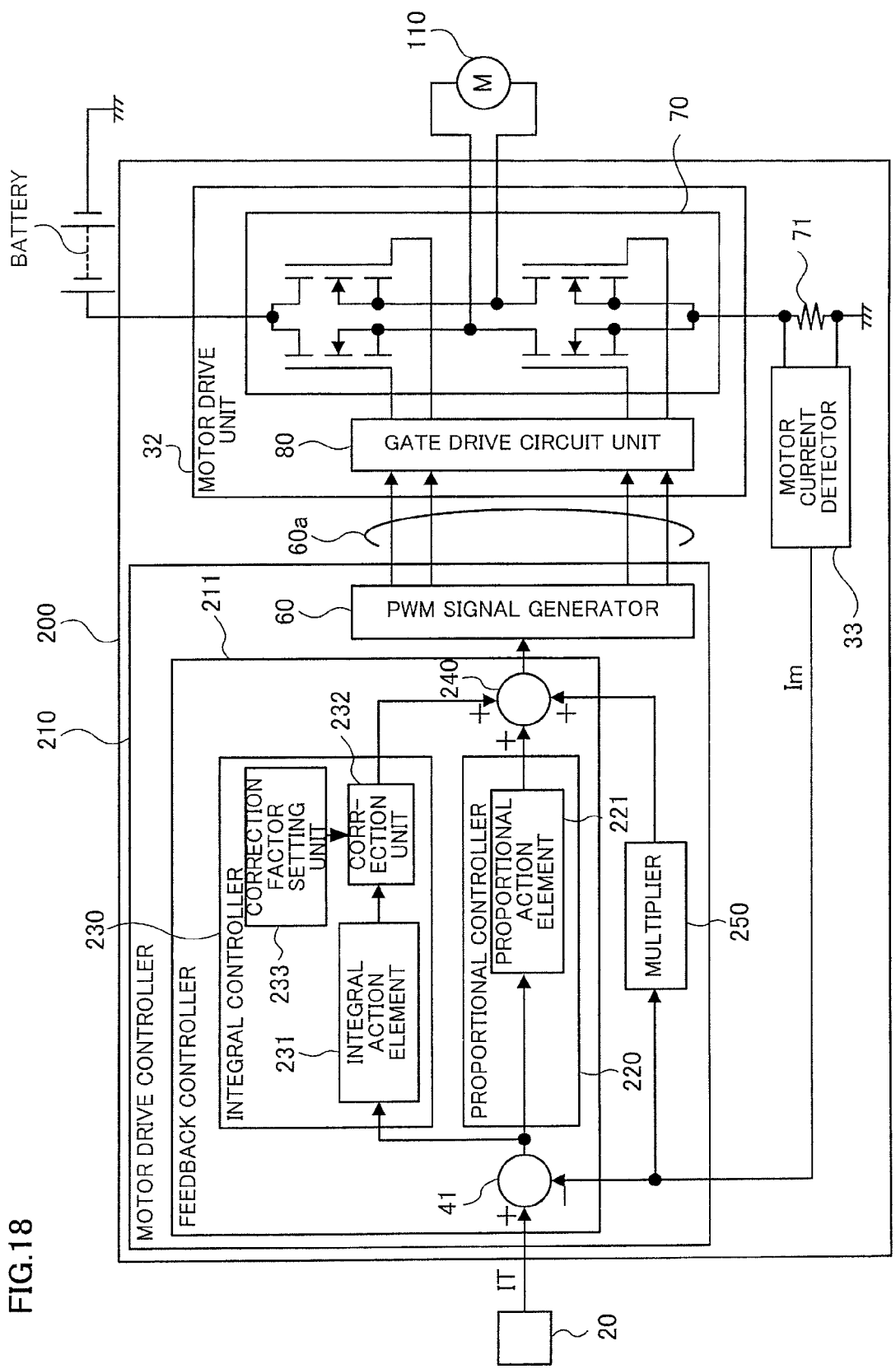
FIG. 18 is a schematic configuration diagram of a controller according to the third exemplary embodiment.

FIG. 18 is a schematic configuration diagram of a controller 200 according to the third exemplary embodiment.

Hereinafter, description will be given with regard to the difference between the third exemplary embodiment and the second exemplary embodiment. The same components are denoted by the same reference numerals, and the detailed description thereof will be omitted.

A feedback controller 211 of a motor drive controller 210 of the controller 200 according to the third exemplary embodiment includes a proportional controller 220 and an integral controller 230, as is the case with the controller 30 according to the second exemplary embodiment. The proportional controller 220 and the integral controller 230 are configured as given below. Specifically, the proportional controller 220 according to the third exemplary embodiment is formed of a proportional action element 221 that multiplies, by the proportional gain Kp, the deviation between the output value IT from the target current calculator 20 and the output value Im from the motor current detector 33. The integral controller 230 includes an integral action element 231 that performs the integral action of multiplying, by the integral gain Ki, the integral value obtained by integrating the deviation between IT and Im, a correction unit 232 as an example of a correction unit that multiplies an output value from the integral action element 231 by a correction factor γ, and a correction factor setting unit 233 that sets the correction factor γ used for the correction unit 232 to perform processing.

Also, the motor drive controller 210 of the controller 200 according to the third exemplary embodiment includes a multiplier 250 that multiplies, by a factor, the integral value obtained by integrating the value of the actual current detected by the motor current detector 33.

The correction factor setting unit 233 calculates the correction factor γ, for example on the basis of the vehicle speed. For example, the optimum correction factor γ in accordance with the vehicle speed is derived in advance on the basis of an empirical rule, as shown in FIG. 14. Then, the correction factor setting unit 233 calculates and sets the correction factor γ by substituting the vehicle speed signal v into a map showing the correspondence between the vehicle speed signal v and the correction factor γ, or the relational expression of the vehicle speed signal v and the correction factor γ, which has previously been created and been stored in the ROM. Incidentally, as shown in FIG. 14, the correction factor γ is 1.2 when the vehicle speed is zero, and preferably, the correction factor γ decreases to 1 as the vehicle speed becomes higher, and the correction factor γ is 1 when the vehicle speed is equal to or more than a given speed.

The correction factor setting unit 233 sets the correction factor γ at a value equal to or more than 1, and thereby, the correction unit 232 multiplies the output value from the integral action element 231 by the correction factor γ, thereby to enhance the effect of the integral action performed by the integral action element 231.

The multiplier 250 calculates a proportional factor δ on the basis of the correction factor γ set by the correction factor setting unit 233, multiplies, by the integral gain Ki and the proportional factor δ, the integral value obtained by integrating the value of the actual current detected by the motor current detector 33, and outputs the multiplication result. The proportional factor δ is the factor depending on the correction factor γ, and is a value obtained by subtracting 1 from the correction factor γ, that is, γ−1. Hence, the multiplier 250 multiplies, by "Ki×(γ−1)," the integral value obtained by integrating the value of the actual current detected by the motor current detector 33, and outputs the multiplication result.

The adder 240 functions as an example of an addition unit that adds together the output value from the proportional controller 220, the output value from the integral controller 230, and the output value from the multiplier 250, and outputs the addition result. The output value from the adder 240 is a base of a command value to the electric motor 110, and the PWM signal generator 60 generates the PWM signal 60a on the basis of the output value from the adder 240 and outputs the generated PWM signal 60a.

In the motor drive controller 210 according to the third exemplary embodiment configured as described above, the multiplier 250 functions as an adjusting unit that makes an adjustment so that a denominator of the transfer function would remain constant regardless of the value of the correction factor γ, when the target current set by the target current calculator 20 is taken as an input and the actual current actually supplied to the electric motor 110 is taken as an output. This is proved by Equation (103) given below.

Figure 19:
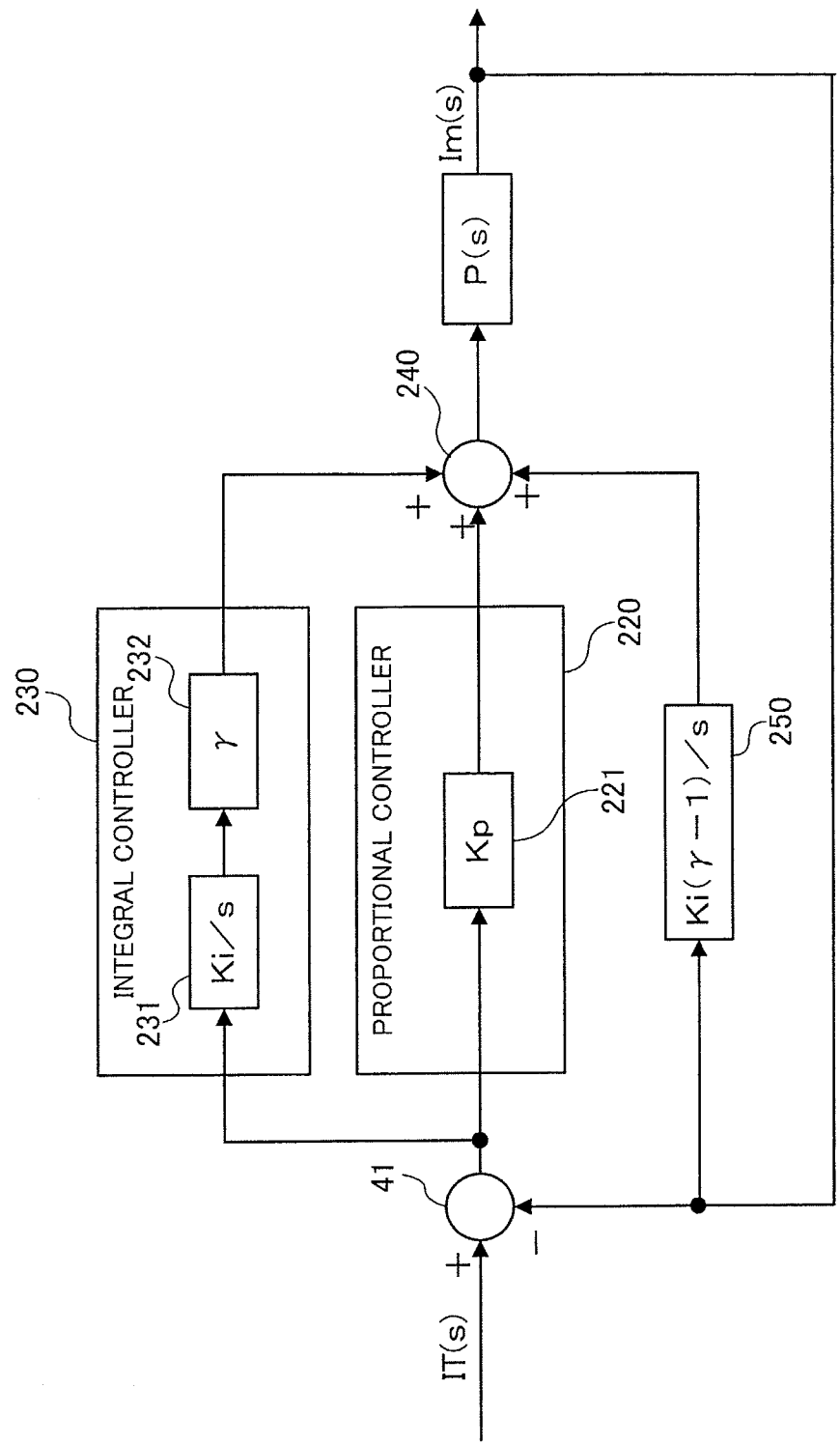
FIG. 19 is a simple block diagram of the controller according to the third exemplary embodiment.

FIG. 19 is a simple block diagram of the controller 200 according to the third exemplary embodiment. In FIG. 19, as in the case of FIG. 15, IT(s) represents the Laplace transform of the output value IT from the target current calculator 20 (see FIG. 13), Im(s) represents the Laplace transform of the output value Im from the motor current detector 33, and P(s) represents in simple form the transfer function of the PWM signal generator 60, the motor drive unit 32 and the electric motor 110.

In this instance, a transfer function F(s) from IT(s) to Im(s) is expressed by Equation (103).

$$F(s) = \frac{s + \gamma\left(\frac{Ki}{Kp}\right)}{(1 + 1/(P(s) \times Kp))s + \left(\frac{Ki}{Kp}\right)} \quad (103)$$

As expressed by Equation (103), a denominator of the transfer function F(s) is not affected by the correction factor γ.

When an input is IT(s) and an output is Im(s), a numerator of the transfer function indicates the responsiveness of the actual current to the target current. Thus, as can be seen from Equations (102) and (103), the motor drive controller 210 according to the third exemplary embodiment enhances the effect of the integral action performed by the integral action element 231 in the correction unit 232 and correspondingly improves the responsiveness, as compared to the comparative system.

Also, a denominator of the transfer function indicates the stability of the system, and as can be seen from Equations (102) and (103), the denominator of F(s) is the same as that of G(s). Thus, the motor drive controller 210 according to the third exemplary embodiment ensures the same stability as the comparative system, regardless of the value of γ.

Therefore, as is the case with the motor drive controller 210 according to the third exemplary embodiment, the correction unit 232 that enhances the effect of the integral action performed by the integral action element 231 is provided in a part of the integral controller 230, and also, the adder 240 adds the value obtained by multiplying, by the integral gain Ki and the proportional factor δ(=γ−1), an integral value obtained by integrating Im, to the output values from the proportional controller 220 and the integral controller 230, and thereby, an improvement in the responsiveness is achievable without affecting the stability of the system. Thereby, an improvement in steering feel is achievable without affecting the stability of the electric power steering apparatus 100. Also, the correction factor γ may be changed, for example, in accordance with the vehicle speed thereby to perform fine control.

If the existing system is the comparative system, the system may be modified as is the case with the motor drive controller 210 according to the third exemplary embodiment. Thereby, the same method as the existing system is used to set the proportional gain Kp and the integral gain Ki and thereby ensure the stability of the system, and then, the correction factor γ is adjusted to improve the responsiveness of the actual current to the target current.

Incidentally, the correction factor setting unit 233 may calculate the correction factor γ on the basis of the steering torque, as has been described in the section on the second exemplary embodiment. Also, the correction factor setting unit 233 may calculate the correction factor γ on the basis of the vehicle speed and the steering torque, as has been described in the section on the second exemplary embodiment.

As described above, a change in the correction factor γ based on at least any one of the vehicle speed and the steering torque permits finer control.

Fourth Exemplary Embodiment

Figure 20:
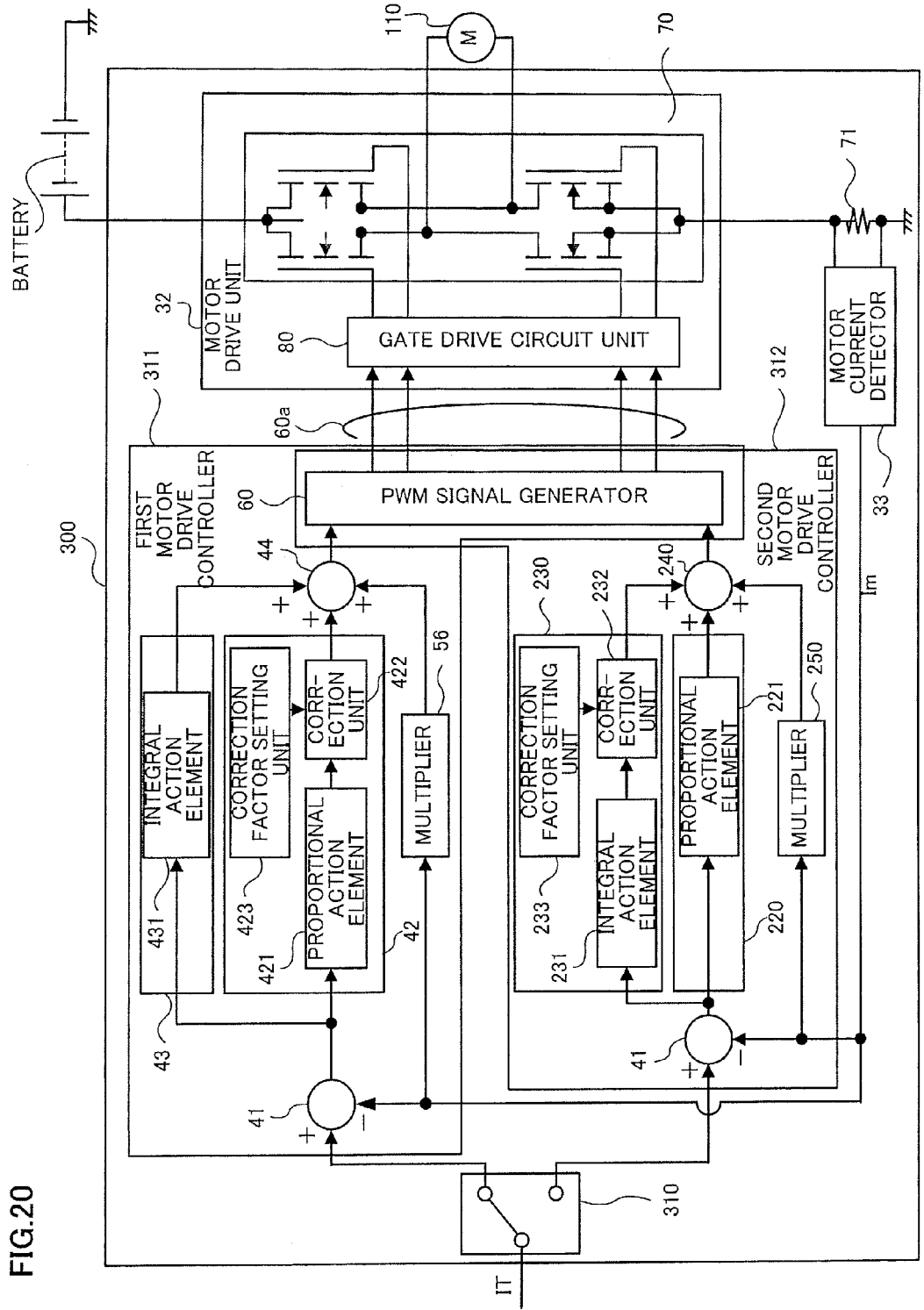
FIG. 20 is a schematic configuration diagram of a controller according to the fourth exemplary embodiment.

FIG. 20 is a schematic configuration diagram of a controller 300 according to the fourth exemplary embodiment.

Hereinafter, a description will be given with regard to the difference between the fourth exemplary embodiment and the second or third exemplary embodiment. The same components are denoted by the same reference numerals, and the detailed description thereof will be omitted.

The controller 300 according to the fourth exemplary embodiment includes a first motor drive controller 311, a second motor drive controller 312, and a switching unit 310 that performs switching between the first motor drive controller 311 and the second motor drive controller 312 to output a command value to the PWM signal generator 60 for the output value IT from the target current calculator 20 (see FIG. 13), according to the circumstances.

As shown in FIG. 20, the first motor drive controller 311 has the same configuration and function as the motor drive controller 31 according to the second exemplary embodiment (for instance, the first motor drive controller 311 has the multiplier 56 as an example of a first multiplication unit), and the second motor drive controller 312 has the same configuration and function as the motor drive controller 210 according to the third exemplary embodiment (for instance, the second motor drive controller 312 has the multiplier 250 as an example of a second multiplication unit).

The switching unit 310 selects either the first motor drive controller 311 or the second motor drive controller 312 according to the circumstances.

Here, when the switching unit 310 selects the first motor drive controller 311, a transfer function from IT(s) to Im(s) is H(s) represented as Equation (101), or when the switching unit 310 selects the second motor drive controller 312, the transfer function from IT(s) to Im(s) is F(s) represented as Equation (103).

Because of characteristics of H(s) and F(s), the actual current reaches the target current when the switching unit 310 selects the first motor drive controller 311 faster than when the switching unit 310 selects the second motor drive controller 312. On the other hand, the actual current converges on the target current when the switching unit 310 selects the second motor drive controller 312 faster than when the switching unit 310 selects the first motor drive controller 311.

It is therefore preferable that the switching unit 310 perform switching between the motor drive controllers in accordance with the vehicle speed, in such a manner that the actual current reaches the target current faster, if the vehicle speed is low, or in such a manner that the actual current converges on the target current faster in order to suppress vibration corresponding to the vehicle speed, if the vehicle speed is high. Specifically, it is preferable that the switching unit 310 perform switching so as to select the first motor drive controller 311 if the vehicle speed detected by the vehicle speed sensor 170 is equal to or less than a threshold value, or select the second motor drive controller 312 if the vehicle speed is more than the threshold value.

This permits finer control of the electric motor 110, thus achieving a further improvement in the steering feel without affecting the stability of the electric power steering apparatus 100.

Also, it is preferable that the switching unit 310 perform switching, allowing for the steering torque detected by the torque sensor 109. For example, the relationship between a combination of the vehicle speed and the steering torque and the optimum motor drive controller is derived in advance on the basis of an empirical rule. Then, a map showing the correspondence therebetween is created and stored in advance in the ROM, and the switching unit 310 substitutes the vehicle speed signal v and the torque signal Td into the map thereby to select either one of the motor drive controllers. This permits finer control of the electric motor 110.

Fifth Exemplary Embodiment

Figure 21:
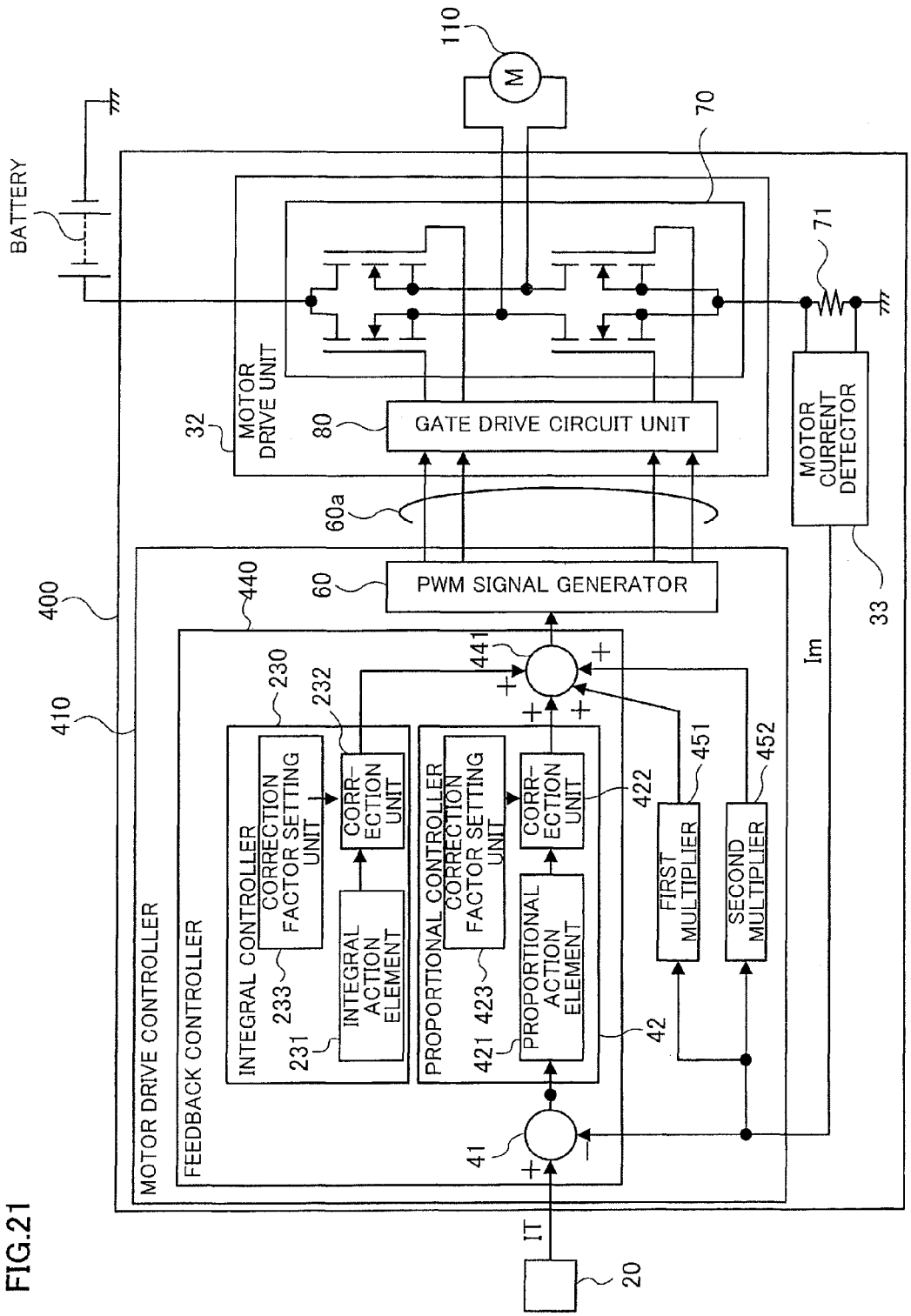
FIG. 21 is a schematic configuration diagram of a controller according to the fifth exemplary embodiment.

FIG. 21 is a schematic configuration diagram of a controller 400 according to the fifth exemplary embodiment.

Hereinafter, a description will be given with regard to the difference between the fifth exemplary embodiment and the second exemplary embodiment. The same components are denoted by the same reference numerals, and the detailed description thereof will be omitted.

A feedback controller 440 of a motor drive controller 410 of the controller 400 according to the fifth exemplary embodiment includes the proportional controller 42 of the motor drive controller 31 according to the second exemplary embodiment, and the integral controller 230 of the motor drive controller 210 according to the third exemplary embodiment.

Also, the motor drive controller 410 includes a first multiplier 451 that multiplies, by a factor, the actual current detected by the motor current detector 33, and a second multiplier 452 that multiplies, by a factor, the integral value obtained by integrating the value of the actual current detected by the motor current detector 33.

The first multiplier 451 multiplies, by "Kp×(α−1)," the actual current detected by the motor current detector 33, and outputs the multiplication result, as is the case with the multiplier 56 of the motor drive controller 31 according to the second exemplary embodiment. Also, the second multiplier 452 multiplies, by "Ki×(γ−1)," the integral value obtained by integrating the value of the actual current detected by the motor current detector 33, and outputs the multiplication result, as is the case with the multiplier 250 of the motor drive controller 210 according to the third exemplary embodiment.

Also, the motor drive controller 410 includes an adder 441 as an example of an addition unit that adds together the output value from the proportional controller 42, the output value from the integral controller 230, the output value from the first multiplier 451 and the output value from the second multiplier 452 and outputs the addition result. The output value from the adder 441 is a base of a command value to the electric motor 110, and the PWM signal generator 60 generates the PWM signal 60a on the basis of the output value from the adder 441 and outputs the generated PWM signal 60a to the motor drive unit 32.

In the motor drive controller 410 according to the fifth exemplary embodiment configured as described above, the first multiplier 451 and the second multiplier 452 function as an adjusting unit that make an adjustment so that the denominator of the transfer function would remain constant regardless of the values of the correction factors α and γ, when the target current set by the target current calculator 20 is taken as an input and the actual current actually supplied to the electric motor 110 is taken as an output. This is proved by Equation (104) given below.

Figure 22:
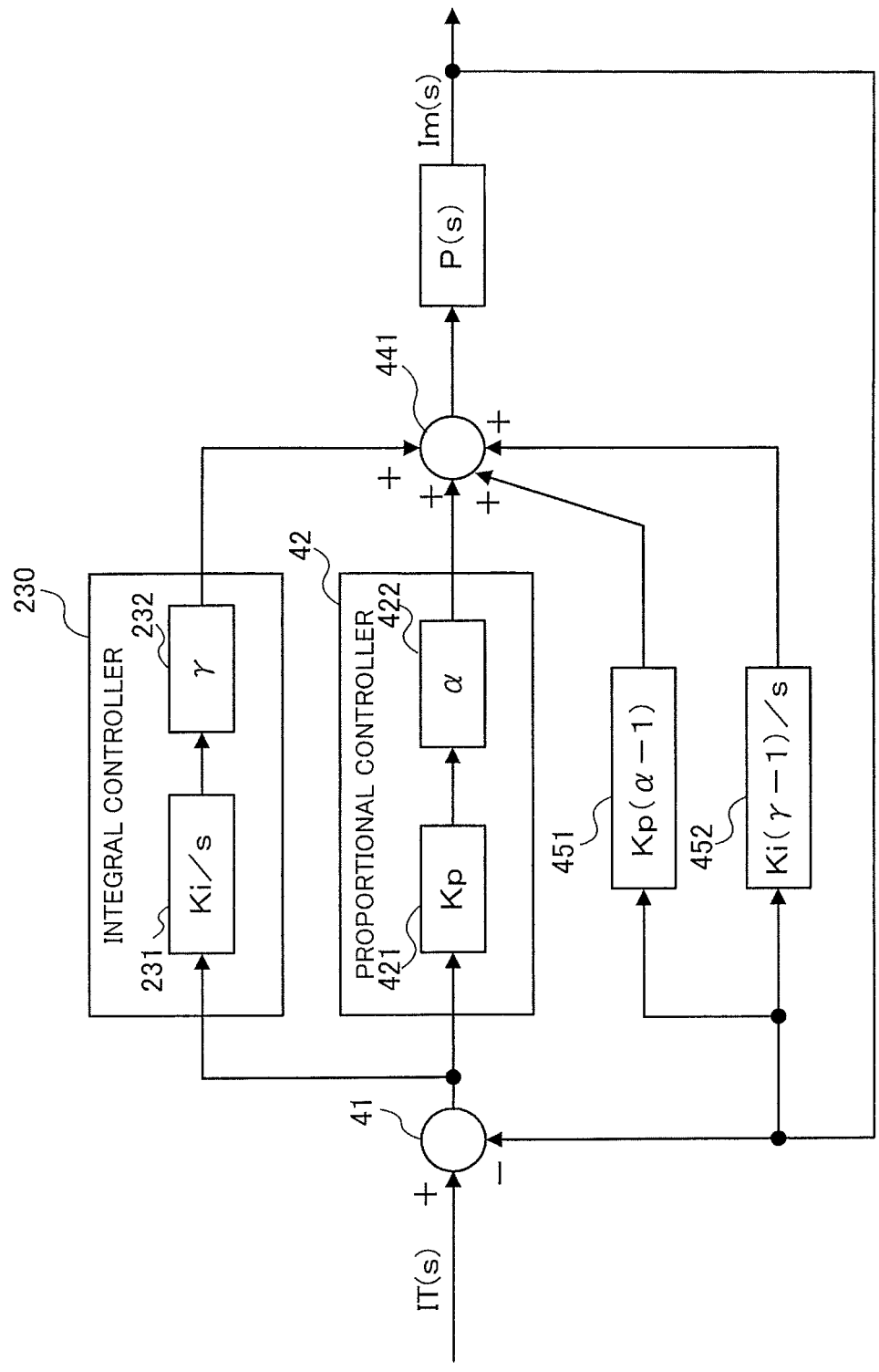
FIG. 22 is a simple block diagram of the controller according to the fifth exemplary embodiment.

FIG. 22 is a simple block diagram of the controller 400 according to the fifth exemplary embodiment. In FIG. 22, as in the case of FIG. 15, IT(s) represents the Laplace transform of the output value IT from the target current calculator 20, Im(s) represents the Laplace transform of the output value Im from the motor current detector 33, and P(s) represents in simple form the transfer function of the PWM signal generator 60, the motor drive unit 32 and the electric motor 110.

In this instance, a transfer function D(s) from IT(s) to Im(s) is expressed by Equation (104).

$$D(s) = \frac{\alpha s + \gamma \left(\frac{Ki}{Kp}\right)}{(1 + 1/(P(s) \times Kp))s + \left(\frac{Ki}{Kp}\right)} \quad (104)$$

As expressed by Equation (104), a denominator of the transfer function D(s) is not affected by the correction factors α and γ.

When an input is IT(s) and an output is Im(s), a numerator of the transfer function indicates the responsiveness of the actual current to the target current. Thus, as can be seen from Equations (102) and (104), the motor drive controller 410 according to the fifth exemplary embodiment enhances the effect of the proportional action performed by the proportional action element 421 in the correction unit 422 and the effect of the integral action performed by the integral action element 231 in the correction unit 232, and correspondingly improves the responsiveness, as compared to the comparative system.

Also, a denominator of the transfer function indicates the stability of the system, and as can be seen from Equations (102) and (104), the denominator of D(s) is the same as that of G(s). Thus, the motor drive controller 410 according to the fifth exemplary embodiment ensures the same stability as the comparative system, regardless of the values of the correction factors α and γ.

Therefore, as is the case with the motor drive controller 410 according to the fifth exemplary embodiment, the correction unit 422 that enhances the effect of the proportional action performed by the proportional action element 421 is provided in a part of the proportional controller 42, the correction unit 232 that enhances the effect of the integral action performed by the integral action element 231 is provided in a part of the integral controller 230, and also, the adder 441 adds the value obtained by multiplying Im by "Kp×(α−1)," and the value obtained by a multiplying, by "Ki×(γ−1)," a value obtained by integrating Im, to the output values from the proportional controller 42 and the integral controller 230, and thereby, an improvement in the responsiveness is achievable without affecting the stability of the system. Thereby, an improvement in steering feel is achievable without affecting the stability of the electric power steering apparatus 100. Also, at least any one of the correction factors α and γ may be changed in accordance with at least any one of the vehicle speed and the steering torque thereby to perform fine control.

If the existing system is the comparative system, the system may be modified as is the case with the motor drive controller 410 according to the fifth exemplary embodiment. Thereby, the same method as the existing system is used to set the proportional gain Kp and the integral gain Ki and thereby ensure the stability of the system, and then, the correction factors α and γ are adjusted to improve the responsiveness of the actual current to the target current.

Sixth Exemplary Embodiment

Figure 23:
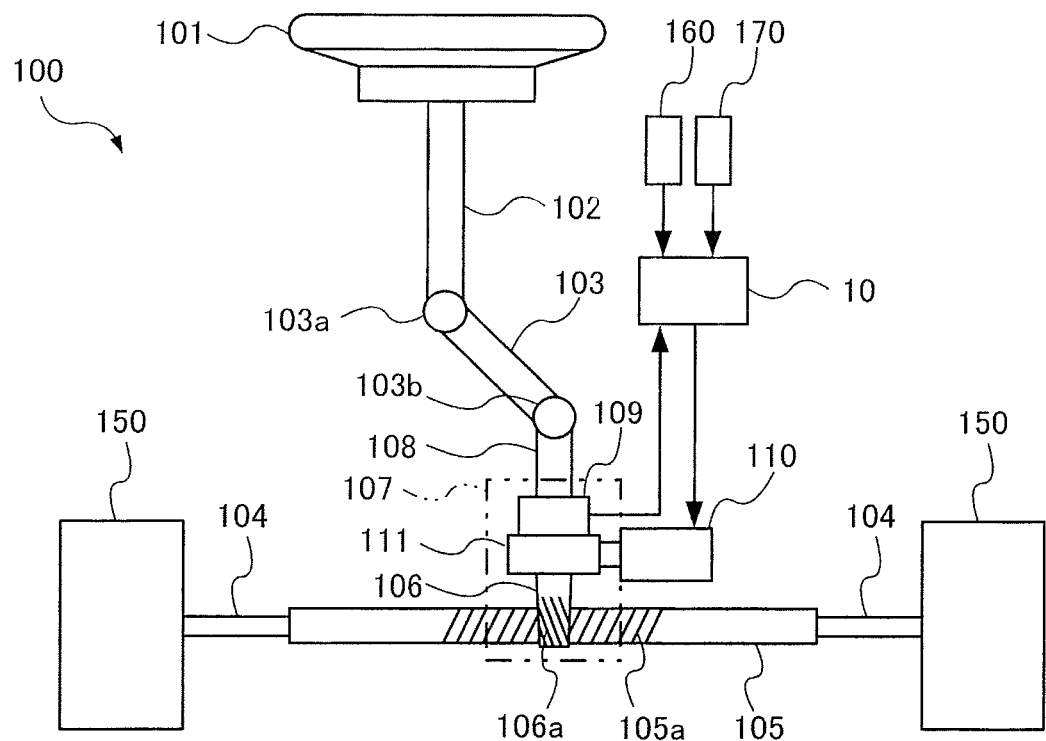
FIG. 23 is a diagram showing an outline configuration of an electric power steering apparatus according to the sixth exemplary embodiment.

FIG. 23 is a diagram showing an outline configuration of an electric power steering apparatus 100 according to the sixth exemplary embodiment.

The electric power steering apparatus 100 (hereinafter sometimes called merely the "steering apparatus 100") acts as the steering apparatus for changing the direction of travel of a vehicle into an any direction, and, in the sixth exemplary embodiment, exemplifies a configuration as applied to an automobile.

The steering apparatus 100 includes a steering wheel 101 in the form of wheel which a driver operates, and a steering shaft 102 provided integrally with the steering wheel 101. The steering shaft 102 and an upper connecting shaft 103 are connected together via a universal coupling 103a, and the upper connecting shaft 103 and a lower connecting shaft 108 (as an example of a first rotary shaft) are connected together via a universal coupling 103b.

Also, the steering apparatus 100 includes tie rods 104 connected respectively to right and left front wheels 150 as a wheel to be turned, and a rack shaft 105 connected to the tie rods 104. Also, the steering apparatus 100 includes a pinion 106a that forms a rack-and-pinion mechanism in conjunction with rack teeth 105a formed in the rack shaft 105. The pinion 106a is formed at a lower end portion of a pinion shaft 106 (as an example of a second rotary shaft).

Also, the steering apparatus 100 includes a steering gear box 107 in which the pinion shaft 106 is housed. In the steering gear box 107, the pinion shaft 106 is connected to the lower connecting shaft 108 via a torsion bar (not shown in the figure). In addition, provided in the steering gear box 107 is a torque sensor 109 as an example of a steering torque detector that detects steering torque of the steering wheel 101 on the basis of a relative angle between the lower connecting shaft 108 and the pinion shaft 106.

Also, the steering apparatus 100 includes an electric motor 110 supported on the steering gear box 107, and a reduction gear mechanism 111 that reduces drive power of the electric motor 110 and transfers the reduced drive power to the pinion shaft 106.

Also, the steering apparatus 100 includes a motor current detector 33 (see FIG. 26) as an example of a current detector that detects the magnitude and direction of an actual current actually passing through the electric motor 110, and a motor voltage detector 160 that detects a terminal-to-terminal voltage of the electric motor 110.

The steering apparatus 100 includes a control device 10 that controls actuation of the electric motor 110. Inputted to the control device 10 are an output value from the above-mentioned torque sensor 109, an output value from a vehicle speed sensor 170 that detects the vehicle speed of the automobile, an output value from the motor current detector 33, and an output value from the motor voltage detector 160.

In the electric power steering apparatus 100 configured as described above, the steering torque applied to the steering wheel 101 is detected by the torque sensor 109, the electric motor 110 is driven in accordance with the detected torque, and torque produced by the electric motor 110 is transmitted to the pinion shaft 106. Thereby, the torque produced by the electric motor 110 assists the application of driver's steering force to the steering wheel 101.

Next, a description will be given with regard to the control device 10.

The control device 10 is an arithmetic logic circuit formed of a CPU, a ROM, a RAM, a backup RAM and the like.

Figure 24:
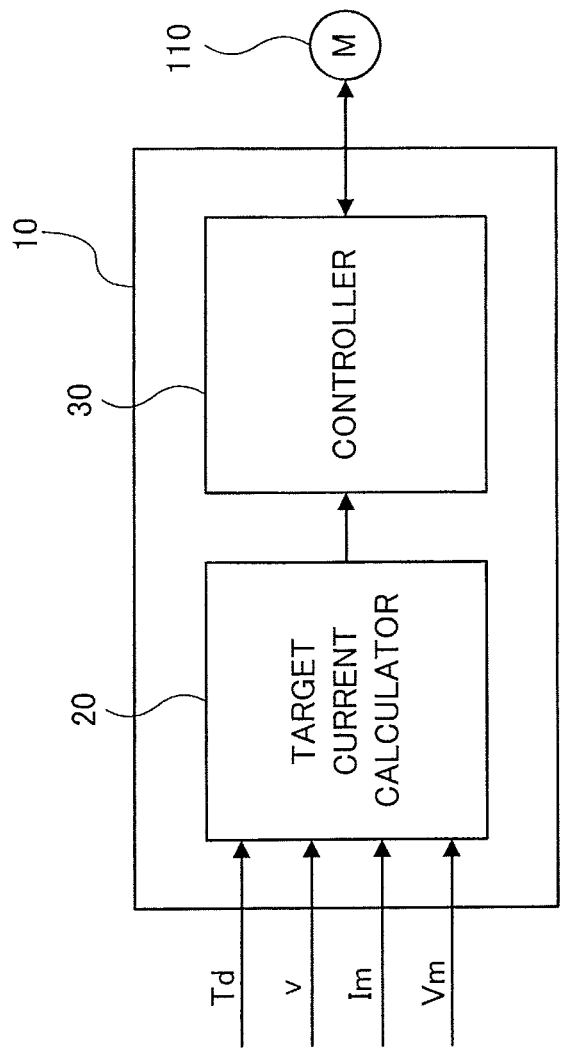
FIG. 24 is a schematic configuration diagram of the control device of the electric power steering apparatus.

FIG. 24 is a schematic configuration diagram of the control device 10 of the electric power steering apparatus 100.

The control device 10 receives a torque signal Td obtained through the conversion of the steering torque detected by the above-mentioned torque sensor 109 into an output signal, and a vehicle speed signal v obtained through the conversion of the vehicle speed detected by the vehicle speed sensor 170 into an output signal.

Also, the control device 10 receives a motor current signal Im obtained through the conversion of the actual current detected by the motor current detector 33 into an output signal, and a terminal-to-terminal voltage signal Vm of the motor, obtained through the conversion of the voltage detected by the motor voltage detector 160 into an output signal.

Incidentally, since the detected signals in analog form are received from the torque sensor 109 and the like, the control device 10 uses an A/D converter (not shown in the figure) to convert the analog signals into digital signals and captures the digital signals in the CPU.

The control device 10 includes a target current calculator 20 that calculates target assist torque on the basis of the torque signal Td and calculates a target current required for the electric motor 110 to supply the target assist torque, and a controller 30 that performs feedback control or the like on the basis of the target current calculated by the target current calculator 20.

Figure 25:
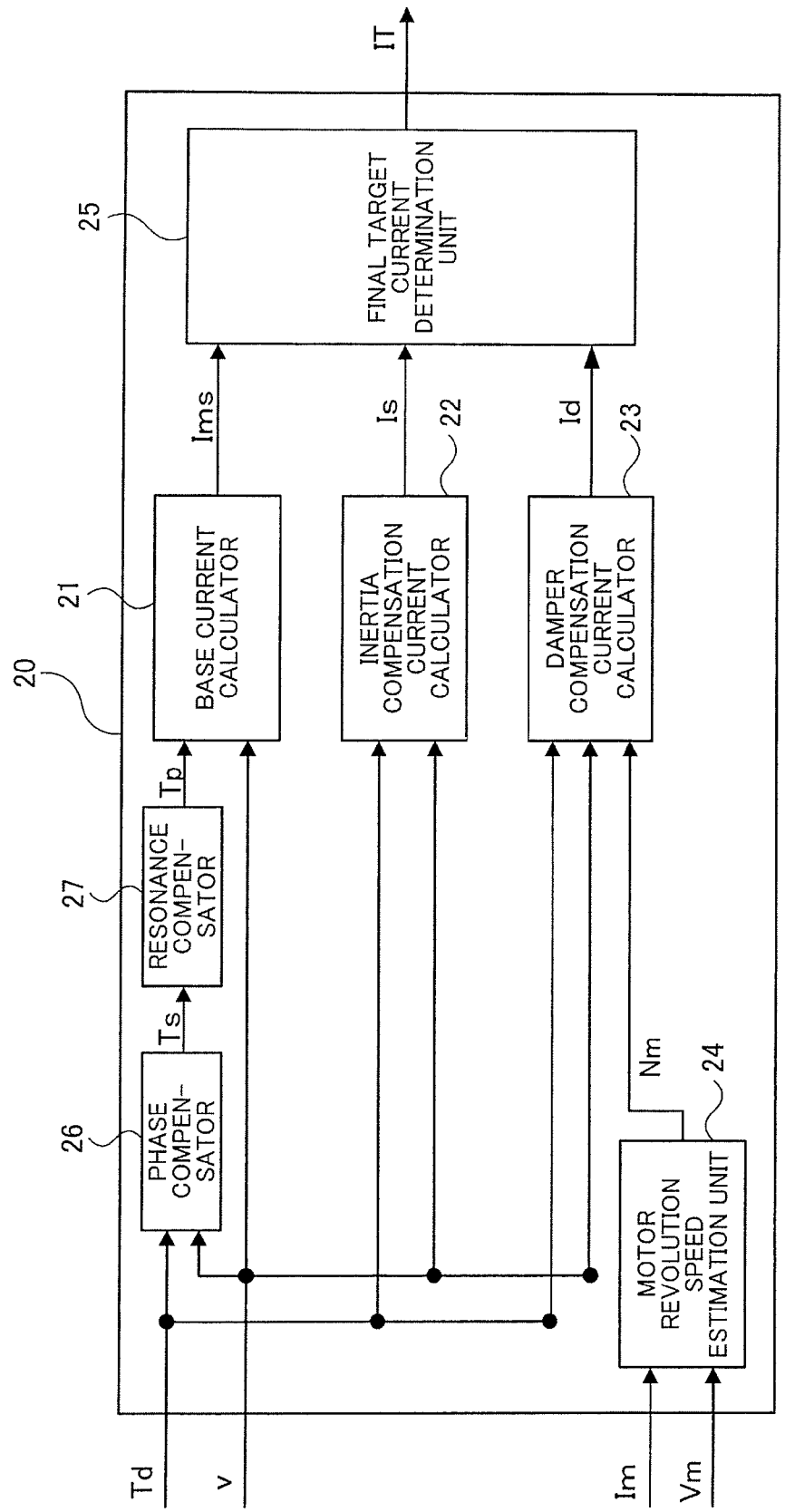
FIG. 25 is a schematic configuration diagram of the target current calculator.

Next, a detailed description will be given with regard to the target current calculator 20. FIG. 25 is a schematic configuration diagram of the target current calculator 20.

The target current calculator 20 includes a base current calculator 21 that calculates a base current for use as a reference for setting the target current, and an inertia compensation current calculator 22 that calculates a current to cancel out the moment of inertia of the electric motor 110. Also, the target current calculator 20 includes a damper compensation current calculator 23 that calculates a current to limit motor revolutions, and a motor revolution speed estimation unit 24 that estimates a revolution speed signal Nm of the electric motor 110 on the basis of the motor current signal Im and the terminal-to-terminal voltage signal Vm of the motor.

Also, the target current calculator 20 includes a final target current determination unit 25 that determines the final target current on the basis of the outputs from the base current calculator 21, the inertia compensation current calculator 22, the damper compensation current calculator 23, and so on.

Further, the target current calculator 20 includes a phase compensator 26 that provides a phase compensation of the steering torque detected by the torque sensor 109, and a resonance compensator 27 that provides a resonance compensation to eliminate resonance frequency components of the steering torque subjected to the phase compensation by the phase compensator 26.

The phase compensator 26 performs filtering processing for the phase compensation on the torque signal Td as the output value from the torque sensor 109, and outputs the torque signal Ts obtained through the processing. The resonance compensator 27 eliminates resonance frequency components of the torque signal Ts, and outputs a torque signal Tp obtained through the elimination of the resonance frequency components. A detailed description will be given later with regard to the resonance compensator 27.

The base current calculator 21 calculates the base current on the basis of the steering torque detected by the torque sensor 109 and the vehicle speed detected by the vehicle speed sensor 170. More specifically, the base current calculator 21 calculates the base current on the basis of the torque signal Tp as the output value from the resonance compensator 27 and the vehicle speed signal v from the vehicle speed sensor 170, and outputs the base current signal Ims containing information on the base current. Incidentally, the calculation of the base current by the base current calculator 21 is accomplished by, for example, substituting the torque signal Tp and the vehicle speed signal v into a map showing the correspondence between a combination of the torque signal Tp and the vehicle speed signal v and the base current, which has previously been created on the basis of an empirical rule and been stored in the ROM.

The inertia compensation current calculator 22 calculates an inertia compensation current to cancel out the moment of inertia of the electric motor 110 and a system, on the basis of the torque signal Td and the vehicle speed signal v, and outputs an inertia compensation current signal Is containing information on the inertia compensation current. Incidentally, the calculation of the inertia compensation current by the inertia compensation current calculator 22 is accomplished by, for example, substituting the torque signal Td and the vehicle speed signal v into a map showing the correspondence between a combination of the torque signal Td and the vehicle speed signal v and the inertia compensation current, which has previously been created on the basis of an empirical rule and been stored in the ROM.

The damper compensation current calculator 23 calculates the damper compensation current to limit the revolutions of the electric motor 110, on the basis of the torque signal Td, the vehicle speed signal v, and the revolution speed signal Nm of the electric motor 110, and outputs the damper compensation current signal Id containing information on the damper compensation current. Incidentally, the calculation of the damper compensation current by the damper compensation current calculator 23 is accomplished by, for example, substituting the torque signal Td, the vehicle speed signal v and the revolution speed signal Nm into a map showing the correspondence between a combination of the torque signal Td, the vehicle speed signal v and the revolution speed signal Nm and the damper compensation current, which has previously been created on the basis of an empirical rule and been stored in the ROM.

The motor revolution speed estimation unit 24 estimates the revolution speed of the electric motor 110 on the basis of the actual current detected by the motor current detector 33 and the voltage detected by the motor voltage detector 160.

The final target current determination unit 25 determines the final target current on the basis of the base current signal Ims outputted by the base current calculator 21, the inertia compensation current signal Is outputted by the inertia compensation current calculator 22, and the damper compensation current signal Id outputted by the damper compensation current calculator 23, and outputs a target current signal IT containing information on the final target current. The calculation of the final target current by the final target current determination unit 25 is accomplished by, for example, substituting a compensation current obtained by adding the inertia compensation current to the base current and also subtracting the damper compensation current from the added result, into a map showing the correspondence between the compensation current and the final target current, which has previously been created on the basis of an empirical rule and been stored in the ROM.

As described above, the target current calculator 20 functions as an example of a target current setting unit that sets the target current to be supplied to the electric motor 110, on the basis of the steering torque detected by the torque sensor 109.

Figure 26:
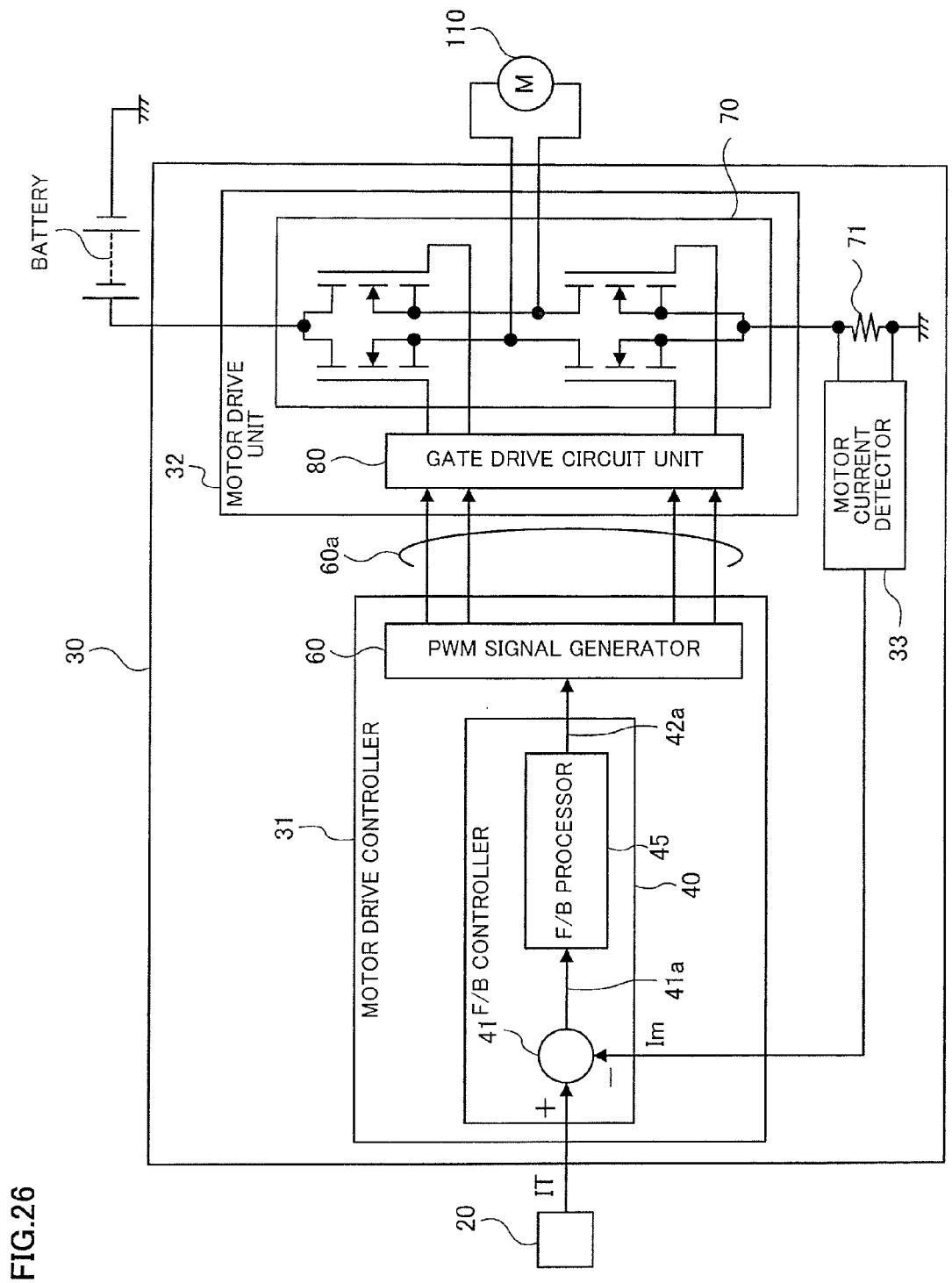
FIG. 26 is a schematic configuration diagram of the controller.

Next, a detailed description will be given with regard to the controller 30. FIG. 26 is a schematic configuration diagram of the controller 30.

The controller 30 includes a motor drive controller 31 that controls the actuation of the electric motor 110, a motor drive unit 32 that drives the electric motor 110, and the motor current detector 33 that detects the actual current actually passing through the electric motor 110.

The motor drive controller 31 includes a feedback (F/B) controller 40 that performs feedback control on the basis of a deviation between the target current calculated by the target current calculator 20 and the actual current detected by the motor current detector 33 and supplied to the electric motor 110 and a pulse width modulation (PWM) signal generator 60 that generates a PWM signal to provide PWM drive to the electric motor 110.

The feedback controller 40 includes a deviation calculator 41 that determines the deviation between the target current calculated by the target current calculator 20 and the actual current detected by the motor current detector 33, and a feedback (F/B) processor 45 that performs feedback processing so that the deviation would become zero.

The deviation calculator 41 outputs, as a deviation signal 41a, the value of the deviation between the output value IT from the target current calculator 20 and the output value Im from the motor current detector 33.

The feedback (F/B) processor 45 serves to perform feedback control so that the actual current would coincide with the target current, and generates and outputs a feedback processing signal 42a by, for example, using a proportional element to perform proportional processing on the inputted deviation signal 41a and output the proportional-processed signal; using an integral element to perform integral processing on the inputted deviation signal 41a and output the integral-processed signal; and using an add operation unit to add these processed signals together.

The PWM signal generator 60 generates a PWM signal 60a on the basis of an output value from the feedback (F/B) controller 40, and outputs the generated PWM signal 60a.

The motor drive unit 32 includes a motor drive circuit 70 formed of four field-effect transistors for electric power connected in the configuration of an H type bridge circuit, and a gate drive circuit unit 80 that drives gates of two field-effect transistors selected from among the four field effect transistors thereby to bring the two selected field-effect transistors into switching operation. The gate drive circuit unit 80 selects two field-effect transistors in accordance with the steering direction of the steering wheel 101, on the basis of a drive control signal (the PWM signal 60a) outputted by the PWM signal generator 60, and brings the two selected field-effect transistors into switching operation.

The motor current detector 33 detects the value of a motor current (or an armature current) passing through the electric motor 110, from a voltage between both ends of a shunt resistor 71 connected in series with the motor drive circuit 70, and outputs the motor current signal Im.

Next, a description will be given with regard to the resonance compensator 27.

The steering apparatus 100 is a control system including the torsion bar (not shown in the figure) for use in steering torque detection as the spring element, and the electric motor 110, the pinion shaft 106 and the rack shaft 105 as the inertial elements. Thus, for instance, when the feedback processor 45 includes the proportional element and the integral element, if the values of the proportional gain and the integral gain of the feedback processor 45 are increased in order to heighten the responsiveness of the system taken as a whole, the system is likely to become unstable (or vibrated) in the vicinity of the resonance frequency of the control system.

The resonance compensator 27 is provided in order to eliminate or suppress a peak in a resonance frequency band of the control system.

A transfer function $H_1(s)$ indicating characteristics of the resonance compensator 27 defines a transfer function $G_1(s)$ indicating characteristics of the control system of the steering apparatus 100 in the following manner. Specifically, a numerator of $H_1(s)$ has the same element as a denominator of $G_1(s)$, and the degree of a denominator of $H_1(s)$ is a second-order degree equal to or higher than the numerator in order to ensure feasibility of the resonance compensator 27. In other words, the resonance compensator 27 defines its transfer function so as to have a filtering function having an antiresonant element of the control system and a low-pass filtering function.

Firstly, discussion will be made with regard to the transfer function $G_1(s)$.

The reduction gear mechanism 111 of the steering apparatus 100 is formed of a worm wheel (not shown in the figure) mounted to the pinion shaft 106, and a worm gear (not shown in the figure) mounted to an output shaft of the electric motor 110.

In such an instance, when $\tau_m$ (N·m) represents the torque of the electric motor 110, $\theta_1$ (rad) represents the angle of rotation, $\tau_1$ (N·m) represents the torque of the worm gear, and $J_1$ (kg·m$^2$) represents the inertia of the motor shaft, an equation of motion of the electric motor 110 is expressed by Equation (1) below.

$$\tau_m = J_1 \ddot{\theta}_1 + \tau_1 \qquad (1)$$

Here, the inertia $J_1$ of the motor shaft is represented as $J_1 = J_m + J_{T1}$, where $J_m$ (kg·m$^2$) represents the inertia of the motor; and $J_{T1}$ (kg·m$^2$) represents the inertia of the worm gear.

Also, when $\theta_2$ (rad) represents the angle of rotation of the pinion shaft 106, $\tau_2$ (N·m) represents the torque of the worm wheel, $\tau_3$ (N·m) represents the torque of the pinion 106a, $J_2$ (kg·m$^2$) represents the inertia of the pinion shaft, and $k_{tb}$ (N·m/rad) represents a spring constant of the torsion bar, an equation of motion of the pinion shaft 106 is expressed by Equation (2) below.

$$\tau_2 = J_2 \ddot{\theta}_2 + k_{tb} \theta_2 + \tau_3 \qquad (2)$$

Here, the inertia $J_2$ of the pinion shaft is represented as $J_2 = J_{T2} + J_{T3}$, where $J_{T2}$ (kg·m$^2$) represents the inertia of the worm wheel; and $J_{T3}$ (kg·m$^2$) represents the inertia of the pinion 106a.

Also, when x (m) represents displacement of the rack shaft 105, m (kg) represents mass, and r (m) represents a radius of rotation of the pinion 106a, an equation of motion of the rack shaft 105 is expressed by Equation (3) below.

$$\frac{\tau_3}{r} = m \cdot \ddot{x} \tag{3}$$

Here, the displacement x of the rack shaft 105 is expressed by Equation (4) below.

$$x = r \cdot \theta_2 \tag{4}$$

Also, a worm speed reduction ratio $\gamma_1$ and a rack-and-pinion ratio $\gamma_2$ (m/rev) are expressed by Equations (5) and (6) below, respectively.

$$\gamma_1 = \theta_1/\theta_2 = \tau_2/\tau_1 \tag{5}$$

$$\gamma_2 = 2 \cdot \pi \cdot r \tag{6}$$

Equation (7) is derived from Equations (3), (4) and (6).

$$\tau_3 = m \cdot \ddot{x} \cdot r = m \cdot \left(\frac{\gamma_2}{2\pi}\right) \cdot \ddot{\theta}_2 \cdot \frac{\gamma_2}{2\pi} = \frac{m \cdot \gamma_2^2}{4\pi^2} \cdot \ddot{\theta}_2 \tag{7}$$

Equation (8) is derived from Equations (1), (2) and (5).

$$\tau_m = J_1 \cdot \gamma_1 \cdot \ddot{\theta}_2 + \frac{1}{\gamma_1} \tau_2 \tag{8}$$
$$= J_1 \cdot \gamma_1 \cdot \ddot{\theta}_2 + \frac{1}{\gamma_1} \cdot (J_2 \cdot \ddot{\theta}_2 + k_{tb} \cdot \theta_2 + \tau_3)$$

Substituting Equation (8) into Equation (7) to organize the equations leads to Equation (9).

$$\gamma_1 \cdot \tau_m = \left(\gamma_1^2 \cdot J_1 + J_2 + \frac{m \cdot \gamma_2^2}{4\pi^2}\right) \cdot \ddot{\theta}_2 + k_{tb} \cdot \theta_2 \tag{9}$$

Laplace transform of Equation (9) to organize the equation leads to Equation (10).

$$\Theta_2(s) = \frac{1}{\left(\gamma_1 \cdot J_1 + \frac{J_2}{\gamma_1} + \frac{m \cdot \gamma_2^2}{4\pi^2 \cdot \gamma_1}\right) \cdot s^2 + \frac{k_{tb}}{\gamma_1}} \cdot T_m(s) \tag{10}$$

Incidentally, s denotes an operator for the Laplace transform. Also, $T_m(s)$ represents the Laplace transform of the torque $\tau_m$ of the electric motor 110; and $\Theta_2(s)$ represents the Laplace transform of the angle $\theta_2$ of rotation of the pinion shaft 106.

From Equation (10), the above transfer function $G_1(s)$ is expressed by Equation (11).

$$G_1(s) = \frac{1}{\left(\gamma_1 \cdot J_1 + \frac{J_2}{\gamma_1} + \frac{m \cdot \gamma_2^2}{4\pi^2 \cdot \gamma_1}\right) \cdot s^2 + \frac{k_{tb}}{\gamma_1}} \tag{11}$$

Also, from Equation (11), a resonance angular frequency $\omega_1$ is expressed by Equation (12).

$$\omega_1 = \sqrt{\frac{k_{tb}}{\gamma_1^2 \cdot J_1 + J_2 + \frac{m \cdot \gamma_2^2}{4\pi^2}}} \tag{12}$$

Therefore, the transfer function $H_1(s)$ indicating the characteristics of the resonance compensator 27 is represented as "$a_1 \cdot ((2\pi f_{c1}) \cdot (2\pi f_{c2}))/((s+2\pi f_{c1}) \cdot (s+2\pi f_{c2}))$." Incidentally, $a_1$ is a value expressed by Equation (13).

$$a_1 = \frac{(4\pi^2 \cdot \gamma_1^2 \cdot J_1 + 4\pi^2 \cdot J_2 + m \cdot \gamma_2^2) \cdot s^2 + 4\pi^2 \cdot k_{tb}}{4\pi^2 \cdot \gamma_1} \tag{13}$$

Then, the degree of the denominator of the transfer function $H_1(s)$ is set to the second-order degree, which is the lowest one of the degrees capable of ensuring the feasibility of the resonance compensator 27, and low-pass filters (LPFs) are provided in two stages. $f_{c1}$ and $f_{c2}$ represent cut-off frequencies of the LPFs.

Figure 27A:
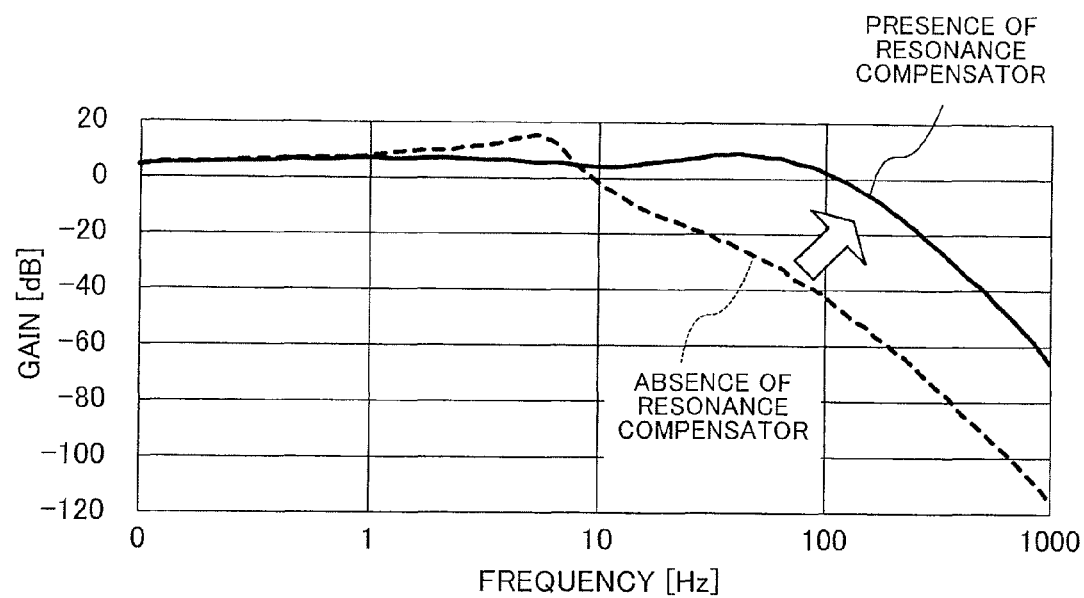
FIGS. 27A and 27B are bode diagrams showing a comparison of frequency characteristics of the control system between the presence of the resonance compensator and the absence of the resonance compensator.
Figure 27B:
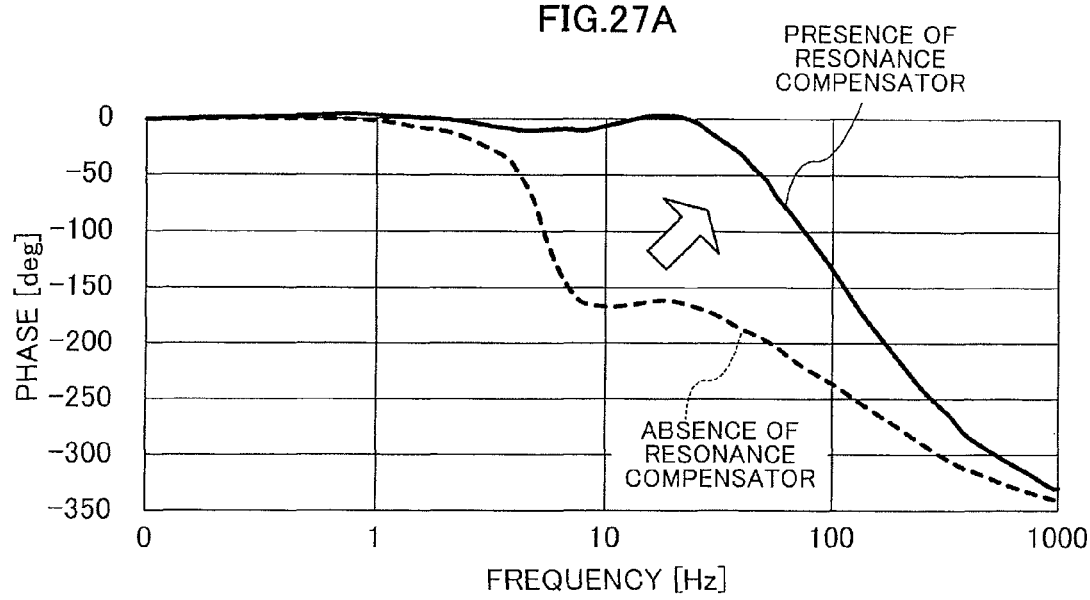

FIGS. 27A and 27B are bode diagrams showing a comparison of frequency characteristics of the control system between the presence of the resonance compensator 27 and the absence of the resonance compensator 27.

FIGS. 27A and 27B are the diagrams showing the results of simulations (or numerical experiments) performed on the control system in which the operation of the steering wheel 101 is an input and the angle of rotation of the pinion 106a is an output, and FIGS. 27A and 27B are a gain characteristic plot and a phase characteristic plot, respectively. In FIGS. 27A and 27B, a solid line indicates the results in the case of the presence of the resonance compensator 27, and a dashed line indicates the results in the case of the absence of the resonance compensator 27. Incidentally, the denominator of the transfer function $H_1(s)$ is set at a value equivalent to a two-stage construction of the low-pass filters each having a cut-off frequency of 100 Hz.

As shown in FIG. 27A, the provision of the resonance compensator 27 permits reducing or canceling out the peak of the resonance frequency component. Also, as shown in FIG. 27B, the presence of the resonance compensator 27 achieves a great improvement in phase delay, as compared to the absence of the resonance compensator 27. From these results, it can be seen that the provision of the resonance compensator 27 achieves an improvement in the stability. Also, the provision of the resonance compensator 27 allows an increase in a gain-crossover frequency and hence an improvement in the responsiveness.

Incidentally, the description has been given with regard to the electric power steering apparatus 100 of a pinion type; however, it is preferable that an electric power steering apparatus of a column type likewise include a resonance compensator such that the transfer function is $H_1(s)$ mentioned above.

Seventh Exemplary Embodiment

Figure 28:
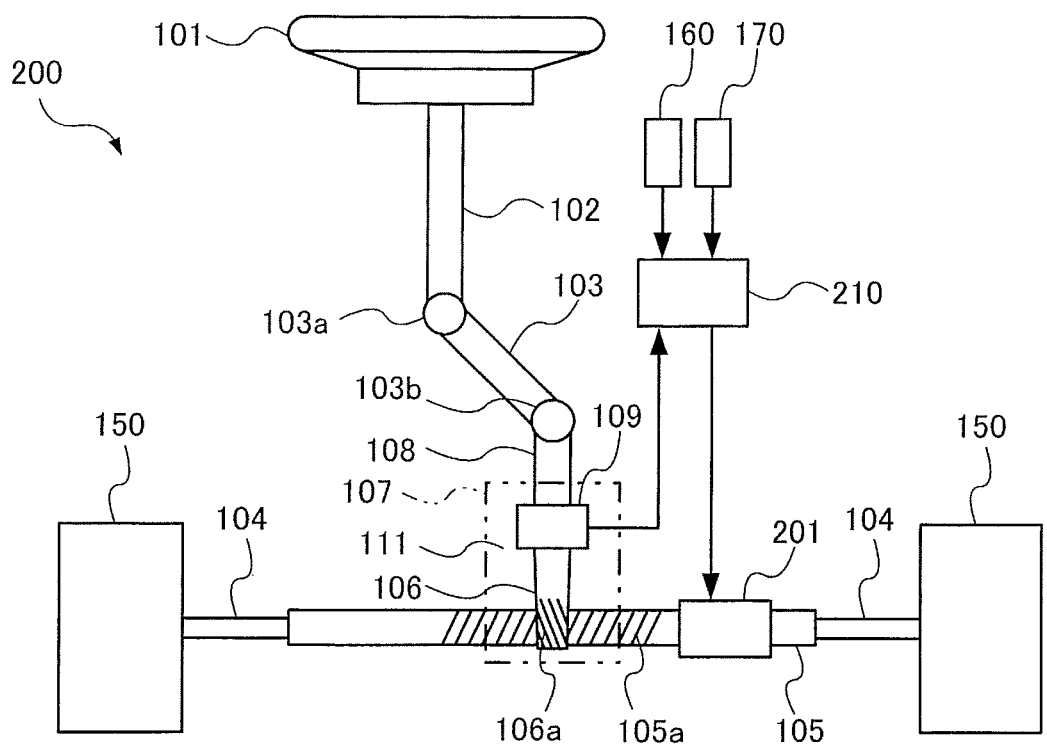
FIG. 28 is a diagram showing an outline configuration of an electric power steering apparatus according to the seventh exemplary embodiment.

FIG. 28 is a diagram showing an outline configuration of an electric power steering apparatus 200 according to the seventh exemplary embodiment. Hereinafter, a description will be given with regard to the difference between the seventh exemplary embodiment and the sixth exemplary embodiment. The same components are denoted by the same reference numerals, and the detailed description thereof will be omitted.

The electric power steering apparatus 200 (hereinafter sometimes called merely the "steering apparatus 200") according to the seventh exemplary embodiment is what is called an electric power steering apparatus of a rack assist type, and applies torque produced by an electric motor 201 to the rack shaft 105.

Specifically, the electric motor 201 according to the seventh exemplary embodiment includes a stator (not shown in the figure) mounted to a housing (not shown in the figure), and a rotor (not shown in the figure) mounted rotatably to the housing about the axis of the rack shaft 105 as the axis of rotation and also unmovably in an axial direction of the rack shaft 105. The rotor engages a ball screw nut through an elastic body, and the rotor produces assist force that effects rotation of the ball screw nut through the elastic body and thereby effects an axial movement of the rack shaft 105. Also, an output from the rotor is controlled by a controller 210 according to the seventh exemplary embodiment. Thereby, under control of the controller 210, the torque produced by the electric motor 201 is transmitted to the rack shaft 105 and thereby assists the application of the driver's steering force to the steering wheel 101.

Figure 29:
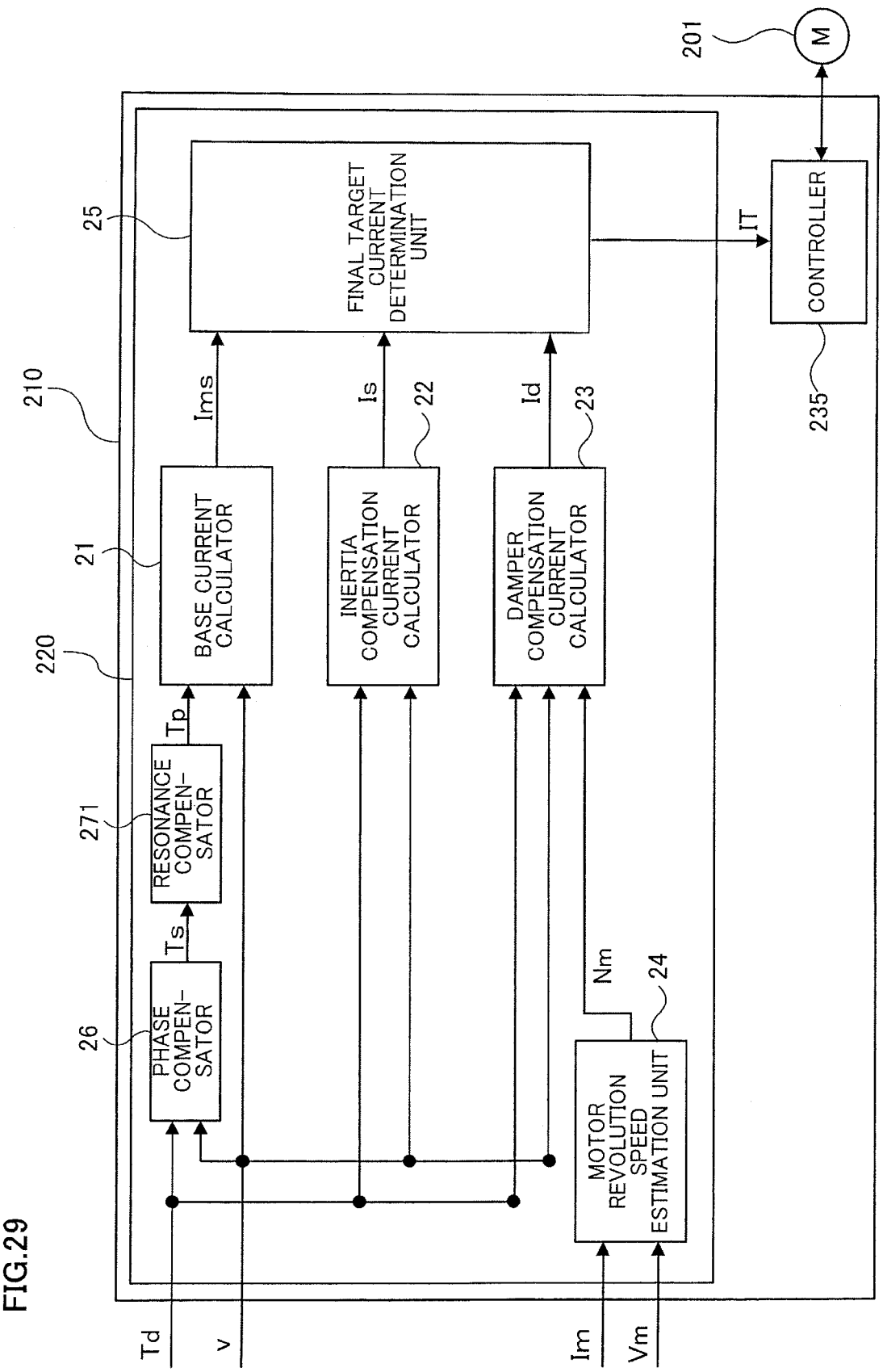
FIG. 29 is a schematic configuration diagram of the controller according to the seventh exemplary embodiment.

FIG. 29 is a schematic configuration diagram of the controller 210 according to the seventh exemplary embodiment.

As is the case with the control device 10 according to the sixth exemplary embodiment, the controller 210 includes a target current calculator 220 that calculates the target assist torque on the basis of the torque signal Td and calculates the target current required for the electric motor 201 to supply the target assist torque, and a controller 235 that performs feedback control or the like on the basis of the target current calculated by the target current calculator 220.

The controller 235 has the same function and configuration as the controller 30 of the control device 10 according to the sixth exemplary embodiment. The target current calculator 220 is different from the target current calculator 20 according to the sixth exemplary embodiment in that the target current calculator 220 has a resonance compensator 271 different from the resonance compensator 27, and in other respects, the target current calculator 220 has the same function and configuration as the target current calculator 20 according to the sixth exemplary embodiment.

The resonance compensator 271 is provided in order to eliminate or suppress the peak in the vicinity of the resonance frequency of the control system of the electric power steering apparatus 200 according to the seventh exemplary embodiment, the control system including the torsion bar (not shown in the figure) as the spring element, and the electric motor 201, the pinion shaft 106 and the rack shaft 105 as the inertial elements. Therefore, a transfer function $H_2(s)$ indicating characteristics of the resonance compensator 271 defines a transfer function $G_2(s)$ indicating characteristics of the control system of the steering apparatus 200 in the following manner. Specifically, a numerator of $H_2(s)$ has the same element as a denominator of $G_2(s)$, and the degree of a denominator of $H_2(s)$ is the second-order degree, which is the lowest one of the degrees capable of ensuring the feasibility of the resonance compensator 271, and LPFs are provided in two stages.

Firstly, discussion will be made with regard to the transfer function $G_2(s)$.

When $\tau_m$ (N·m) represents the torque of the electric motor 201, $\theta_1$ (rad) represents the angle of rotation, $\tau_1$ (N·m) represents the torque of the ball screw nut, and $J_1$ (kg·m$^2$) represents the inertia of the motor shaft, an equation of motion of the electric motor 201 is expressed by Equation (14) below.

$$\tau_m = J_1\ddot{\theta}_1 + \tau_1 \tag{14}$$

Here, the inertia $J_1$ of the motor shaft is represented as $J_1 = J_m + J_{T1}$, where $J_m$ (kg·m$^2$) represents the inertia of the motor; and $J_{T1}$ (kg·m$^2$) represents the inertia of the ball screw nut.

Also, when $\tau_2$ (N·m) represents the torque of the pinion shaft 106, $\theta_2$ (rad) represents the angle of rotation, $J_2$ (kg·m$^2$) represents the inertia of the pinion shaft, and $k_{tb}$ (N·m/rad) represents the spring constant of the torsion bar, an equation of motion of the pinion shaft 106 is expressed by Equation (15) below.

$$\tau_2 = J_2\ddot{\theta}_2 + k_{tb}\theta_2 \tag{15}$$

Also, when x (m) represents the displacement of the rack shaft 105, m (kg) represents the mass, $r_1$ represents a radius of rotation of the ball screw nut, and $r_2$ (m) represents the radius of rotation of the pinion 106a, an equation of motion of the rack shaft 105 is expressed by Equation (16) below.

$$\frac{\tau_1}{r_1} = m \cdot \ddot{x} + \frac{\tau_2}{r_2} \tag{16}$$

Here, the displacement x of the rack shaft 105 is expressed by Equation (17) or (18).

$$x = r_1 \cdot \theta_1 = \gamma_1/(2\cdot\pi) \times \theta_1 \tag{17}$$

$$x = r_2 \cdot \theta_2 = \gamma_2/(2\cdot\pi) \times \theta_2 \tag{18}$$

Incidentally, $\gamma_1$ is a ratio (m/rev) indicating a distance traveled by the rack shaft 105 during one revolution of the ball screw nut, and is represented as $\gamma_1 = 2\cdot\pi\cdot r_1$. Also, $\gamma_2$ is a ratio (m/rev) indicating a distance traveled by the rack shaft 105 during one revolution of the pinion shaft 106, and is represented as $\gamma_2 = 2\cdot\pi\cdot r_2$.

Also, Equation (19) is derived from Equations (17) and (18).

$$\theta_1 = \gamma_2/\gamma_1 \times \theta_2 \tag{19}$$

Also, Equation (20) is derived from Equations (16) and (17).

$$T_1 = \frac{r_1 \cdot \gamma_2 \cdot m}{2 \cdot \pi} \cdot \ddot{\theta}_2 + \frac{r_1}{r_2} \cdot T_2 \tag{20}$$

Then, Equation (21) is derived from Equations (14) to (20).

$$4\pi^2 \cdot \gamma_1 \gamma_2 \tau_m = (4\pi^2 \cdot \gamma_2^2 J_1 \gamma_1^2 \gamma_2^2 m + 4\pi^2 \cdot \gamma_1^2 J_2) \cdot \ddot{\theta}_2 + 4\pi^2 \cdot \gamma_1^2 k_{tb}\theta_2 \tag{21}$$

Laplace transform of Equation (21) to organize the equation leads to Equation (22).

$$\Theta_2(s) = \frac{1}{\left(\frac{\gamma_2}{\gamma_1} \cdot J_1 + \frac{\gamma_1}{\gamma_2} \cdot J_2 + \frac{m \cdot \gamma_1 \cdot \gamma_2}{4\pi^2}\right) \cdot s^2 + \frac{\gamma_1}{\gamma_2} \cdot k_{tb}} \cdot T_m(s) \tag{22}$$

Incidentally, s denotes an operator for the Laplace transform. Also, $T_m(s)$ represents the Laplace transform of the torque $\tau_m$ of the electric motor 201; and $\Theta_2(s)$ represents the Laplace transform of the angle $\theta_2$ of rotation of the pinion shaft 106.

From Equation (22), the above transfer function $G_2(s)$ is expressed by Equation (23).

$$G_2(s) = \frac{1}{\left(\frac{Y_2}{\gamma_1} \cdot J_1 + \frac{Y_1}{\gamma_2} \cdot J_2 + \frac{m \cdot Y_1 \cdot Y_2}{4\pi^2}\right) \cdot s^2 + \frac{Y_1}{\gamma_2} \cdot k_{tb}} \quad (23)$$

Also, from Equation (23), a resonance angular frequency $\omega_2$ is expressed by Equation (24).

$$\omega_2 = \sqrt{\frac{4\pi^2 \cdot Y_1^2 \cdot k_{tb}}{4\pi^2 \cdot Y_2^2 \cdot J_1 + Y_1^2 \cdot Y_2^2 \cdot m + 4\pi^2 \cdot Y_1^2 \cdot J_2}} \quad (24)$$

Therefore, the degree of the denominator of the transfer function $H_2(s)$ indicating the characteristics of the resonance compensator 271 is set to the second-order degree, which is the lowest one of the degrees capable of ensuring the feasibility of the resonance compensator 271, and LPFs are provided in two stages. Specifically, the transfer function $H_2(s)$ is represented as "$H_2(s) = a_2 \cdot ((2\pi f_{c1}) \cdot (2\pi f_{c2}))/((s+2\pi f_{c1}) \cdot (s+2\pi f_{c2}))$." Incidentally, $a_2$ is a value expressed by Equation (25). Also, $f_{c1}$ and $f_{c2}$ represent the cut-off frequencies of the LPFs.

$$a_2 = \frac{(4\pi^2 \cdot Y_2^2 \cdot J_1 + 4\pi^2 \cdot Y_1^2 \cdot J_2 + m \cdot Y_1^2 \cdot Y_2^2) \cdot s^2 + 4\pi^2 \cdot Y_1^2 \cdot k_{tb}}{4\pi^2 \cdot \gamma_1 \cdot \gamma_2} \quad (25)$$

The provision of the resonance compensator 271 in which the transfer function is $H_2(s)$ permits reducing or canceling out the peak of the resonance frequency component also in the power steering apparatus 200 according to the seventh exemplary embodiment. Also, the presence of the resonance compensator 271 allows a great improvement in the phase delay, as compared to the absence of the resonance compensator 271. Thereby, the provision of the resonance compensator 271 allows an improvement in the stability. Also, the provision of the resonance compensator 271 allows an increase in the gain-crossover frequency and hence an improvement in the responsiveness.

Eighth Exemplary Embodiment

Figure 30:
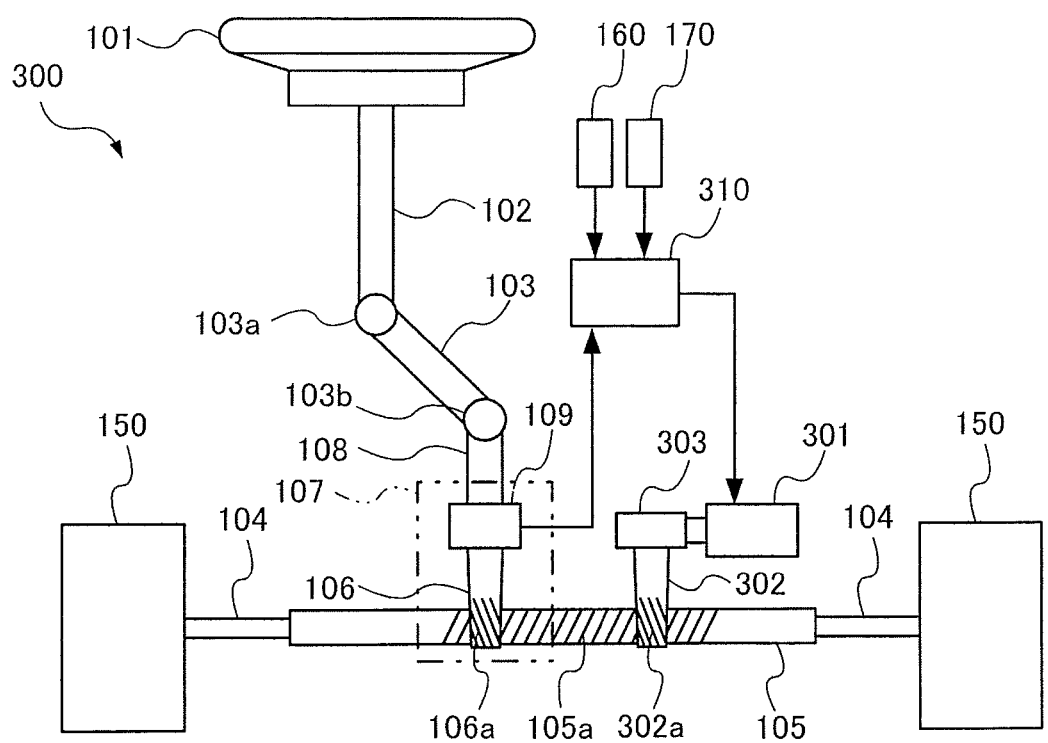
FIG. 30 is a diagram showing an outline configuration of an electric power steering apparatus according to an eighth exemplary embodiment.

FIG. 30 is a diagram showing an outline configuration of an electric power steering apparatus 300 according to an eighth exemplary embodiment. Hereinafter, a description will be given with regard to the difference between the eighth exemplary embodiment and the sixth exemplary embodiment. The same components are denoted by the same reference numerals, and the detailed description thereof will be omitted.

The electric power steering apparatus 300 (hereinafter sometimes called merely the "steering apparatus 300") according to the eighth exemplary embodiment is what is called an electric power steering apparatus of a double-pinion type, and applies torque produced by an electric motor 301 to the rack shaft 105 through a pinion 302a of a second pinion shaft 302. The second pinion shaft 302 is a member provided aside from the pinion shaft 106 connected to the steering wheel 101 via the torsion bar, as shown in FIG. 30.

As mentioned above, the steering apparatus 300 according to the eighth exemplary embodiment includes the second pinion shaft 302. A worm wheel 303 mounted to the second pinion shaft 302 is connected to a worm gear (not shown in the figure) mounted to an output shaft of the electric motor 301. An output from the electric motor 301 is controlled by a controller 310 according to the eighth exemplary embodiment. Thereby, under control of the controller 310, the torque produced by the electric motor 301 is transmitted to the rack shaft 105 and thereby assists the application of the driver's steering force to the steering wheel 101.

Figure 31:
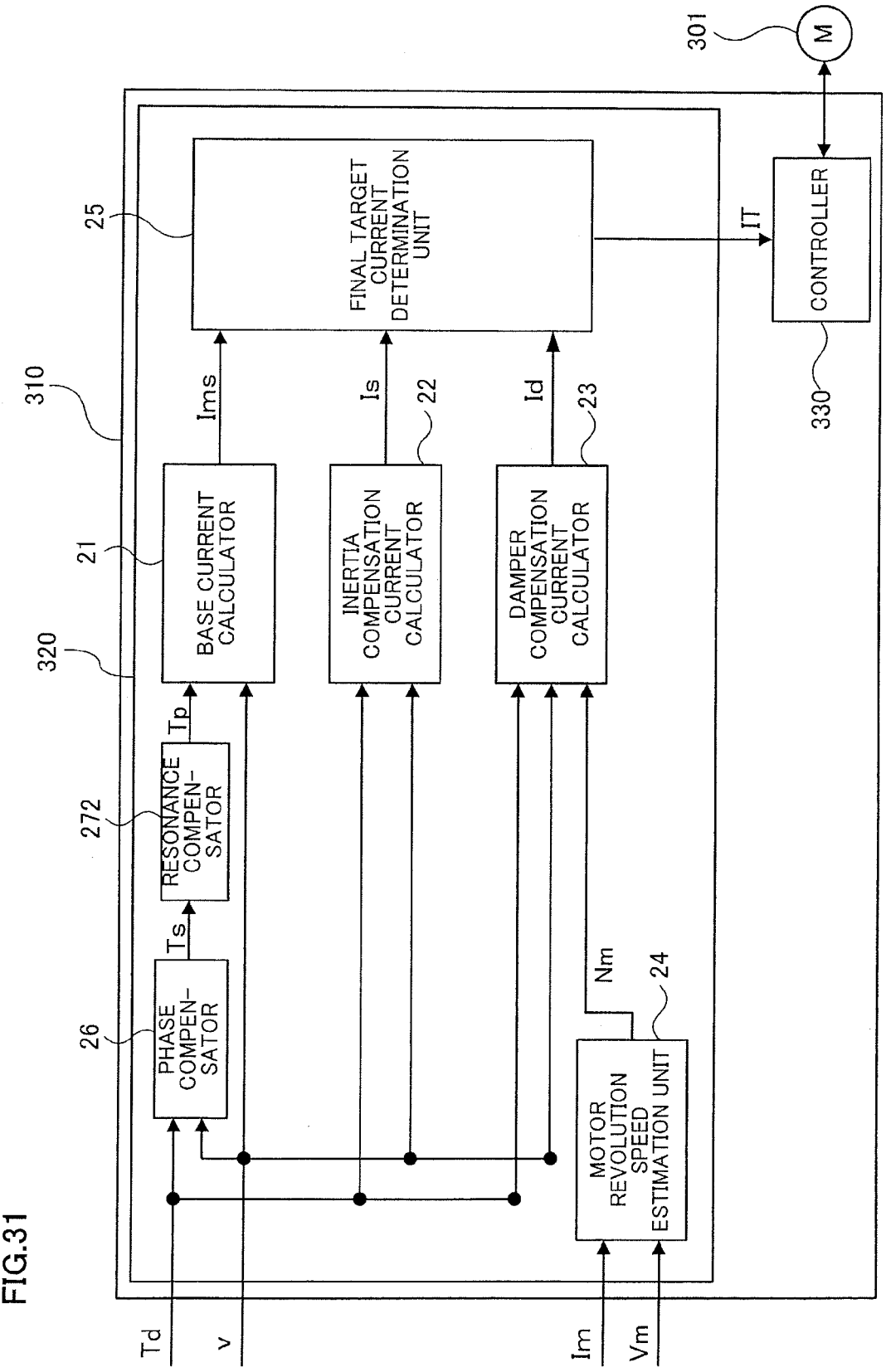
FIG. 31 is a schematic configuration diagram of the controller according to the eighth exemplary embodiment.

FIG. 31 is a schematic configuration diagram of the controller 310 according to the eighth exemplary embodiment.

As is the case with the control device 10 according to the sixth exemplary embodiment, the controller 310 includes a target current calculator 320 that calculates the target assist torque on the basis of the torque signal Td and calculates the target current required for the electric motor 301 to supply the target assist torque, and a controller 330 that performs feedback control or the like on the basis of the target current calculated by the target current calculator 320.

The controller 330 has the same function and configuration as the controller 30 of the control device 10 according to the sixth exemplary embodiment. The target current calculator 320 is different from the target current calculator 20 according to the sixth exemplary embodiment in that the target current calculator 320 has a resonance compensator 272 different from the resonance compensator 27, and in other respects, the target current calculator 320 has the same function and configuration as the target current calculator 20 according to the sixth exemplary embodiment.

The resonance compensator 272 is provided in order to eliminate or suppress the peak in the vicinity of the resonance frequency of the control system of the steering apparatus 300 according to the eighth exemplary embodiment, the control system including the torsion bar (not shown in the figure) as the spring element, and the electric motor 301, the pinion shaft 106, the second pinion shaft 302 and the rack shaft 105 as the inertial elements. Therefore, a transfer function $H_3(s)$ indicating characteristics of the resonance compensator 272 defines a transfer function $G_3(s)$ indicating characteristics of the mechanical vibration system of the steering apparatus 300 in the following manner. Specifically, a numerator of $H_3(s)$ has the same element as a denominator of $G_3(s)$, and the degree of a denominator of $H_3(s)$ is the second-order degree, which is the lowest one of the degrees capable of ensuring the feasibility of the resonance compensator 272, and LPFs are provided in two stages.

Firstly, discussion will be made with regard to the transfer function $G_3(s)$.

When $\tau_m$ (N·m) represents the torque of the electric motor 301, $\theta_1$ (rad) represents the angle of rotation, $\tau_1$ (N·m) represents the torque of the worm gear, and $J_1$ (kg·m²) represents the inertia of the motor shaft, an equation of motion of the electric motor 301 is expressed by Equation (26) below.

$$r_m = J_1 \ddot{\theta}_1 + \tau_1 \quad (26)$$

Here, the inertia $J_1$ of the motor shaft is represented as $J_1 = J_m + J_{T1}$, where $J_m$ (kg·m²) represents the inertia of the motor; and $J_{T1}$ (kg·m²) represents the inertia of the worm gear.

Also, when $\theta_2$ (rad) represents the angle of rotation of the second pinion shaft 302, $\tau_2$ (N·m) represents the torque of the worm wheel 303, $\tau_3$ (N·m) represents the torque of the pinion 302a of the second pinion shaft 302, and $J_2$ (kg·m²) represents the inertia of the pinion shaft, an equation of motion of the second pinion shaft 302 is expressed by Equation (27) below.

$$r_2 = J_2 \ddot{\theta}_2 + \tau_3 \quad (27)$$

Here, the inertia $J_2$ of the pinion shaft is represented as $J_2 = J_{T2} + J_{T3}$, where $J_{T2}$ (kg·m²) represents the inertia of the worm wheel; and $J_{T3}$ (kg·m²) represents the inertia of the second pinion shaft 302.

Also, when $\theta_3$ (rad) represents the angle of rotation of the pinion shaft 106, $\tau_4$ (N·m) represents the torque of the pinion 106a of the pinion shaft 106, $J_3$ (kg·m²) represents the inertia of the pinion shaft and $k_{tb}$ (N·m/rad) represents the spring constant of the torsion bar, an equation of motion of the pinion shaft 106 is expressed by Equation (28) below.

$$\tau_4 = J_3 \ddot{\theta}_3 + k_{tb} \theta_3 \tag{28}$$

Also, when x (m) represents the displacement of the rack shaft 105, m (kg) represents the mass, $r_1$ (m) represents a radius of rotation of the pinion 302a of the second pinion shaft 302, and $r_2$ (m) represents the radius of rotation of the pinion 106a of the pinion shaft 106, an equation of motion of the rack shaft 105 is expressed by Equation (29).

$$\frac{T_3}{r_1} = m \cdot \ddot{x} + \frac{T_4}{r_2} \tag{29}$$

Here, the displacement x of the rack shaft 105 is expressed by Equation (30).

$$x = r_1 \cdot \theta_2 = r_2 \cdot \theta_3 \tag{30}$$

Also, when $\gamma_1$ represents a worm speed reduction ratio, $\gamma_2$ (m/rev) represents a ratio indicating a distance traveled by the rack shaft 105 during one revolution of the second pinion shaft 302, and $\gamma_3$ (m/rev) represents a ratio indicating a distance traveled by the rack shaft 105 during one revolution of the pinion shaft 106, $\gamma_1$, $\gamma_2$ and $\gamma_3$ are expressed by Equations (31), (32) and (33), respectively.

$$\gamma_1 = \theta_1/\theta_2 = \tau_2/\tau_1 \tag{31}$$

$$\gamma_2 = 2 \cdot \pi \cdot r_1 \tag{32}$$

$$\gamma_3 = 2 \cdot \pi \cdot r_2 \tag{33}$$

Equation (34) is derived from Equations (26), (30) and (31).

$$T_m = \gamma_1 \cdot J_1 \cdot \frac{r_2}{r_1} \cdot \ddot{\theta}_3 + \frac{1}{\gamma_1} \cdot \tau_2 \tag{34}$$

Also, Equation (35) is derived from Equations (27) and (30).

$$T_2 = J_2 \cdot \frac{r_2}{r_1} \cdot \ddot{\theta}_3 + \tau_3 \tag{35}$$

Therefore, Equation (36) is derived from Equations (34) and (35).

$$T_m = \gamma_1 \cdot J_1 \cdot \frac{r_2}{r_1} \cdot \ddot{\theta}_3 + \frac{1}{\gamma_1} \cdot \left( J_2 \cdot \frac{r_2}{r_1} \cdot \ddot{\theta}_3 + \tau_3 \right) \tag{36}$$

Also, Equation (37) is derived from Equations (28), (29) and (30).

$$T_3 = r_1 \cdot r_2 \cdot m \cdot \ddot{\theta}_3 + J_3 \cdot \frac{r_1}{r_2} \cdot \ddot{\theta}_3 + \frac{r_1}{r_2} \cdot k_{tb} \cdot \theta_3 \tag{37}$$

Then, Equation (38) is derived from Equations (36) and (37).

$$r_1 r_2 \gamma_1 \tau_m = (r_2^2 \gamma_1^2 J_1 + \gamma_{1hu\,2} \gamma_2^2 m + r_2^2 J_2 + r_1^2 J_3) \ddot{\theta}_3 + r_1^2 k_{tb} \theta_3 \tag{38}$$

Laplace transform of an equation obtained by substituting Equations (32) and (33) into Equation (38) to organize the equations leads to Equation (39).

$$\Theta_3(s) = \frac{1}{\left( \frac{\Upsilon_1 \Upsilon_3}{\gamma_2} \cdot J_1 + \frac{\Upsilon_3}{\Upsilon_1 \cdot \gamma_2} \cdot J_2 + \frac{m \cdot \Upsilon_2 \cdot \Upsilon_3}{4\pi^2 \cdot \gamma_1} + \frac{\Upsilon_2}{\Upsilon_1 \cdot \gamma_3} \cdot J_3 \right) \cdot} \cdot T_m(s) \tag{39}$$
$$s^2 + \frac{\Upsilon_2}{\Upsilon_1 \cdot \gamma_3} \cdot k_{tb}$$

Incidentally, s denotes an operator for the Laplace transform. Also, $T_m(s)$ represents the Laplace transform of the torque $\tau_m$ of the electric motor 301, and $\Theta_3(s)$ represents the Laplace transform of the angle $\theta_3$ of rotation of the pinion shaft 106.

From Equation (39), the above transfer function $G_3(s)$ is expressed by Equation (40).

$$G_3(s) = \frac{(1)}{\left( \frac{\Upsilon_1 \cdot \Upsilon_3}{\gamma_2} \cdot J_1 + \frac{\Upsilon_3}{\Upsilon_1 \cdot \gamma_2} \cdot J_2 + \frac{m \cdot \Upsilon_2 \cdot \Upsilon_3}{4\pi^2 \cdot \gamma_1} + \frac{\Upsilon_2}{\Upsilon_1 \cdot \gamma_3} \cdot J_3 \right) \cdot} \tag{40}$$
$$s^2 + \frac{\Upsilon_2}{\Upsilon_1 \cdot \gamma_3} \cdot k_{tb}$$

Also, from Equation (40), a resonance angular frequency $\omega_3$ is expressed by Equation (41).

$$\omega_3 = \sqrt{\frac{4\pi^2 \cdot \Upsilon_2^2 \cdot k_{tb}}{4\pi^2 \cdot \Upsilon_1^2 \cdot \Upsilon_3^2 \cdot J_1 + 4\pi^2 \cdot \Upsilon_3^2 \cdot J_2 + \Upsilon_2^2 \cdot \Upsilon_3^2 \cdot m + 4\pi^2 \cdot \Upsilon_2^2 \cdot J_3}} \tag{41}$$

Then, the degree of the denominator of the transfer function $H_3(s)$ indicating the characteristics of the resonance compensator 272 is set to the second-order degree, which is the lowest one of the degrees capable of ensuring the feasibility of the resonance compensator 272, and LPFs are provided in two stages. Specifically, the transfer function $H_3(s)$ is represented as "$H_3(s) = a_3 \cdot ((2\pi f_{c1}) \cdot (2\pi f_{c2}))/((s + 2\pi f_{c1}) \cdot (s + 2\pi f_{c2}))$." Incidentally, $a_3$ is a value expressed by Equation (42). Also, $f_{c1}$ and $f_{c2}$ represent the cut-off frequencies of the LPFs.

$$a_3 = \frac{(4\pi^2 \cdot \Upsilon_1^2 \cdot \Upsilon_3^2 \cdot J_1 + 4\pi^2 \cdot \Upsilon_3^2 \cdot J_2 + \Upsilon_2^2 \cdot \Upsilon_3^2 \cdot m + 4\pi^2 \cdot \Upsilon_2^2 \cdot J_3) \cdot}{4\pi^2 \cdot \gamma_1 \cdot \gamma_2 \cdot \gamma_3} \tag{42}$$

The provision of the resonance compensator 272 in which the transfer function is $H_3(s)$ permits reducing or canceling out the peak of the resonance frequency component also in the power steering apparatus 300 according to the eighth exemplary embodiment. Also, the presence of the resonance compensator 272 allows a great improvement in the phase delay, as compared to the absence of the resonance compensator 272. Thereby, the provision of the resonance compensator 272 allows an improvement in the stability. Also, the provision of the resonance compensator 272 allows an increase in the gain-crossover frequency and hence an improvement in the responsiveness.

Incidentally, it is preferable that a correction factor varying according to the circumstances be used to correct the transfer functions of the resonance compensators 27, 271 and 272 according to the above-mentioned sixth to eighth exemplary embodiments.

Specifically, preferably, in the transfer functions "$H_n(s)=a_n \cdot ((2\pi f_{c1}) \cdot (2\pi f_{c2}))/((s+2\pi f_{c1}) \cdot (s+2\pi f_{c2}))$" (where n=1, 2, 3)" of the resonance compensators 27, 271 and 272 according to the above-mentioned sixth to eighth exemplary embodiments, the operator "s" for the Laplace transform in a$_n$ is replaced by "$\alpha_1 \times s$," where $\alpha_1$ represents the correction factor, and the corrected transfer function is used as the transfer function of any one of the resonance compensators 27, 271 and 272.

For instance, the transfer function $H_1(s)$ of the resonance compensator 27 according to the sixth exemplary embodiment is corrected as expressed by Equation (43).

$$H_{1f}(s) = \frac{(4\pi^2 \cdot Y_1^2 \cdot J_1 + 4\pi^2 \cdot J_2 + m \cdot Y_2^2) \cdot (\alpha s)^2 + 4\pi^2 \cdot k_{tb}}{4\pi^2 \cdot \gamma_1} \cdot \frac{(2\pi \cdot f_{c1}) \cdot (2\pi \cdot f_{c2})}{(s + 2\pi \cdot f_{c1}) \cdot (s + 2\pi \cdot f_{c2})}$$ (43)

Figure 32:
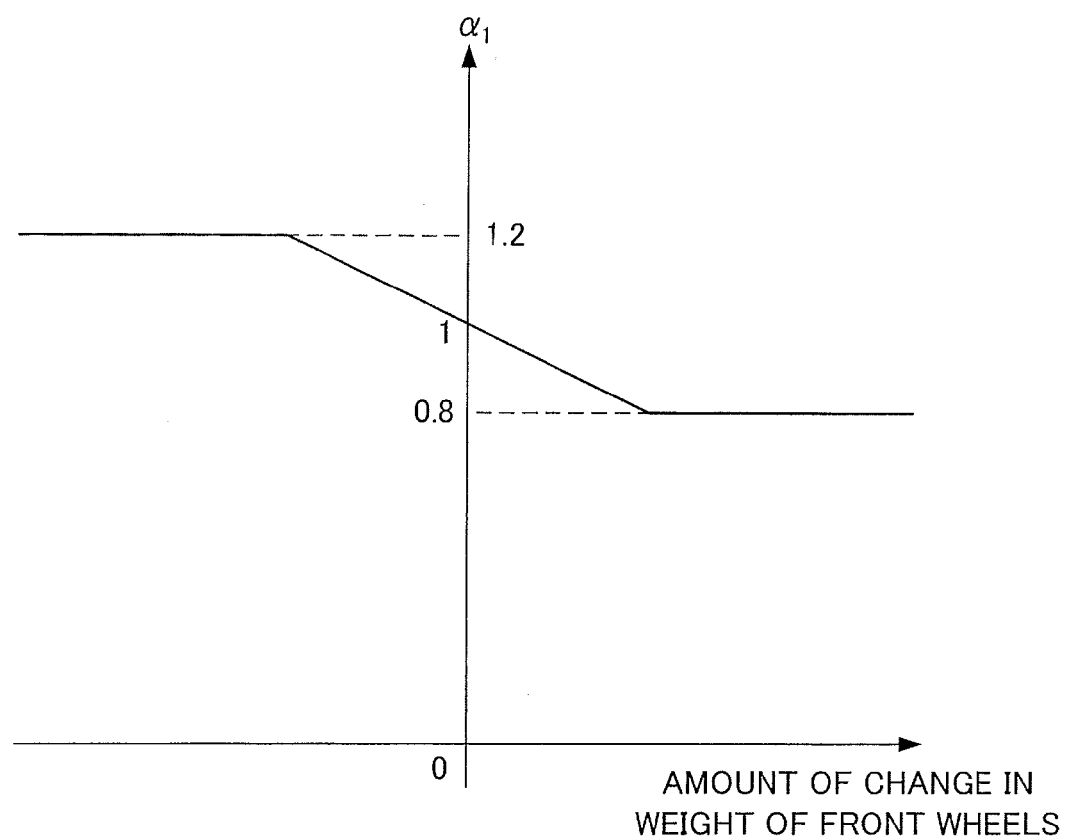
FIG. 32 is a graph showing the relationship between the correction factor $\alpha_1$ and the amount of change in the weight of the front wheels relative to its reference value.

FIG. 32 is a graph showing the relationship between the correction factor $\alpha_1$ and the amount of change in the weight of the front wheels 150 relative to its reference value (incidentally, the amount of change has a positive value if the weight is more than the reference value, and the amount of change has a negative value if the weight is less than the reference value). For example, the optimum correction factor $\alpha_1$ in accordance with the amount of change in the weight of the front wheels 150 is derived in advance on the basis of an empirical rule, as shown in FIG. 32. Then, the resonance compensators 27, 271 and 272 calculate the correction factor $\alpha_1$ by substituting the amount of change in the weight of the front wheels 150 into a map showing the correspondence between the amount of change in the weight of the front wheels 150 and the correction factor $\alpha_1$, or a relational expression of the amount of change in the weight of the front wheels 150 and the correction factor $\alpha_1$, which has previously been created and stored in the ROM, and uses the calculated correction factor $\alpha_1$ in the transfer function.

Incidentally, if the weight of the front wheels 150 is more than the reference value, the resonance frequency of the control system, inclusive of also the front wheels 150, with the steering apparatus 100, 200 and 300 mounted on the vehicle, is lower than $\omega_n$ (where n=1, 2, 3), or if the weight of the front wheels 150 is less than the reference value, the resonance frequency is higher than $\omega_n$. As shown in FIG. 32, therefore, the correction factor $\alpha_1$ is 1 if the weight of the front wheels 150 is equal to the reference value, and the correction factor $\alpha_1$ decreases to 0.8 as the weight increases, and the correction factor $\alpha_1$ is set to 0.8 if the weight is more than a given value. Also, preferably, the correction factor $\alpha_1$ increases to 1.2 as the weight of the front wheels 150 becomes lower than the reference value, and the correction factor $\alpha_1$ is set to 1.2 if the weight is less than the given value.

Figure 33:
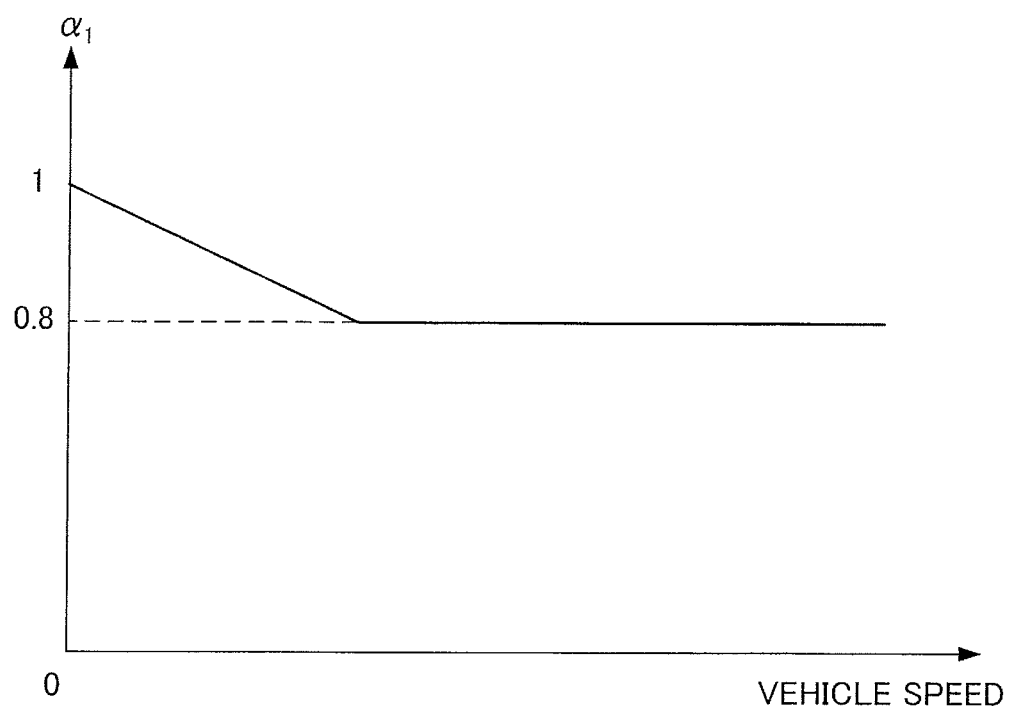
FIG. 33 is a graph showing the relationship between the correction factor $\alpha_1$ and the vehicle speed.

Also, it is preferable that the correction factor $\alpha_1$ vary according to the vehicle speed. FIG. 33 is a graph showing the relationship between the correction factor $\alpha_1$ and the vehicle speed. For example, the optimum correction factor $\alpha_1$ in accordance with the vehicle speed is derived in advance on the basis of an empirical rule, as shown in FIG. 33. Then, the resonance compensators 27, 271 and 272 calculate the correction factor $\alpha_1$ by substituting the vehicle speed signal v into a map showing the correspondence between the vehicle speed signal v and the correction factor $\alpha_1$, or a relational expression of the vehicle speed signal v and the correction factor $\alpha_1$, which has previously been created and stored in the ROM, and uses the calculated correction factor $\alpha_1$ in the transfer function.

Incidentally, it is conceivable that the resonance frequency decreases as the vehicle speed increases, and thus, as shown in FIG. 33, preferably, the correction factor $\alpha_1$ is 1 when the vehicle speed is zero, the correction factor $\alpha_1$ decreases to 0.8 as the vehicle speed increases, and the correction factor $\alpha_1$ is 0.8 when the vehicle speed is more than a given speed.

Figure 34:
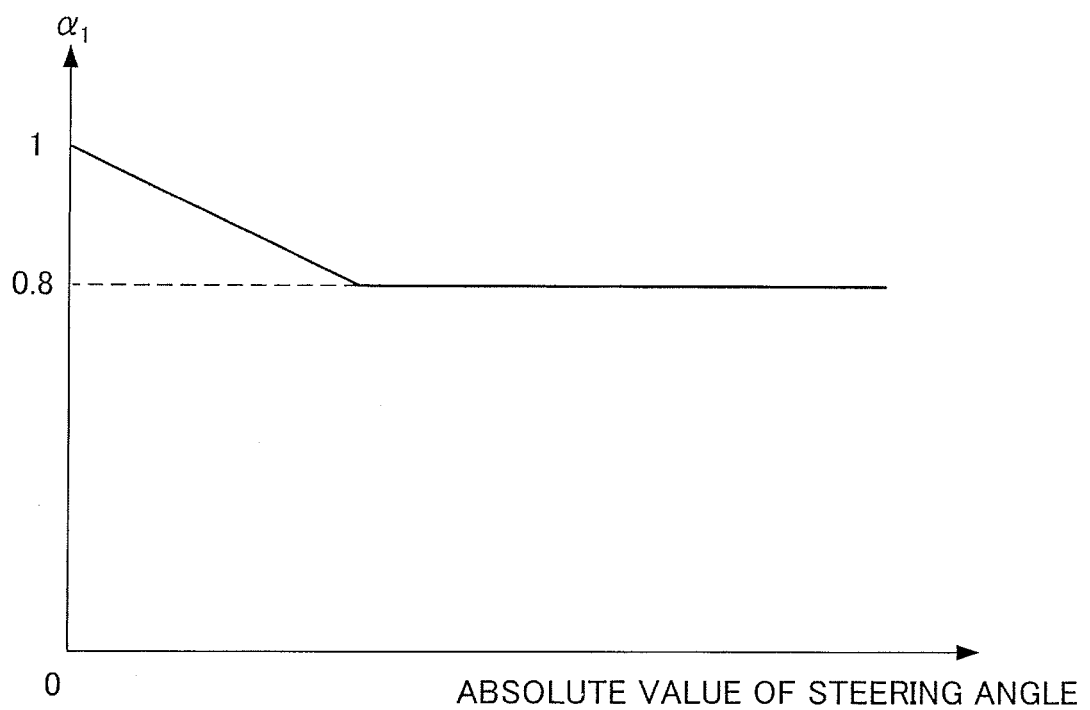
FIG. 34 is a graph showing the relationship between the correction factor $\alpha_1$ and the absolute value of the steering angle.

Also, it is preferable that the correction factor $\alpha_1$ vary according to the angle of rotation (or a steering angle) of the steering wheel 101. FIG. 34 is a graph showing the relationship between the correction factor $\alpha_1$ and the absolute value of the steering angle. For example, the optimum correction factor $\alpha_1$ in accordance with the absolute value of the steering angle is derived in advance on the basis of an empirical rule, as shown in FIG. 34. Then, the resonance compensators 27, 271 and 272 calculate the correction factor $\alpha_1$ by substituting the detected steering angle into a map showing the correspondence between the absolute value of the steering angle and the correction factor $\alpha_1$, or a relational expression of the absolute value of the steering angle and the correction factor $\alpha_1$, which has previously been created and stored in the ROM, and uses the calculated correction factor $\alpha_1$ in the transfer function.

Incidentally, it is conceivable that the resonance frequency decreases as the absolute value of the steering angle increases, and thus, as shown in FIG. 34, preferably, the correction factor $\alpha_1$ is 1 when the absolute value of the steering angle is zero, the correction factor $\alpha_1$ decreases to 0.8 as the absolute value of the steering angle increases, and the correction factor $\alpha_1$ is 0.8 when the absolute value of the steering angle is more than a given value.

Then, the resonance angular frequency corrected according to the circumstances, as mentioned above, is used in the transfer functions of the resonance compensators 27, 271 and 272 thereby to permit achieving an improvement in the stability with higher accuracy and also an improvement in the response.

Also, it is preferable that a transfer function corrected by multiplying, by $\beta_1$, the transfer functions $H_n(s)$ (where n=1, 2, 3) of the resonance compensators 27, 271 and 272 according to the above-mentioned sixth to eighth exemplary embodiments should be used as the transfer function, where $\beta_1$ represents the correction factor. Specifically, the transfer function is corrected to $H_{ng}(s)=\beta_1 \times H_n(s)$ (where n=1, 2, 3), which is then used.

Figure 35:
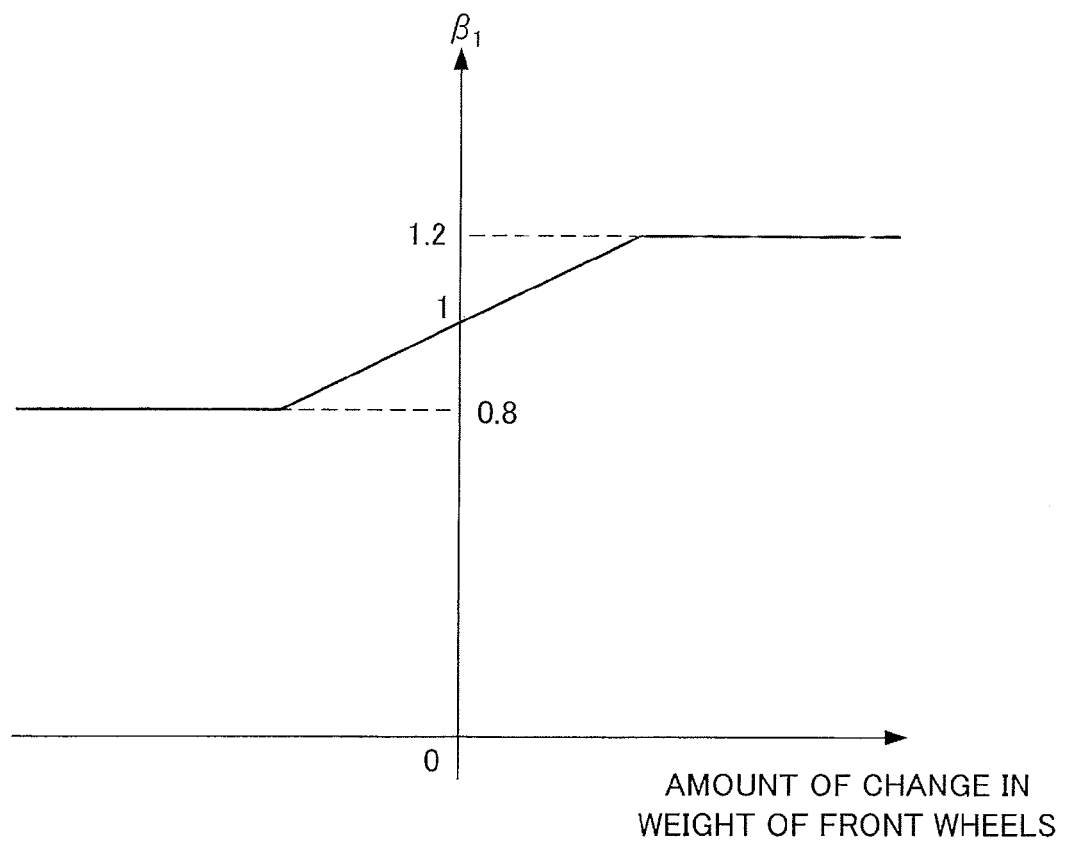
FIG. 35 is a graph showing the relationship between the correction factor $\beta_1$ and the amount of change in the weight of the front wheels relative to its reference value.

FIG. 35 is a graph showing the relationship between the correction factor $\beta_1$ and the amount of change in the weight of the front wheels 150 relative to its reference value (incidentally, the amount of change has a positive value if the weight is more than the reference value, or the amount of change has a negative value if the weight is less than the reference value). For example, the optimum correction factor $\beta_1$ for the amount of change in the weight of the front wheels 150 is derived in advance on the basis of an empirical rule, as shown in FIG. 35. Then, the resonance compensators 27, 271 and 272 calculate the correction factor $\beta_1$ by substituting the amount of change in the weight of the front wheels 150 into a map showing the correspondence between the amount of change in the weight of the front wheels 150 and the correction factor $\beta_1$, or a relational expression of the amount of change in the weight of the front wheels 150 and the correction factor $\beta_1$, which has previously been created and stored in the ROM, and uses the calculated correction factor $\beta_1$ in the transfer function.

Incidentally, if the weight of the front wheels 150 is more than the reference value, vibration, with the steering apparatus 100, 200 and 300 mounted on the vehicle, increases, or if the weight of the front wheels 150 is less than the reference value, the vibration decreases. As shown in FIG. 35, therefore, the correction factor $\beta_1$ is 1 if the weight of the front wheels 150 is equal to the reference value, the correction factor $\beta_1$ increases to 1.2 as the weight increases, and the correction factor $\beta_1$ is set to 1.2 if the weight is more than a given value. Also, preferably, the correction factor $\beta_1$ decreases to 0.8 as the weight of the front wheels 150 becomes lower than the reference value, and the correction factor $\beta_1$ is set to 0.8 if the weight is less than the given value.

Figure 36:
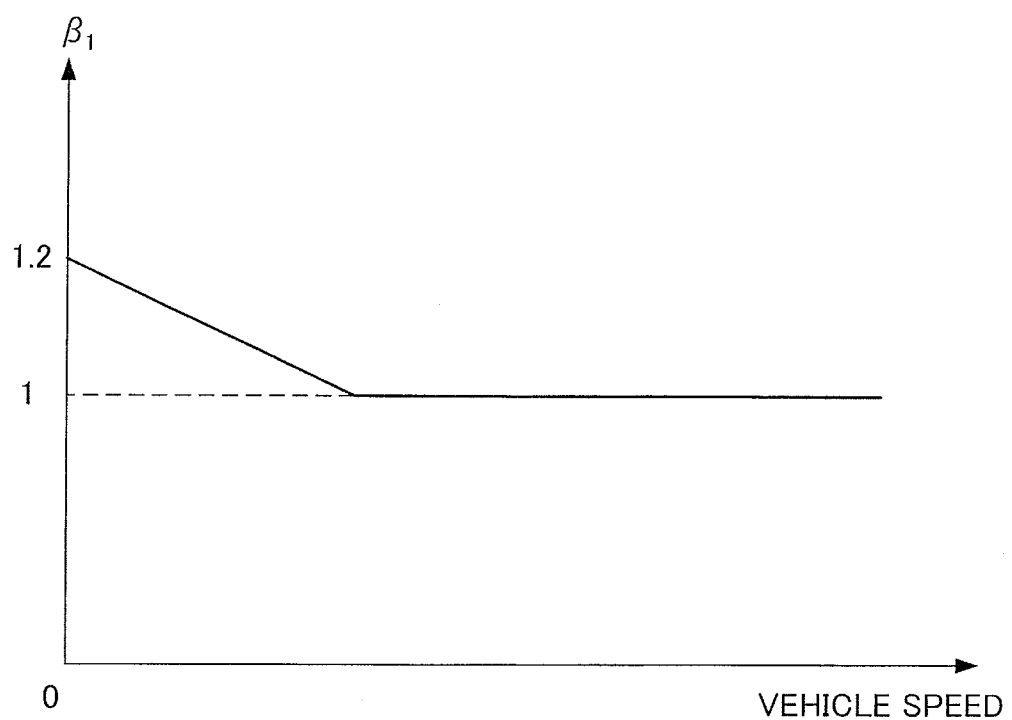
FIG. 36 is a graph showing the relationship between the correction factor $\beta_1$ and the vehicle speed.

Also, it is preferable that the correction factor $\beta_1$ vary according to the vehicle speed. FIG. 36 is a graph showing the relationship between the correction factor $\beta_1$ and the vehicle speed. For example, the optimum correction factor $\beta_1$ in accordance with the vehicle speed is derived in advance on the basis of an empirical rule, as shown in FIG. 36. Then, the resonance compensators 27, 271 and 272 calculate the correction factor $\beta_1$ by substituting the vehicle speed signal v into a map showing the correspondence between the vehicle speed signal v and the correction factor $\beta_1$, or a relational expression of the vehicle speed signal v and the correction factor $\beta_1$, which has previously been created and stored in the ROM, and uses the calculated correction factor $\beta_1$ in the transfer function.

Incidentally, the vibration should be suppressed as the vehicle speed decreases, and thus, as shown in FIG. 36, preferably, the correction factor $\beta_1$ is 1.2 when the vehicle speed is zero, and the correction factor $\beta_1$ decreases to 1 as the vehicle speed increases, and the correction factor $\beta_1$ is set to 1 when the vehicle speed is more than a given speed.

Figure 37:
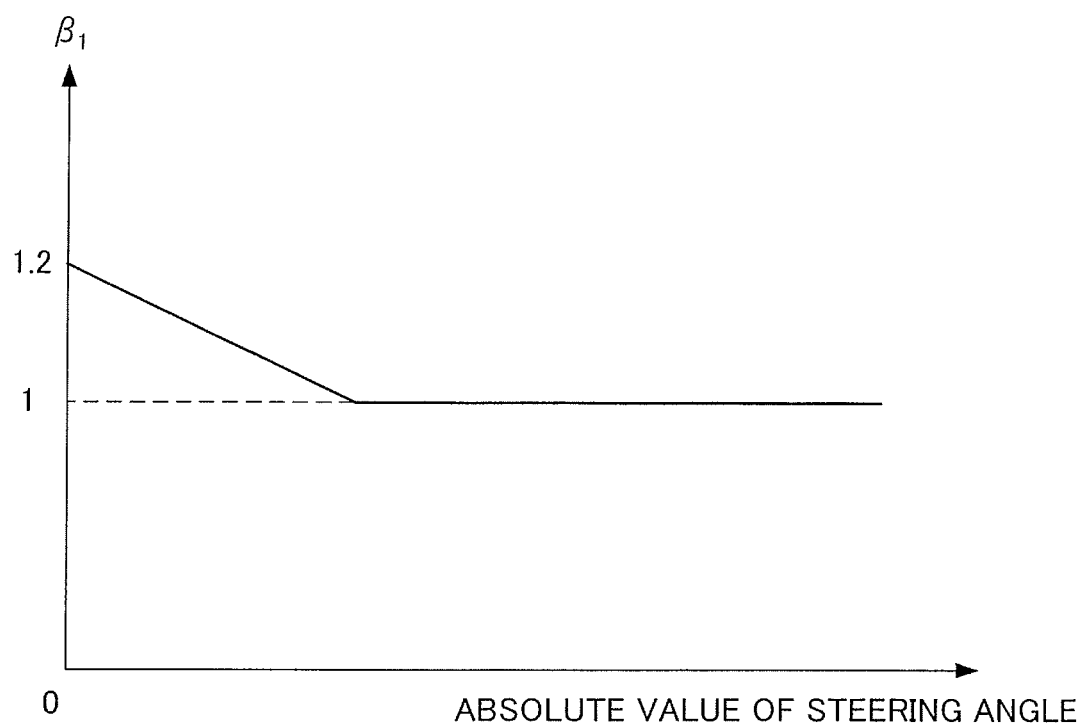
FIG. 37 is a graph showing the relationship between the correction factor $\beta_1$ and the absolute value of the steering angle.

Also, it is preferable that the correction factor $\beta_1$ vary according to the angle of rotation (or the steering angle) of the steering wheel 101. FIG. 37 is a graph showing the relationship between the correction factor $\beta_1$ and the absolute value of the steering angle. For example, the optimum correction factor $\beta_1$ in accordance with the absolute value of the steering angle is derived in advance on the basis of an empirical rule, as shown in FIG. 37. Then, the resonance compensators 27, 271 and 272 calculate the correction factor $\beta_1$ by substituting the detected steering angle into a map showing the correspondence between the absolute value of the steering angle and the correction factor $\beta_1$, or a relational expression of the absolute value of the steering angle and the correction factor $\beta_1$, which has previously been created and stored in the ROM, and uses the calculated correction factor $\beta_1$ in the transfer function.

Incidentally, the vibration should be suppressed as the absolute value of the steering angle decreases, and thus, as shown in FIG. 37, preferably, the correction factor $\beta_1$ is 1.2 when the absolute value of the steering angle is zero, and the correction factor $\beta_1$ decreases to 1 as the absolute value of the steering angle increases, and the correction factor $\beta_1$ is set to 1 when the absolute value of the steering angle is more than a given value.

Also, it is preferable that both the above-mentioned correction factors $\alpha_1$ and $\beta_1$ be used. Specifically, preferably, in the transfer functions "$H_n(s) = a_n \cdot ((2\pi f_{c1}) \cdot (2\pi f_{c2})) / ((s + 2\pi f_{c1}) \cdot (s + 2\pi f_{c2}))$ (where n=1, 2, 3)" of the resonance compensators 27, 271 and 272 according to the above-mentioned sixth to eighth exemplary embodiments, $a_n$ is multiplied by $\beta_1$, and also, the operator "s" for the Laplace transform in $a_n$ is replaced by "$\alpha_1 \times s$," and the corrected transfer function is used as the transfer function of the resonance compensators 27, 271 and 272.

Also in such an instance, the resonance compensators 27, 271 and 272 calculate the correction factors $\alpha_1$ and $\beta_1$ by substituting the amount of change in the weight of the front wheels 150 into a map showing the correspondence between the amount of change in the weight of the front wheels 150 and the correction factors $\alpha_1$ and $\beta_1$, or a relational expression of the amount of change in the weight of the front wheels 150 and the correction factors $\alpha_1$ and $\beta_1$, which has previously been created and stored in the ROM, and uses the calculated correction factors $\alpha_1$ and $\beta_1$ in the transfer function. Incidentally, it is preferable that the correction factors $\alpha_1$ and $\beta_1$ have the relationships shown in FIGS. 32 and 35, respectively.

Also, the resonance compensators 27, 271 and 272 calculate the correction factors $\alpha_1$ and $\beta_1$ by substituting the vehicle speed signal v into a map showing the correspondence between the vehicle speed signal v and the correction factors $\alpha_1$ and $\beta_1$, or a relational expression of the vehicle speed signal v and the correction factors $\alpha_1$ and $\beta_1$, which has previously been created and stored in the ROM, and uses the calculated correction factors $\alpha_1$ and $\beta_1$ in the transfer function. Incidentally, it is preferable that the correction factors $\alpha_1$ and $\beta_1$ have the relationships shown in FIGS. 33 and 36, respectively.

Also, the resonance compensators 27, 271 and 272 calculate the correction factors $\alpha_1$ and $\beta_1$ by substituting the detected steering angle into a map showing the correspondence between the absolute value of the steering angle and the correction factors $\alpha_1$ and $\beta_1$, or a relational expression of the absolute value of the steering angle and the correction factors $\alpha_1$ and $\beta_1$, which has previously been created and stored in the ROM, and uses the calculated correction factors $\alpha_1$ and $\beta_1$ in the transfer function. Incidentally, it is preferable that the correction factors $\alpha_1$ and $\beta_1$ have the relationships shown in FIGS. 34 and 37, respectively.

Incidentally, in the above-mentioned sixth, seventh and eighth exemplary embodiments, the resonance compensators 27, 271 and 272 have been described as being configured to eliminate the resonance frequency components of the torque signal Ts obtained through the phase compensation by the phase compensator 26, and to output the torque signal Tp obtained through the elimination of the resonance frequency components; however, it is to be understood that the present invention is not limited to such configurations.

For instance, the resonance compensators 27, 271 and 272 may be configured to eliminate the resonance frequency components of the torque signal Td as the output value from the torque sensor 109 and to output the torque signal Tp, and the phase compensator 26 may be configured to perform the filtering processing for the phase compensation on the torque signal Tp obtained through the elimination of the resonance frequency components and output the torque signal Ts. In this instance, the base current calculator 21 calculates the base current on the basis of the torque signal Ts as the output value from the phase compensator 26, and the vehicle speed signal v from the vehicle speed sensor 170.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The exemplary embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An electric power steering apparatus, comprising:
a first rotary shaft connected to a steering wheel;
a rack shaft configured to effect turning of a wheel to be turned, by a rectilinear motion;
a second rotary shaft configured to effect the rectilinear motion of the rack shaft;
a torsion bar configured to provide a connection between the first rotary shaft and the second rotary shaft, and configured to be twisted by operation of the steering wheel;
an electric motor configured to apply assist force for the operation of the steering wheel;
a steering torque detector configured to detect steering torque of the steering wheel; and
a target current setting unit configured to set a target current to be supplied to the electric motor, on the basis of the steering torque detected by the steering torque detector,
a feedback controller configured to perform feedback control on the target current set by the target current setting unit,
the target current setting unit comprising:
a target current determination unit configured to determine the target current; and
a resonance compensator provided on an output side of the steering torque detector that is also an input side of the target current determination unit, the resonance compensator being configured to suppress a resonance frequency component of a control system including the torsion bar as a spring element, and the electric motor, the second rotary shaft, and the rack shaft as inertial elements, and
the target current setting unit being further configured to set the target current in accordance with the steering torque subjected to the suppression of the resonance frequency component by the resonance compensator,
wherein a transfer function H(s) of the resonance compensator is defined as:

$$H(s) = a \cdot ((2\pi f_{c1}) \cdot (2\pi f_{c2}))/((s+2\pi f_{c1}) \cdot (s+2\pi f_{c2}));$$

wherein:

$$a = \frac{(4\pi^2 \cdot \gamma_1^2 \cdot J_1 + 4\pi^2 \cdot J_2 + m \cdot \gamma_2^2) \cdot s^2 + 4\pi^2 \cdot k_{tb}}{4\pi^2 \cdot \gamma_1}, \text{ or}$$

$$a = \frac{(4\pi^2 \cdot \gamma_1^2 \cdot J_1 + 4\pi^2 \cdot \gamma_1^2 \cdot J_2 + m \cdot \gamma_1^2 \cdot \gamma_2^2) \cdot s^2 + 4\pi^2 \cdot \gamma_1^2 \cdot k_{tb}}{4\pi^2 \cdot \gamma_1 \cdot \gamma_2}; \text{ and}$$

wherein:
s donates an operator for the Laplace transform,
$f_{c12}$ and $f_{c2}$ represent cut-off frequencies of low-pass filters,
$\gamma_1 = \theta_1/\theta_2$, where $\theta_1$ represents an angle of rotation of the electric motor, and $\theta_2$ represents an angle of rotation of the second rotary shaft,
$\gamma_2 = 2 \cdot \pi \cdot r$, where r represents a radius of rotation of the second rotary shaft,
$J_1$ represents inertia of a motor shaft of the electric motor,
$J_2$ represents inertia of the second rotary shaft,
m represents mass of the rack shaft, and
$k_{tb}$ represents a spring constant of the torsion bar.

2. The electric power steering apparatus according to claim 1, wherein the resonance compensator comprises a filtering function and a low-pass filtering function, the filtering function comprising an antiresonant element of the control system.

3. The electric power steering apparatus according to claim 1, wherein a numerator of a transfer function of the resonance compensator comprises the same element as that of a denominator of a transfer function of the control system.

4. The electric power steering apparatus according to claim 3, wherein a denominator of the transfer function of the resonance compensator comprises a degree not less than a degree of the numerator.

5. The electric power steering apparatus according to claim 1, wherein:
the transfer function H(s) is corrected by replacing the operator "s" by "αs"; and
α represents a first correlation factor which is derived in accordance with at least one of the amount of change in weight of the wheel, a vehicle speed, and an angle of rotation of the steering wheel.

6. The electric power steering apparatus according to claim 1, wherein:
the transfer function H(s) is corrected by multiplying with β; and
β represents a second correlation factor which is derived in accordance with at least one of the amount of change in weight of the wheel, a vehicle speed, and an angle of rotation of the steering wheel.

7. The electric power steering apparatus according to claim 5, wherein:
the transfer function H(s) is corrected by multiplying with β; and
β represents a second correlation factor which is derived in accordance with at least one of the amount of change in weight of the wheel, a vehicle speed, and an angle of rotation of the steering wheel.

8. An electric power steering apparatus, comprising:
a first rotary shaft connected to a steering wheel;
a rack shaft configured to effect turning of a wheel to be turned, by a rectilinear motion;
a second rotary shaft configured to effect the rectilinear motion of the rack shaft;
a torsion bar configured to provide a connection between the first rotary shaft and the second rotary shaft, and configured to be twisted by operation of the steering wheel;
an electric motor configured to apply assist three for the operation of the steering wheel;
a steering torque detector configured to detect steering torque of the steering wheel; and
a target current setting unit configured to set a target current to be supplied to the electric motor, on the basis of the steering torque detected by the steering torque detector,
a feedback controller configured to perform feedback control on the target current set by the target current setting unit,
the target current setting unit comprising:
a target current determination unit configured to determine the target current; and
a resonance compensator provided on an output side of the steering torque detector that is also an input side of the target current determination unit, the resonance compensator being configured to suppress a resonance frequency component of a control system including the torsion bar as a spring element, and the electric motor, the second rotary shaft, and the rack shaft as inertial elements, and the target current setting unit being further configured to set the target current in accordance with the steering torque subjected to the suppression of the resonance frequency component by the resonance compensator, wherein:

the second rotary shaft comprises a first pinion shaft;

the apparatus further comprises a second pinion shaft that is connected to the electric motor and is configured to transmit torque produced by the electric motor to the rack shaft;

the resonance compensator is further configured to suppress the resonance frequency component of a control system including the torsion bar as a spring element, and the electric motor, the first pinion shaft, the second pinion shaft, and the rack shaft as inertial elements, and a transfer function $H(s)$ of the resonance compensator is defined as:

$$H(s)=a\cdot((2\pi f_{c1})\cdot(2\pi f_{c2}))/((s+2\pi f_{c1})\cdot(s+2\pi f_{c2}));$$

wherein:

$$a = \frac{(4\pi^2 \cdot \gamma_1^2 \cdot \gamma_3^2 \cdot J_1 + 4\pi^2 \cdot \gamma_3^2 \cdot J_2 + \gamma_2^2 \cdot \gamma_3^2 \cdot m + 4\pi^2 \cdot \gamma_2^2 \cdot J_3)\cdot s^2 + 4\pi^2 \cdot \gamma_2^2 \cdot k_{tb}}{4\pi^2 \cdot \gamma_1 \cdot \gamma_2 \cdot \gamma_3}$$

and wherein:

s donates an operator for the Laplace transform, $f_{c1}$ and $f_{c2}$ represent cut-off frequencies of low-pass filters, $\gamma_1 = \theta_1/\theta_2$, where $\theta_1$ represents an angle of rotation of the electric motor, and $\theta_2$ represents an angle of rotation of the second pinion shaft, $\gamma_2 = 2\cdot\pi\cdot r_1$, where $r_1$ represents a radius of rotation of the second pinion shaft, $\gamma_3 = 2\cdot\pi\cdot r_2$, where $r_2$ represents a radius of rotation of the first pinion shaft, $J_1$ represents inertia of a motor shaft of the electric motor, $J_2$ represents inertia of the second pinion shaft, $J_3$ represents inertia of the first pinion shaft, m represents mass of the rack shaft, and $k_{tb}$ represents a spring constant of the torsion bar.

9. A control method of an electric power steering apparatus including a first rotary shaft connected to a steering wheel; a rack shaft that effects turning of a wheel to be turned, by a rectilinear motion; a second rotary shaft that effects the rectilinear motion of the rack shaft; a torsion bar that provides a connection between the first rotary shaft and the second rotary shaft and is twisted by operation of the steering wheel; an electric motor that applies assist force for the operation of the steering wheel, the control method thereof comprising:

detecting steering torque of the steering wheel;

suppressing a resonance frequency component of a control system including the torsion bar as a spring element, and the electric motor, the second rotary shaft, and the rack shaft as inertial elements, before setting a target current to be supplied to the electric motor;

setting a target current to be supplied to the electric motor in accordance with the steering torque subjected to the suppression of the resonance frequency component; and defining a transfer function $H(s)$ of a resonance compensator as:

$$H(s)=a\cdot((2\pi f_{c1})\cdot(2\pi f_{c2}))/((s+2\pi f_{c1})\cdot(s+2\pi f_{c2}));$$

wherein:

$$a = \frac{(4\pi^2 \cdot \gamma_1^2 \cdot J_1 + 4\pi^2 \cdot J_2 + m\cdot \gamma_2^2)\cdot s^2 + 4\pi^2 \cdot k_{tb}}{4\pi^2 \cdot \gamma_1}; \text{ or}$$

$$a = \frac{(4\pi^2 \cdot \gamma_1^2 \cdot J_1 + 4\pi^2 \cdot \gamma_1^2 \cdot J_2 + m\cdot \gamma_1^2 \cdot \gamma_2^2)\cdot s^2 + 4\pi^2 \cdot \gamma_1^2 \cdot k_{tb}}{4\pi^2 \cdot \gamma_1 \cdot \gamma_2}; \text{ and}$$

wherein:

s donates an operator for the Laplace transform, $f_{c1}$ and $f_{c2}$ represent cut-off frequencies of low-pass filters, $\gamma_1 = \theta_1/\theta_2$, where $\theta_1$ represents an angle of rotation of the electric motor, and $\theta_2$ represents an angle of rotation of the second rotary shaft, $\gamma_2 = 2\cdot\pi\cdot r$, where r represents a radius of rotation of the second rotary shaft, $J_1$ represents inertia of a motor shaft of the electric motor, $J_2$ represents inertia of the second rotary shaft, m represents mass of the rack shaft, and $k_{tb}$ represents a spring constant of the torsion bar.

10. The control method of the electric power steering apparatus according to claim 9, wherein a filtering function and a low-pass filtering function are used at the suppression of the resonance frequency component of the control system, the filtering function comprising an antiresonant element of the control system.

11. A control method of an electric power steering apparatus including a first rotary shaft connected to a steering wheel; a rack shaft that effects turning of a wheel to be turned, by a rectilinear motion; a second rotary shaft that effects the rectilinear motion of the rack shaft; a torsion bar that provides a connection between the first rotary shaft and the second rotary shaft and is twisted by operation of the steering wheel; an electric motor that applies assist force for the operation of the steering wheel, the control method thereof comprising:

detecting steering torque of the steering wheel;

suppressing a resonance frequency component of a control system including the torsion bar as a spring element, and the electric motor, the second rotary shaft, and the rack shaft as inertial elements, before setting a target current to be supplied to the electric motor; and setting a target current to be supplied to the electric motor in accordance with the steering torque subjected to the suppression of the resonance frequency component, wherein the second rotary shaft of the electric power steering apparatus comprises a first pinion shaft and the electric power steering apparatus further comprising a second pinion shaft that is connected to the electric motor to transmit torque produced by the electric motor to the rack shaft, the control method suppressing the resonance frequency component of a control system including the torsion bar as a spring element, and the electric motor, the pinion shaft, the second pinion shaft, and the rack shaft as inertial elements;

defining a transfer function $H(s)$ of a resonance compensator as:

$$H(s)=a\cdot((2\pi f_{c1})\cdot(2\pi f_{c2}))/((s+2\pi f_{c1})\cdot(s+2\pi f_{c2}));$$

wherein:

$$a = \frac{(4\pi^2 \cdot \gamma_1^2 \cdot \gamma_3^2 \cdot J_1 + 4\pi^2 \cdot \gamma_3^2 \cdot J_2 + \gamma_2^2 \cdot \gamma_3^2 \cdot m + 4\pi^2 \cdot \gamma_2^2 \cdot J_3) \cdot s^2 + 4\pi^2 \cdot \gamma_2^2 \cdot k_{tb}}{4\pi^2 \cdot \gamma_1 \cdot \gamma_2 \cdot \gamma_3};$$

and
wherein:
- s donates an operator for the Laplace transform,
- $f_{c1}$ and $f_{c2}$ represent cut-off frequencies of low-pass filters,
- $\gamma_1 = \theta_1/\theta_2$, where $\theta_1$ represents an angle of rotation of the electric motor, and $\theta_2$ represents an angle of rotation of the second pinion shaft,
- $\gamma_2 = 2 \cdot \pi \cdot r_1$, where $r_1$ represents a radius of rotation of the second pinion shaft,
- $\gamma_3 = 2 \cdot \pi \cdot r_2$, where $r_2$ represents a radius of rotation of the first pinion shaft,
- $J_1$ represents inertia of a motor shaft of the electric motor,
- $J_2$ represents inertia of the second pinion shaft,
- $J_3$ represents inertia of the first pinion shaft,
- m represents mass of the rack shaft, and
- $k_{tb}$ represents a spring constant of the torsion bar.

\* \* \* \* \*

UNITED STATES PATENT AND TRADEMARK OFFICE
CERTIFICATE OF CORRECTION

PATENT NO.         : 8,818,636 B2
APPLICATION NO.    : 13/561239
DATED              : August 26, 2014
INVENTOR(S)        : Hideyuki Murakami Page 1 of 1

It is certified that error appears in the above-identified patent and that said Letters Patent is hereby corrected as shown below:

In the Claims

Claim 1:

In Column 43, line 31, delete "target, current" and insert --target current--

In Column 43, line 56, delete "f.sub.c12" and insert --f.sub.c1--

Signed and Sealed this
Seventeenth Day of March, 2015

Michelle K. Lee
*Director of the United States Patent and Trademark Office*